US011386385B2

(12) United States Patent
Gillen et al.

(10) Patent No.: US 11,386,385 B2
(45) Date of Patent: Jul. 12, 2022

(54) SYSTEMS, METHODS, AND COMPUTER PROGRAM PRODUCTS FOR PROVIDING CUSTOMIZED COMMUNICATION CONTENT IN CONJUNCTION WITH TRANSPORT OF A PLURALITY OF PACKAGES

(71) Applicant: United Parcel Service of America, Inc., Atlanta, GA (US)

(72) Inventors: Robert J. Gillen, Alpharetta, GA (US); Jessica Catherine Grimes, Smyrna, GA (US); David Daniel Alery, Stevens Point, WI (US); David Louis Molvik, Lodi, CA (US); Du Phung, Corte Madera, CA (US); Randy Campbell, Woodstock, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 143 days.

(21) Appl. No.: 16/511,914

(22) Filed: Jul. 15, 2019

(65) Prior Publication Data

US 2019/0340566 A1 Nov. 7, 2019

Related U.S. Application Data

(63) Continuation of application No. 14/472,895, filed on Aug. 29, 2014, now Pat. No. 10,354,216.
(Continued)

(51) Int. Cl.
*G06Q 10/08* (2012.01)
*G06Q 30/02* (2012.01)

(52) U.S. Cl.
CPC ....... *G06Q 10/083* (2013.01); *G06Q 10/0835* (2013.01); *G06Q 30/0251* (2013.01)

(58) Field of Classification Search
CPC .......... G06Q 30/0251; G06Q 10/0835; G06Q 10/083; G06Q 10/0831; G06Q 10/0832;
(Continued)

(56) References Cited

U.S. PATENT DOCUMENTS 5,153,842 A 10/1992 Dlugos et al.
5,168,444 A 12/1992 Cukor et al.
(Continued)

FOREIGN PATENT DOCUMENTS

JP H10-207956 A 8/1998
JP H1-1139540 A 5/1999
(Continued)

OTHER PUBLICATIONS

ASP V16-System Walker List Works Manual, line 5, 3.4 Start up and termination of ListWORKS writer, p. 88.
(Continued)

*Primary Examiner* — Igor N Borissov
(74) *Attorney, Agent, or Firm* — Shook, Hardy & Bacon L.L.P.

(57) ABSTRACT

According to various embodiments, system, methods and computer program products are configured for providing at least one customized communication to a recipient of one or more packages shipped by a consignor via a common carrier. One or more computer processors are configured to: receive at least a portion of customized content; retrieve at least a portion of consignee data, the portion comprising one or more parameters established by the recipient; compare the one or more components of the customized content with the one or more parameters established by the recipient so as to identify one or more correlations there-between; in response to identifying at least one correlation, generate at least one customized communication for provision to the recipient, the at least one customized communication containing at
(Continued)

least a portion of the customized content; and in response to identifying no correlations, generate at least one standard communication containing no customized content.

19 Claims, 18 Drawing Sheets

Related U.S. Application Data

(60) Provisional application No. 61/872,033, filed on Aug. 30, 2013.

(58) Field of Classification Search
CPC ............ G06Q 10/0833; G06Q 10/0838; G06Q 10/087; G06Q 10/0875; G06Q 20/203; G07B 2017/00072
USPC ....... 705/330–342, 401–411, 1.1, 7.11, 7.12, 705/7.13, 7.14, 28
See application file for complete search history.

(56) References Cited

U.S. PATENT DOCUMENTS

| | | | |
|---|---|---|---|
| 5,375,240 A | 12/1994 | Grundy | |
| 5,400,020 A | 3/1995 | Jones et al. | |
| 5,444,444 A | 8/1995 | Ross | |
| 5,623,260 A | 4/1997 | Jones | |
| 5,648,770 A | 7/1997 | Ross | |
| 5,657,010 A | 8/1997 | Jones | |
| 5,668,543 A | 9/1997 | Jones | |
| 5,786,748 A | 7/1998 | Nikolic et al. | |
| 6,047,264 A | 4/2000 | Fisher et al. | |
| 6,085,170 A | 7/2000 | Tsukuda | |
| 6,178,411 B1 | 1/2001 | Reiter | |
| 6,208,980 B1 | 3/2001 | Kara | |
| 6,211,781 B1 | 4/2001 | McDonald | |
| 6,220,509 B1 | 4/2001 | Byford | |
| 6,236,972 B1 | 5/2001 | Shkedy | |
| 6,278,936 B1 | 8/2001 | Jones | |
| 6,285,916 B1 | 9/2001 | Kadaba et al. | |
| 6,289,323 B1 | 9/2001 | Gordon et al. | |
| 6,304,856 B1 | 10/2001 | Soga et al. | |
| 6,313,760 B1 | 11/2001 | Jones | |
| 6,317,060 B1 | 11/2001 | Jones | |
| 6,323,254 B1 | 11/2001 | Weikard et al. | |
| 6,343,275 B1 | 1/2002 | Wong | |
| 6,344,796 B1 | 2/2002 | Ogilvie et al. | |
| 6,356,196 B1 | 3/2002 | Wong et al. | |
| 6,363,323 B1 | 3/2002 | Jones | |
| 6,411,891 B1 | 6/2002 | Jones | |
| 6,442,589 B1 | 8/2002 | Takahashi et al. | |
| 6,463,420 B1 | 10/2002 | Guidice et al. | |
| 6,486,801 B1 | 11/2002 | Jones | |
| 6,492,912 B1 | 12/2002 | Jones | |
| 6,510,383 B1 | 1/2003 | Jones | |
| 6,536,659 B1 | 3/2003 | Hauser et al. | |
| 6,539,360 B1 | 3/2003 | Kadaba | |
| 6,618,668 B1 | 9/2003 | Laird | |
| 6,634,551 B2 | 10/2003 | Barta et al. | |
| 6,683,542 B1 | 1/2004 | Jones | |
| 6,700,507 B2 | 3/2004 | Jones | |
| 6,701,299 B2 | 3/2004 | Kraisser et al. | |
| 6,714,859 B2 | 3/2004 | Jones | |
| 6,741,927 B2 | 5/2004 | Jones | |
| 6,748,318 B1 | 6/2004 | Jones | |
| 6,748,320 B2 | 6/2004 | Jones | |
| 6,763,299 B2 | 7/2004 | Jones | |
| 6,763,300 B2 | 7/2004 | Jones | |
| 6,772,130 B1 | 8/2004 | Karbowski et al. | |
| 6,804,606 B2 | 10/2004 | Jones | |
| 6,859,722 B2 | 2/2005 | Jones | |
| 6,902,109 B2 | 6/2005 | Barta et al. | |
| 6,904,359 B2 | 6/2005 | Jones | |
| 6,952,645 B1 | 10/2005 | Jones | |
| 6,975,998 B1 | 12/2005 | Jones | |
| 6,976,090 B2 | 12/2005 | Ben-Shaul et al. | |
| 6,978,929 B2 | 12/2005 | Buie et al. | |
| 6,985,871 B2 | 1/2006 | Simon et al. | |
| 6,994,253 B2 | 2/2006 | Miller et al. | |
| 7,028,895 B2 | 4/2006 | Ashaari | |
| 7,030,781 B2 | 4/2006 | Jones | |
| 7,031,959 B2 | 4/2006 | Garner et al. | |
| 7,177,825 B1 | 2/2007 | Borders et al. | |
| 7,212,829 B1 | 5/2007 | Lau et al. | |
| 7,212,984 B2 | 5/2007 | Wolfe et al. | |
| 7,222,081 B1 | 5/2007 | Sone | |
| 7,225,983 B2 | 6/2007 | Park et al. | |
| 7,233,907 B2 | 6/2007 | Young | |
| 7,248,160 B2 | 7/2007 | Mangan et al. | |
| 7,249,044 B2 | 7/2007 | Kumar et al. | |
| 7,249,087 B2 | 7/2007 | Sharp et al. | |
| 7,257,552 B1 | 8/2007 | Franco | |
| 7,312,702 B1 | 12/2007 | Willms et al. | |
| 7,376,598 B2 | 5/2008 | Estes et al. | |
| 7,385,499 B2 | 6/2008 | Horton et al. | |
| 7,422,149 B2 | 9/2008 | Aptekar | |
| 7,479,899 B2 | 1/2009 | Horstemeyer | |
| 7,501,946 B2 | 3/2009 | Lanigan et al. | |
| 7,511,617 B2 | 3/2009 | Burman et al. | |
| 7,528,722 B2 | 5/2009 | Nelson | |
| 7,574,366 B2 | 8/2009 | Burman et al. | |
| 7,580,845 B2 | 8/2009 | Burman et al. | |
| 7,624,024 B2 | 11/2009 | Levis et al. | |
| 7,647,231 B2 | 1/2010 | Kuebert et al. | |
| 7,657,466 B2 | 2/2010 | Klingenberg et al. | |
| 7,693,723 B2 | 4/2010 | Wade | |
| 7,711,654 B2 | 5/2010 | Schmidtberg et al. | |
| 7,712,670 B2 | 5/2010 | Sauerwein et al. | |
| 7,742,928 B2 | 6/2010 | Reynolds et al. | |
| 7,752,134 B2 | 7/2010 | Spear | |
| 7,765,131 B2 | 7/2010 | Klingenberg et al. | |
| 7,769,778 B2 | 8/2010 | Snapp et al. | |
| 7,831,439 B1 | 11/2010 | Bryar et al. | |
| 7,848,961 B2 | 12/2010 | Estes et al. | |
| 7,853,481 B1 | 12/2010 | Johnson | |
| 7,868,753 B2 | 1/2011 | Jenkins et al. | |
| 7,925,524 B2 | 4/2011 | Florence | |
| 7,969,306 B2 | 6/2011 | Ebert et al. | |
| 7,984,289 B2 | 7/2011 | Orbke et al. | |
| 7,996,328 B1 | 8/2011 | Lundberg et al. | |
| 8,015,023 B1 | 9/2011 | Lee et al. | |
| 8,027,933 B2 | 9/2011 | Lou et al. | |
| 8,036,993 B2 | 10/2011 | Estes | |
| 8,073,735 B2 * | 12/2011 | Libman ................. | G06Q 40/00 705/14.17 |
| 8,103,521 B2 | 1/2012 | Kuebert et al. | |
| 8,103,716 B2 | 1/2012 | Boyce et al. | |
| 8,108,321 B2 | 1/2012 | Neal et al. | |
| 8,117,462 B2 | 2/2012 | Snapp et al. | |
| 8,131,652 B2 | 3/2012 | Gullo et al. | |
| 8,140,551 B2 | 3/2012 | Garner et al. | |
| 8,140,592 B2 | 3/2012 | Scott et al. | |
| 8,209,729 B2 | 6/2012 | Phillips et al. | |
| 8,249,998 B2 | 8/2012 | Reynolds et al. | |
| 8,255,235 B2 | 8/2012 | Aldstadt | |
| 8,255,339 B2 | 8/2012 | Andrew | |
| 8,265,947 B2 | 9/2012 | Kuebert et al. | |
| 8,285,737 B1 | 10/2012 | Lynn et al. | |
| 8,291,234 B2 | 10/2012 | Snapp et al. | |
| 8,340,978 B2 | 12/2012 | Wade | |
| 8,341,139 B1 | 12/2012 | Ogilvie et al. | |
| 8,352,551 B2 | 1/2013 | Campbell et al. | |
| 8,356,187 B2 | 1/2013 | Cook et al. | |
| 8,364,953 B2 | 1/2013 | Bullard, Jr. | |
| 8,380,641 B1 | 2/2013 | Bennett et al. | |
| 8,489,520 B2 | 7/2013 | Kuebert et al. | |
| 2002/0007299 A1 | 1/2002 | Florence | |
| 2002/0010634 A1 | 1/2002 | Roman et al. | |
| 2002/0013744 A1 | 1/2002 | Tsunenari et al. | |
| 2002/0016726 A1 | 2/2002 | Ross | |
| 2002/0019761 A1 | 2/2002 | Lidow | |
| 2002/0032612 A1 | 3/2002 | Williams et al. | |

(56) References Cited

U.S. PATENT DOCUMENTS

| | | |
|---|---|---|
| 2002/0035507 A1* | 3/2002 | Singh ............. G06Q 30/0267 705/14.46 |
| 2002/0070882 A1 | 6/2002 | Jones |
| 2002/0073039 A1 | 6/2002 | Ogg et al. |
| 2002/0082770 A1 | 6/2002 | Jones |
| 2002/0087371 A1 | 7/2002 | Abendroth |
| 2002/0103724 A1 | 8/2002 | Huxter |
| 2002/0111914 A1 | 8/2002 | Terada et al. |
| 2002/0120475 A1 | 8/2002 | Morimoto |
| 2002/0130065 A1 | 9/2002 | Bloom |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1 | 11/2002 | Kuebert et al. |
| 2002/0178074 A1 | 11/2002 | Bloom |
| 2003/0003936 A1 | 1/2003 | Tighe |
| 2003/0037009 A1 | 2/2003 | Tobin et al. |
| 2003/0114206 A1 | 6/2003 | Timothy et al. |
| 2003/0193414 A1 | 10/2003 | Jones |
| 2004/0073499 A1 | 4/2004 | Martin et al. |
| 2004/0093312 A1 | 5/2004 | Cordery et al. |
| 2004/0117326 A1 | 6/2004 | Amato |
| 2004/0133446 A1 | 7/2004 | Myrick et al. |
| 2004/0149824 A1 | 8/2004 | Miller et al. |
| 2004/0158351 A1 | 8/2004 | Rivalto |
| 2004/0199656 A1 | 10/2004 | Pintsov |
| 2004/0211834 A1 | 10/2004 | Fleckenstein et al. |
| 2004/0260470 A1 | 12/2004 | Rast |
| 2005/0004877 A1 | 1/2005 | Mclellan et al. |
| 2005/0038758 A1 | 2/2005 | Hilbush et al. |
| 2005/0060165 A1 | 3/2005 | Knight et al. |
| 2005/0071258 A1 | 3/2005 | Kumakawa |
| 2005/0104716 A1 | 5/2005 | Simms et al. |
| 2005/0216553 A1 | 9/2005 | Mallonee et al. |
| 2005/0251402 A1 | 11/2005 | Olsen et al. |
| 2005/0251448 A1 | 11/2005 | Gropper |
| 2006/0041481 A1 | 2/2006 | Stowe |
| 2006/0047610 A1 | 3/2006 | Parkos et al. |
| 2006/0064312 A1 | 3/2006 | Chandaria |
| 2006/0069601 A1 | 3/2006 | Simon et al. |
| 2006/0085273 A1 | 4/2006 | Mayer et al. |
| 2006/0097896 A1 | 5/2006 | Jones |
| 2006/0229895 A1 | 10/2006 | Kodger, Jr. |
| 2007/0078797 A1 | 4/2007 | Won et al. |
| 2007/0083410 A1 | 4/2007 | Hanna |
| 2007/0150533 A1 | 6/2007 | Krause et al. |
| 2007/0156415 A1 | 7/2007 | Foth et al. |
| 2008/0004995 A1 | 1/2008 | Klingenberg et al. |
| 2008/0131005 A1 | 6/2008 | Oliver |
| 2008/0133261 A1 | 6/2008 | Ray |
| 2008/0154781 A1 | 6/2008 | Kumar |
| 2008/0172305 A1 | 7/2008 | Estes et al. |
| 2008/0210749 A1 | 9/2008 | Skaaksrud et al. |
| 2008/0221913 A1 | 9/2008 | Cook et al. |
| 2008/0319970 A1 | 12/2008 | Garner et al. |
| 2008/0320092 A1 | 12/2008 | Campbell et al. |
| 2009/0012802 A1 | 1/2009 | Pinney |
| 2009/0046892 A1 | 2/2009 | Avant et al. |
| 2009/0076918 A1 | 3/2009 | Blanchet |
| 2009/0138730 A1 | 5/2009 | Cook et al. |
| 2009/0173672 A1 | 7/2009 | Avant et al. |
| 2009/0204624 A1* | 8/2009 | Basson ............. G06Q 10/08 |
| 2009/0314835 A1 | 12/2009 | Jackson |
| 2009/0319078 A1 | 12/2009 | Jackson |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0076903 A1 | 3/2010 | Klingenberg et al. |
| 2010/0100497 A1 | 4/2010 | Kuebert et al. |
| 2010/0185565 A1 | 7/2010 | Wade |
| 2010/0211444 A1 | 8/2010 | Spear |
| 2011/0004562 A1 | 1/2011 | Hennessy et al. |
| 2011/0092221 A1 | 4/2011 | Zubas et al. |
| 2011/0125665 A1 | 5/2011 | Kadaba |
| 2012/0016948 A1 | 1/2012 | Sinha |
| 2012/0047085 A1 | 2/2012 | Naghshineh et al. |
| 2012/0089532 A1 | 4/2012 | Kuebert et al. |
| 2012/0095934 A1 | 4/2012 | Klingenberg et al. |
| 2012/0130625 A1 | 5/2012 | Srivastava |
| 2012/0130916 A1 | 5/2012 | Neal et al. |
| 2012/0179622 A1 | 7/2012 | Amato |
| 2012/0246077 A1 | 9/2012 | Skaaksrud et al. |
| 2012/0303539 A1 | 11/2012 | Marcus et al. |
| 2012/0303541 A1 | 11/2012 | Marcus et al. |
| 2012/0303542 A1 | 11/2012 | Marcus et al. |
| 2012/0310853 A1 | 12/2012 | Aldstadt |
| 2013/0006731 A1 | 1/2013 | Cook et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0016636 A1 | 1/2013 | Berger et al. |
| 2013/0024525 A1 | 1/2013 | Brady et al. |
| 2013/0073336 A1 | 3/2013 | Heath |
| 2013/0212036 A1 | 8/2013 | Klingenberg et al. |
| 2013/0238599 A1 | 9/2013 | Burris |
| 2013/0238658 A1 | 9/2013 | Burris |
| 2013/0246396 A1 | 9/2013 | Clare et al. |
| 2014/0089956 A1 | 3/2014 | Shah et al. |
| 2015/0066798 A1 | 3/2015 | Gillen et al. |

FOREIGN PATENT DOCUMENTS

| | | |
|---|---|---|
| JP | 2000-339373 A | 12/2000 |
| JP | 2001-14393 A | 1/2001 |
| JP | 2001-22678 A | 1/2001 |
| JP | 2002-42008 A | 2/2002 |
| JP | 2002-56307 A | 2/2002 |
| WO | 00/19170 A1 | 4/2000 |
| WO | 00/19171 A1 | 4/2000 |
| WO | 00/30014 A1 | 5/2000 |
| WO | 00/46726 A2 | 8/2000 |
| WO | 00/46728 A2 | 8/2000 |
| WO | 005/2422 A1 | 9/2000 |
| WO | 011/6889 A1 | 3/2001 |
| WO | 012/9778 A1 | 4/2001 |
| WO | 013/5344 A2 | 5/2001 |
| WO | 013/9031 A2 | 5/2001 |
| WO | 01/65454 A2 | 9/2001 |
| WO | 01/65523 A1 | 9/2001 |
| WO | 01/65524 A1 | 9/2001 |
| WO | 01/67344 A1 | 9/2001 |
| WO | 0165451 A1 | 9/2001 |
| WO | 0172109 A2 | 10/2001 |
| WO | 01/88831 A2 | 11/2001 |
| WO | 0184359 A2 | 11/2001 |
| WO | 01/97101 A2 | 12/2001 |
| WO | 02/07104 A1 | 1/2002 |
| WO | 02/17045 A2 | 2/2002 |
| WO | 02/052378 A2 | 7/2002 |
| WO | 2004/015518 A2 | 2/2004 |
| WO | 2012/129529 A1 | 9/2012 |

OTHER PUBLICATIONS

Brewin, et al., "Follow that Package!", Article, Computer World, Available at: <www.computerworld.com/printthis/2001//0,4814,58696,00.html>, Mar. 19, 2001, pp. 1-5.

Caminiti, et al., "United Parcel Service Introduces Advanced Label Imaging System", Business Wire, Section 1, Nov. 29, 1989, 1 page.

Demarco, Donna, "E-tail Presents Can be Tougher to Send Back than Order", Journal, Knight-Ridder/Tribune Business News, The Dialog Corporation, US, Dec. 28, 1999.

Declaration of David Ellison Pertaining to UPS and Mailbox etc. pre-filing activities from Mar. 2001-Nov. 1, 2002.

Examiner's Answer before the Board of Patent Appeals and Interference received for U.S. Appl. No. 11/461,622, dated Jul. 8, 2011, in response to Apr. 14, 2011 Appeal brief.

FedEx, "FedEx Mobile Ship", Available at: <http://www.fedex.com/us/mobile/label.html,redirected to http://mobilesolutions.fedex.com/shipping-label.html>, Retrieved on Sep. 25, 2013, 2 pages.

"Fedex Improves Internal, External Operations, Frontline Solu-

(56) References Cited

OTHER PUBLICATIONS tions", Available at <www.frintlinemagazine.com/art_th/04052001.htx>, Apr. 5, 2001, pp. 1-2.
"Fedex Insight Empowers Customers with Enhanced Shipment Visibility and Control", El Portal Del Transporte, Apr. 11, 2001, pp. 9-10.
FedEx, "RPS Adds Automated Package Pick-up to Redesigned Web Site", Available at: <www.fedex.com/us/about/ground/pressreleases/pressrelease111198.html?link=4>, Retrieved on Sep. 10, 2003.
Final Office Action received for U.S. Appl. No. 14/472,895, dated Jul. 14, 2015, 24 Pages.
Final Office Action received for U.S. Appl. No. 14/472,895, dated Jun. 28, 2016, 39 Pages.
Final Office Action received for U.S. Appl. No. 14/472,895, dated Mar. 17, 2017, 39 Pages.
Final Office Action received for U.S. Appl. No. 14/472,922, dated Jul. 16, 2015, 27 Pages.
Final Office Action received for U.S. Appl. No. 14/472,922, dated Jun. 27, 2016, 45 Pages.
Final Office Action received for U.S. Appl. No. 14/472,922, dated Mar. 21, 2017, 49 Pages.
Gao et al., "Cyber-Physical-Social Systems: Harnessing the Crowdsourcing Power of Social Media for Disaster Relief", IEEE Intelligent Systems, IEEE Computer Society, 2011, pp. 10-14.
Harrington, Lisa, "The US Postal Service Gets Serious about Serving Business in the New Economy", Transportation & Distribution, vol. 41, No. 5, Penton Publishing, Inc., United States of America, May 2000, p. 2.
Henderson, Timothy, "Buy.com Boosts Returns Process Efficiency with New Solution", ProQuest Info & Learning, vol. 82, No. 11, Nov. 2000, pp. 72-76.
Henderson, Timothy P., "Scheduling Software Helps Webvan Meet 30-Minute Delivery Window, Descartes", Available at: <www.stores.org>, Jul. 2000, 2 pages.
International Search Report and Written Opinion for PCT Patent Application No. PCT/US2011/059511, dated May 2, 2012, 6 pages.
International Search Report and Written Opinion Received for International Application No. PCT/US11/59506, dated Aug. 3, 2012, 8 pages.
International Search Report and Written Opinion received for PCT Patent Application No. PCT/US11/59513, dated Apr. 27, 2012, 5 pages.
International Search Report and Written Opinion received for PCT Patent Application No. PCT/US2011/059504, dated Apr. 24, 2012, 6 Pages.
International Search Report and Written Opinion received for PCT Patent Application No. PCT/US2013/68210, dated May 20, 2014, 7 Pages.
International Search Report and Written Opinion received for PCT Patent Application No. PCT/US2013/68219, dated Feb. 21, 2014, 12 Pages.
International Search Report and Written Opinion received for PCT Patent Application No. PCT/US06/24169 dated May 10, 2007, 5 pages.
International Search Report received for PCT Patent Application No. PCT/US2003/34746, dated Jul. 5, 2005, 1 page.
IPventure, "Schedule Distribution Routes and Timeslots", Available online at: <https://www.ipventure.com/onlineorder/distribution.php>, Retrieved on Apr. 16, 2008, 1 page.
Kihon, Kara Jissen., "Made Business Seikou No Tameno Kanpeki Guide—How To E-Commerce", p. 60.
Lindsay, Bruce R., "Congressional Research Service, Social Media and Disasters: Current Uses, Future Options, and Policy Considerations", CRS Report for Congress, Congressional Research Service., Sep. 6, 2011, 10 pages.
"Many Happy Returns—UPS Unveils Advanced Outline Returns Solution", Business Wire, Sep. 20, 2000.
Non-Final Office Action received for U.S. Appl. No. 14/472,895 , dated Feb. 9, 2015, 21 Pages.
Non-Final Office Action received for U.S. Appl. No. 14/472,895, dated Feb. 1, 2016, 23 Pages.
Non-Final Office Action received for U.S. Appl. No. 14/472,895, dated Nov. 17, 2016, 42 Pages.
Non-Final Office Action received for U.S. Appl. No. 14/472,922, dated Feb. 2, 2016, 29 Pages.
Non-Final Office Action received for U.S. Appl. No. 14/472,922, dated Mar. 3, 2015, 27 Pages.
Non-Final Office Action received for U.S. Appl. No. 14/472,922, dated Oct. 17, 2016, 50 Pages.
Notice of Allowance received for U.S. Appl. No. 14/472,895, dated Feb. 28, 2019, 8 pages.
"Outlook 2000 Handbook First Edition", last 9 lines, p. 95.
Pender, Lee, "Hard Times are the Best Times", Magazine, Cio, Available at: <www.cio.com/archive/081501/besttimes_content.html>, Aug. 15, 2001, pp. 3-7.
Raco Industries, "Increase Delivery Visibility And Simplify Your Process", Available at: <http://www.racointeractive.com/media/834/raco_interactive-pd.pdf>, Retrieved on Sep. 25, 2013, 2 pages.
Supplemental Notice of Allowance received for U.S. Appl. No. 14/472,895, dated Jun. 7, 2019, 05 pages.
Van Huzien, Gordon, "Messaging: The Transport Part of The XML Puzzle", IBM Developer Works, Article, Retrieved from: <URL:http://www-106.ibm.com/developerworks/library/xml-messaging/>, Jul. 2000, 8 pages.

\* cited by examiner

SYSTEMS, METHODS, AND COMPUTER PROGRAM PRODUCTS FOR PROVIDING CUSTOMIZED COMMUNICATION CONTENT IN CONJUNCTION WITH TRANSPORT OF A PLURALITY OF PACKAGES

CROSS-REFERENCE TO RELATED APPLICATIONS

This application is a continuation of, and claims priority from, U.S. patent application Ser. No. 14/472,895, filed on Aug. 29, 2014, entitled "Systems, Methods, and Computer Program Products for Providing Customized Communication Content in Conjunction with Transport of a Plurality of Packages," which claims the benefit of U.S. Provisional Application No. 61/872,033, filed Aug. 30, 2013, both of which are hereby expressly incorporated by reference in their entireties.

BACKGROUND

Shipping customers are increasing their expectations regarding various delivery services. Thus, new concepts are needed to enhance customer experience and loyalty by improving the delivery experience.

BRIEF SUMMARY

According to various embodiments, a system for providing at least one customized communication to a recipient of one or more packages shipped by a consignor via a common carrier is provided. The system comprises: one or more memory storage areas containing at least consignor data associated with the consignor and an account established thereby with the common carrier, and consignee data associated with the recipient of the one or more packages shipped by the consignor; and one or more computer processors. The one or more computer processors are configured to: receive at least a portion of customized content, the portion comprising one or more components associated with at least one request for the provision of customized content to the recipient of the one or more packages shipped by the consignor; retrieve at least a portion of the consignee data, the portion comprising one or more parameters established by the recipient, the one or more parameters being indicative of one or more general preferences of the recipient for receipt of customized content; compare the one or more components of the customized content with the one or more parameters established by the recipient so as to identify one or more correlations there-between; in response to identifying at least one correlation between the one or more components and the one or more parameters, based at least in part thereon, generate at least one customized communication for provision to the recipient, the at least one customized communication containing thereon at least a portion of the customized content; and in response to identifying no correlations between the one or more components and the one or more parameters, based at least in part thereon, generate at least one standard communication for provision to the recipient, the at least one standard communication containing thereon no customized content.

According to various embodiments, a computer-implemented method for providing at least one customized communication to a recipient of one or more packages shipped by a consignor via a common carrier is provided. The method comprises the steps of: receiving and storing within one or more memory storage areas consignor data associated with the consignor and an account established thereby with the common carrier, and consignee data associated with the recipient of the one or more packages shipped by the consignor; receiving at least a portion of customized content, the portion comprising one or more components associated with at least one request for the provision of customized content to the recipient of the one or more packages shipped by the consignor; retrieving, via at least one computer processor, at least a portion of the consignee data, the portion comprising one or more parameters established by the recipient, the one or more parameters being indicative of one or more general preferences of the recipient for receipt of customized content; comparing, via the at least one computer processor, the one or more components of the customized content with the one or more parameters established by the recipient so as to identify one or more correlations there-between; in response to identifying at least one correlation between the one or more components and the one or more parameters, based at least in part thereon, generating, via the at least one computer processor, at least one customized communication for provision to the recipient, the at least one customized communication containing thereon at least a portion of the customized content; and in response to identifying no correlations between the one or more components and the one or more parameters, based at least in part thereon, generating, via the at least one computer processor, at least one standard communication for provision to the recipient, the at least one standard communication containing thereon no customized content.

According to various embodiments, a non-transitory computer program product comprising at least one computer-readable storage medium having computer-readable program code portions embodied therein is provided. The computer-readable program code portions comprise: an executable portion configured for receiving a plurality of data, wherein the data comprises consignor data associated with the consignor and an account established thereby with the common carrier, and consignee data associated with the recipient of the one or more packages shipped by the consignor; an executable portion configured for receiving at least a portion of customized content, the portion comprising one or more components associated with at least one request for the provision of customized content to the recipient of the one or more packages shipped by the consignor and for retrieving at least a portion of the consignee data, the portion comprising one or more parameters established by the recipient, the one or more parameters being indicative of one or more general preferences of the recipient for receipt of customized content; an executable portion configured for comparing the one or more components of the customized content with the one or more parameters established by the recipient so as to identify one or more correlations there-between; an executable portion configured for, in response to identifying at least one correlation between the one or more components and the one or more parameters and based at least in part thereon, generating at least one customized communication for provision to the recipient, the at least one customized communication containing thereon at least a portion of the customized content; and an executable portion configured for, in response to identifying no correlations between the one or more components and the one or more parameters and based at least in part thereon, generating at least one standard communication for provision to the recipient, the at least one standard communication containing thereon no customized content.

According to various embodiments of the present invention, a system for providing a customized content exchange platform between a third party and a consignor shipping one or more packages to one or more consignees is provided. The system comprises one or more memory storage areas containing at least: consignor data associated with the consignor, the consignor data comprising at least one or more consignor-defined parameters; third party data associated with the third party, the third party data comprising at least one or more third-party defined parameters; and consignee data associated with the one or more consignees, the consignee data comprising at least one or more consignee-defined parameters. Within the system, one or more computer processors configured to: receive at least a portion of customized content from the third party, the portion comprising one or more components associated with at least one request for the provision of customized content to one or more of the consignees in conjunction with shipment of one or more products associated with the third party by the consignor and to the one or more consignees; compare the one or more components of the received portion of customized content with at least the one or more consignor-defined parameters so as to identify one or more correlations there-between; in response to identifying at least one correlation between the one or more components and the one or more consignor-defined parameters, generate a match notification, the match notification being indicative of potential placement of the customized content upon a communication associated with the one or more packages; and based at least in part upon approval of the match notification by the consignor, generate at least one customized communication for potential provision to the consignee, the at least one customized communication containing thereon at least a portion of the customized content provided by the third party.

According to various embodiments of the present invention, a computer-implemented method for providing at least one customized communication to a recipient of one or more packages shipped by a consignor via a common carrier is provided. The method comprises the step of receiving and storing within one or more memory storage areas: consignor data associated with the consignor, the consignor data comprising at least one or more consignor-defined parameters; third party data associated with the third party, the third party data comprising at least one or more third-party defined parameters; and consignee data associated with the one or more consignees, the consignee data comprising at least one or more consignee-defined parameters. The method also comprises the steps of: receiving at least a portion of customized content from the third party, the portion comprising one or more components associated with at least one request for the provision of customized content to one or more of the consignees in conjunction with shipment of one or more products associated with the third party by the consignor and to the one or more consignees; comparing, via one or more computer processors, the one or more components of the received portion of customized content with at least the one or more consignor-defined parameters so as to identify one or more correlations there-between; in response to identifying at least one correlation between the one or more components and the one or more consignor-defined parameters, generating, via the one or more computer processors, a match notification, the match notification being indicative of potential placement of the customized content upon a communication associated with the one or more packages; and based at least in part upon approval of the match notification by the consignor, generating, via the one or more computer processors, at least one customized communication for potential provision to the consignee, the at least one customized communication containing thereon at least a portion of the customized content provided by the third party.

According to various embodiments of the present invention, a non-transitory computer program product comprising at least one computer-readable storage medium having computer-readable program code portions embodied therein is provided. The computer-readable program code portions comprise: an executable portion configured for receiving a plurality of data, wherein the data comprises consignor data associated with the consignor and an account established thereby with the common carrier, and consignee data associated with the recipient of the one or more packages shipped by the consignor; an executable portion configured for receiving at least a portion of customized content, the portion comprising one or more components associated with at least one request for the provision of customized content to the recipient of the one or more packages shipped by the consignor and for retrieving at least a portion of the consignee data, the portion comprising one or more parameters established by the recipient, the one or more parameters being indicative of one or more general preferences of the recipient for receipt of customized content; an executable portion configured for comparing the one or more components of the customized content with the one or more parameters established by the recipient so as to identify one or more correlations there-between; an executable portion configured for, in response to identifying at least one correlation between the one or more components and the one or more parameters and based at least in part thereon, generating at least one customized communication for provision to the recipient, the at least one customized communication containing thereon at least a portion of the customized content; and an executable portion configured for, in response to identifying no correlations between the one or more components and the one or more parameters and based at least in part thereon, generating at least one standard communication for provision to the recipient, the at least one standard communication containing thereon no customized content.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 2A:
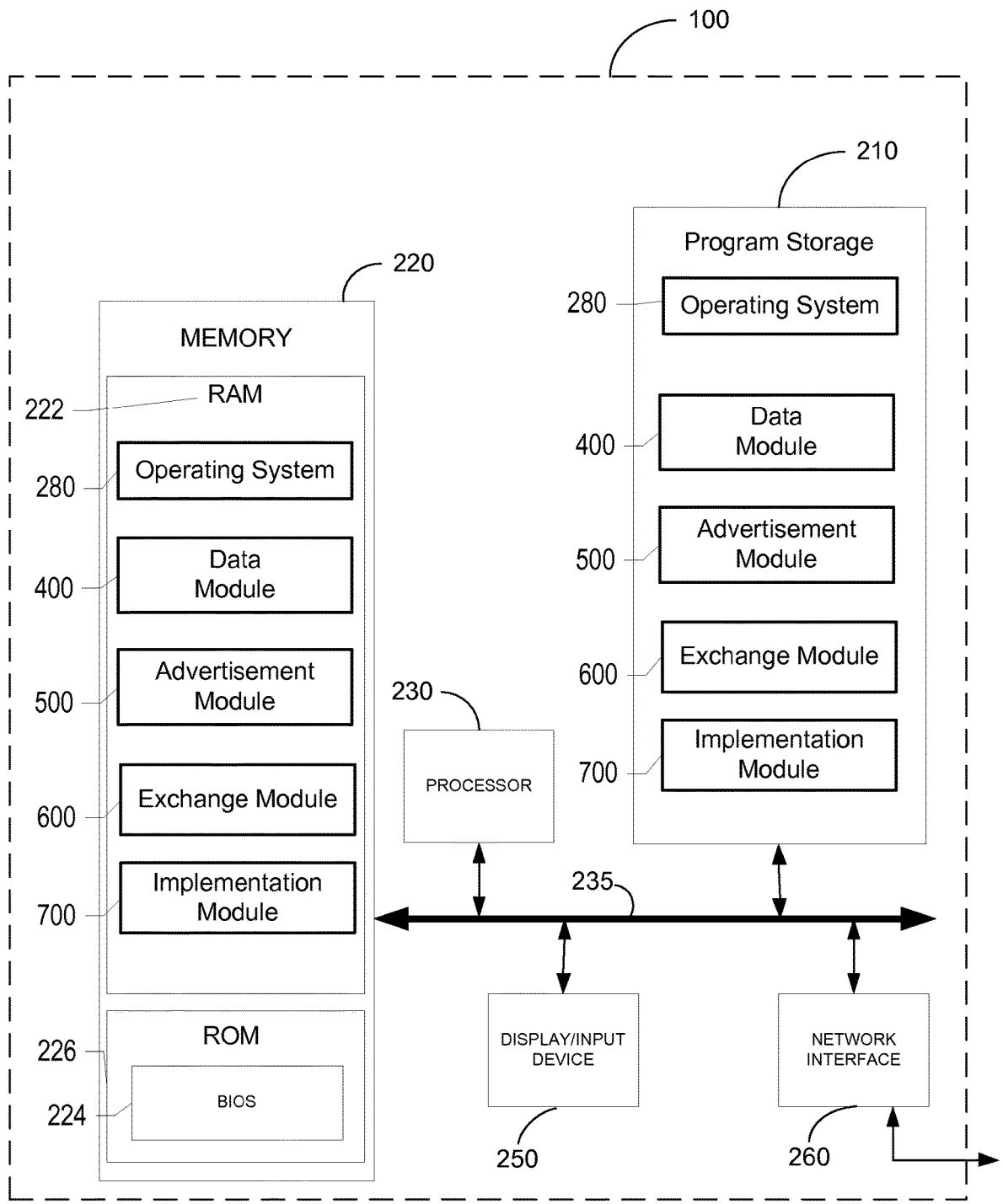
FIG. 2A is an exemplary schematic diagram of a carrier system 100 according to various embodiments of the present invention.
Figure 3:
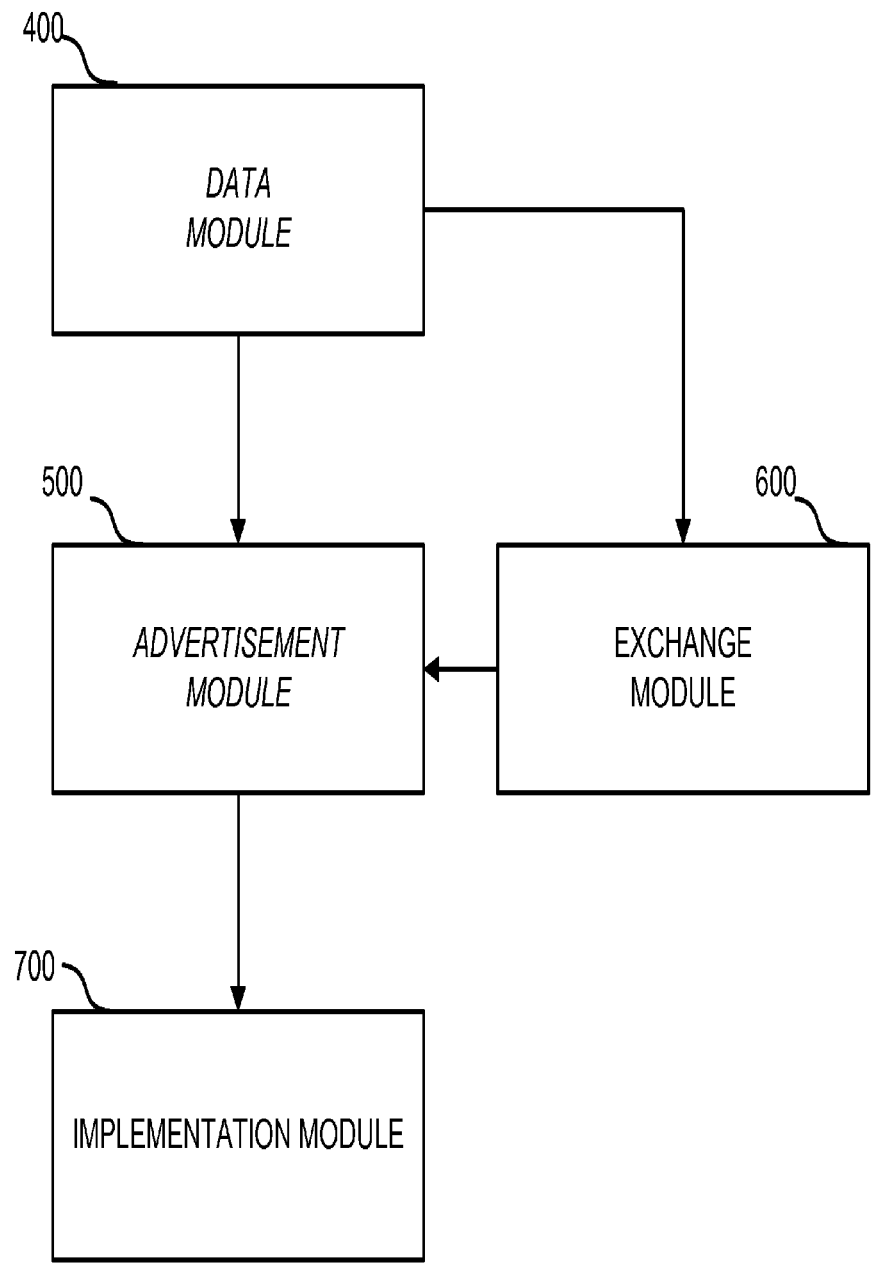
FIG. 3 illustrates an overall process flow for various modules of the carrier system 100 according to various embodiments of the present invention.
Figure 5:
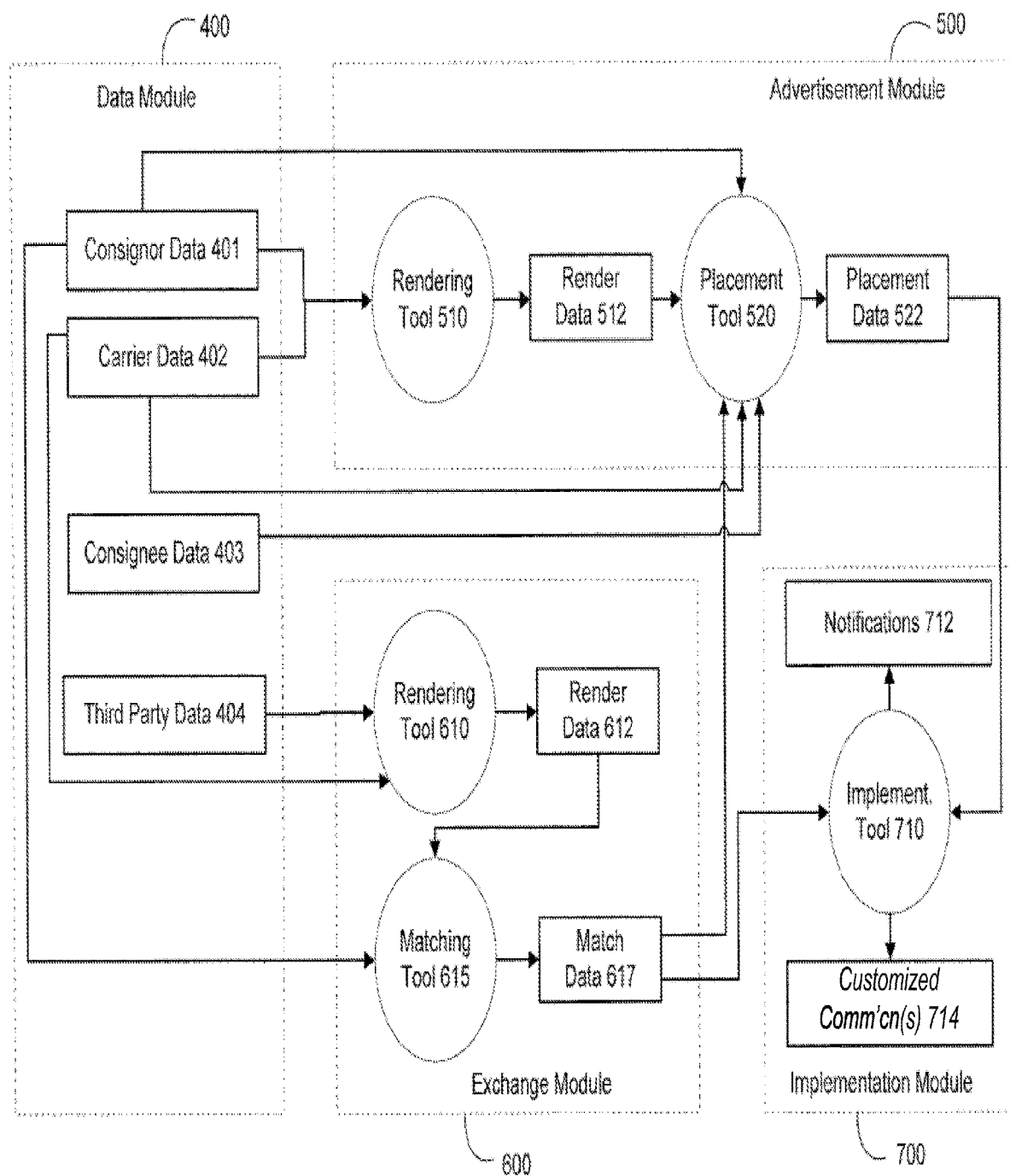
Figure 6:
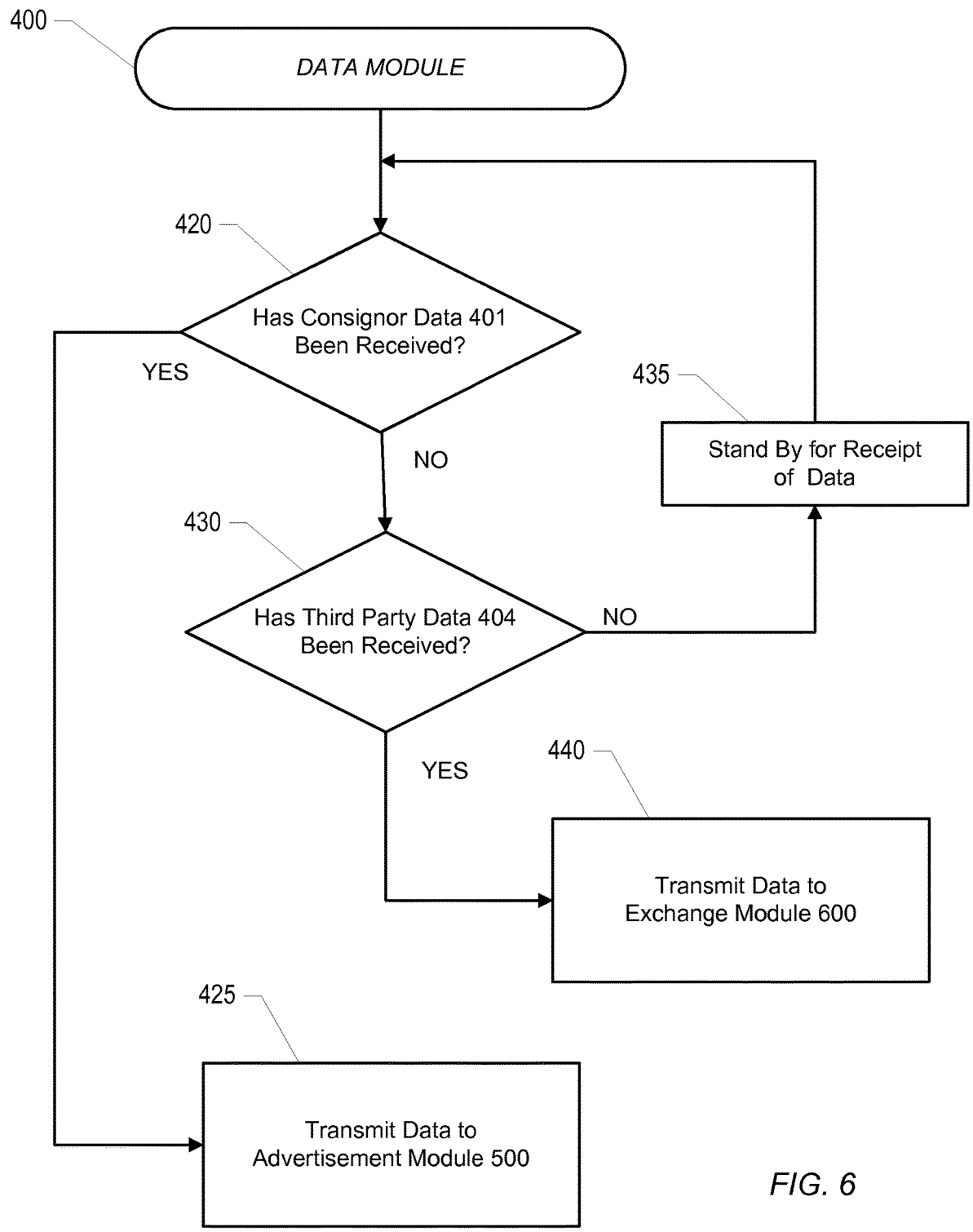
Figure 7:
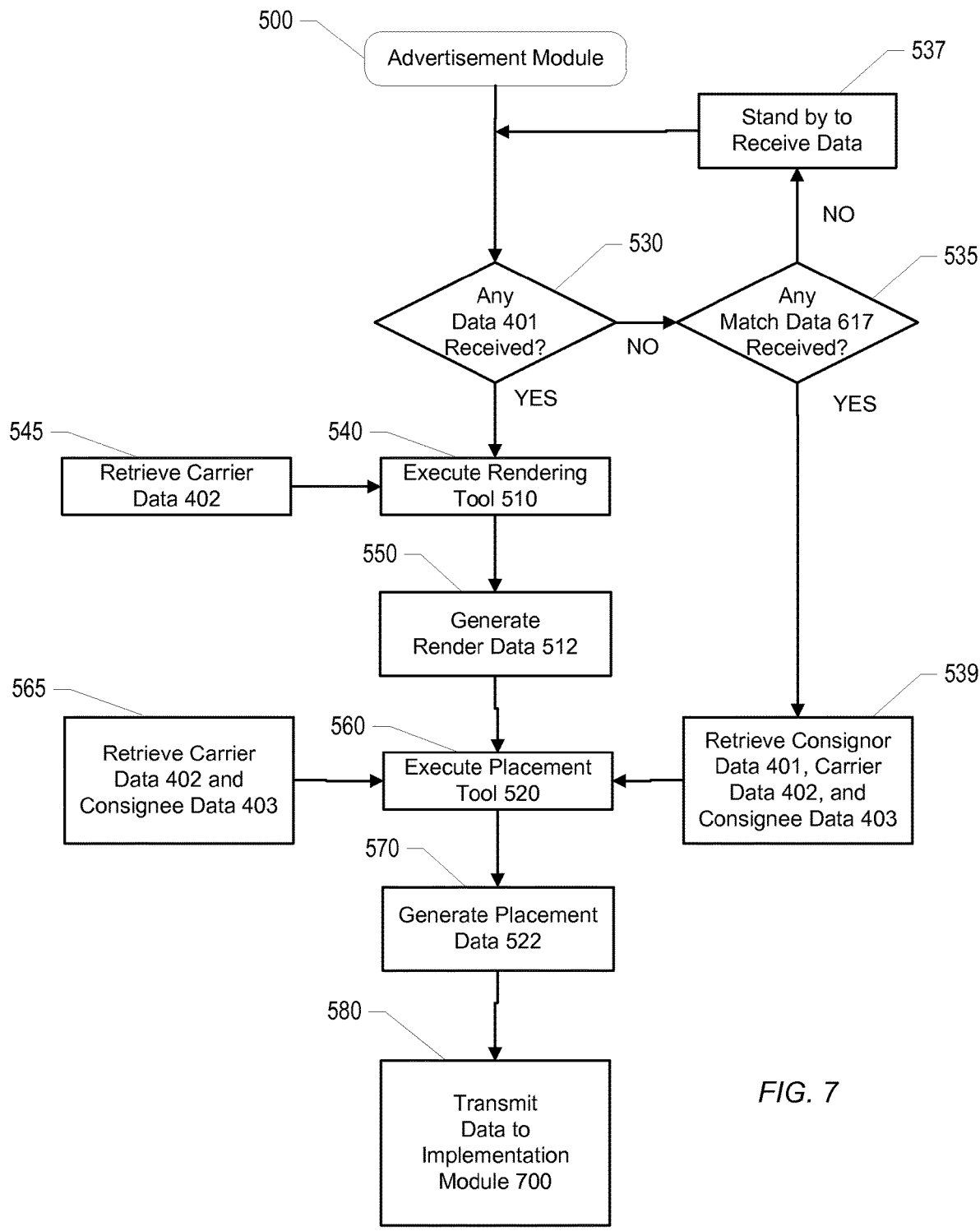
Figure 8:
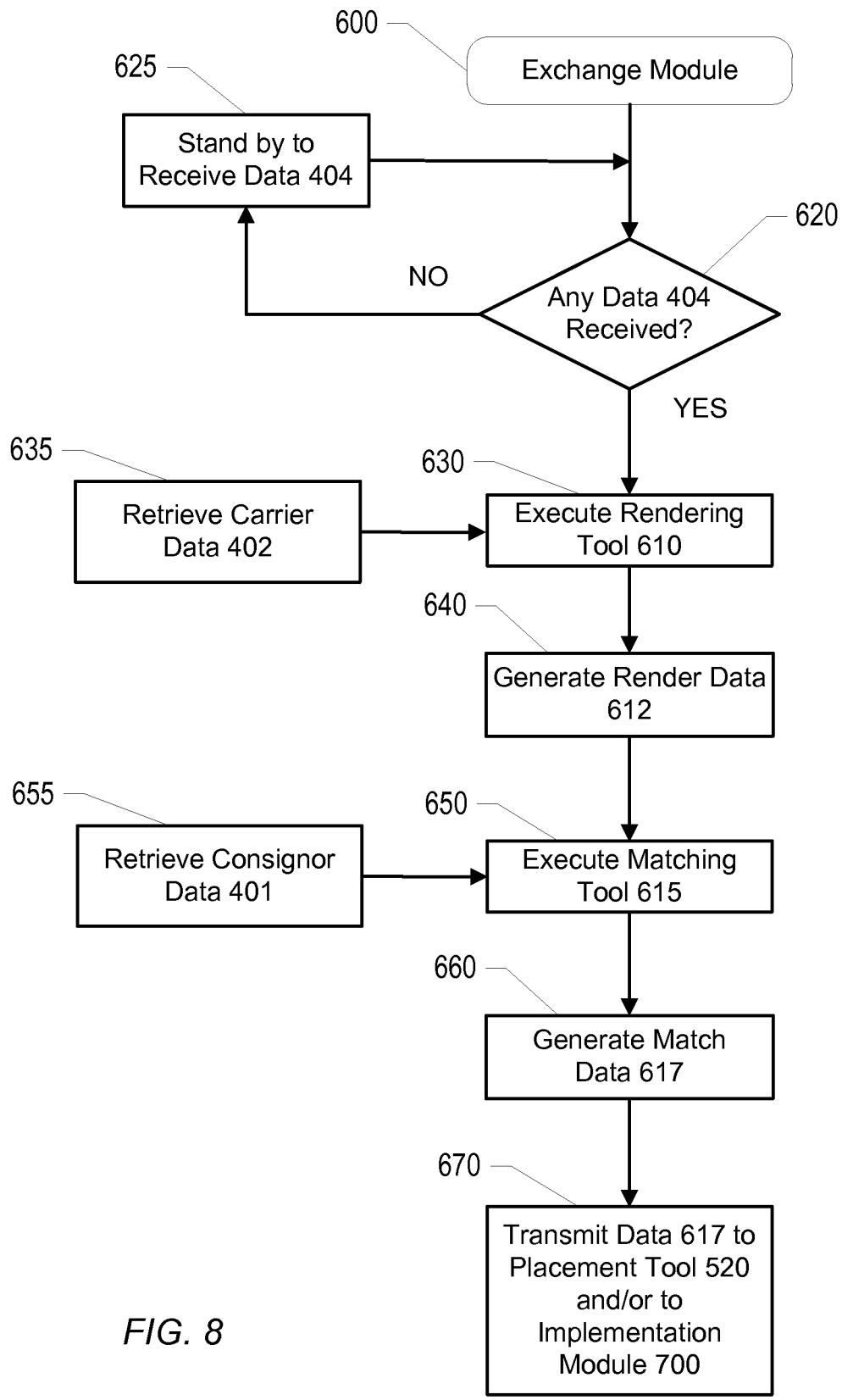
Figure 9:
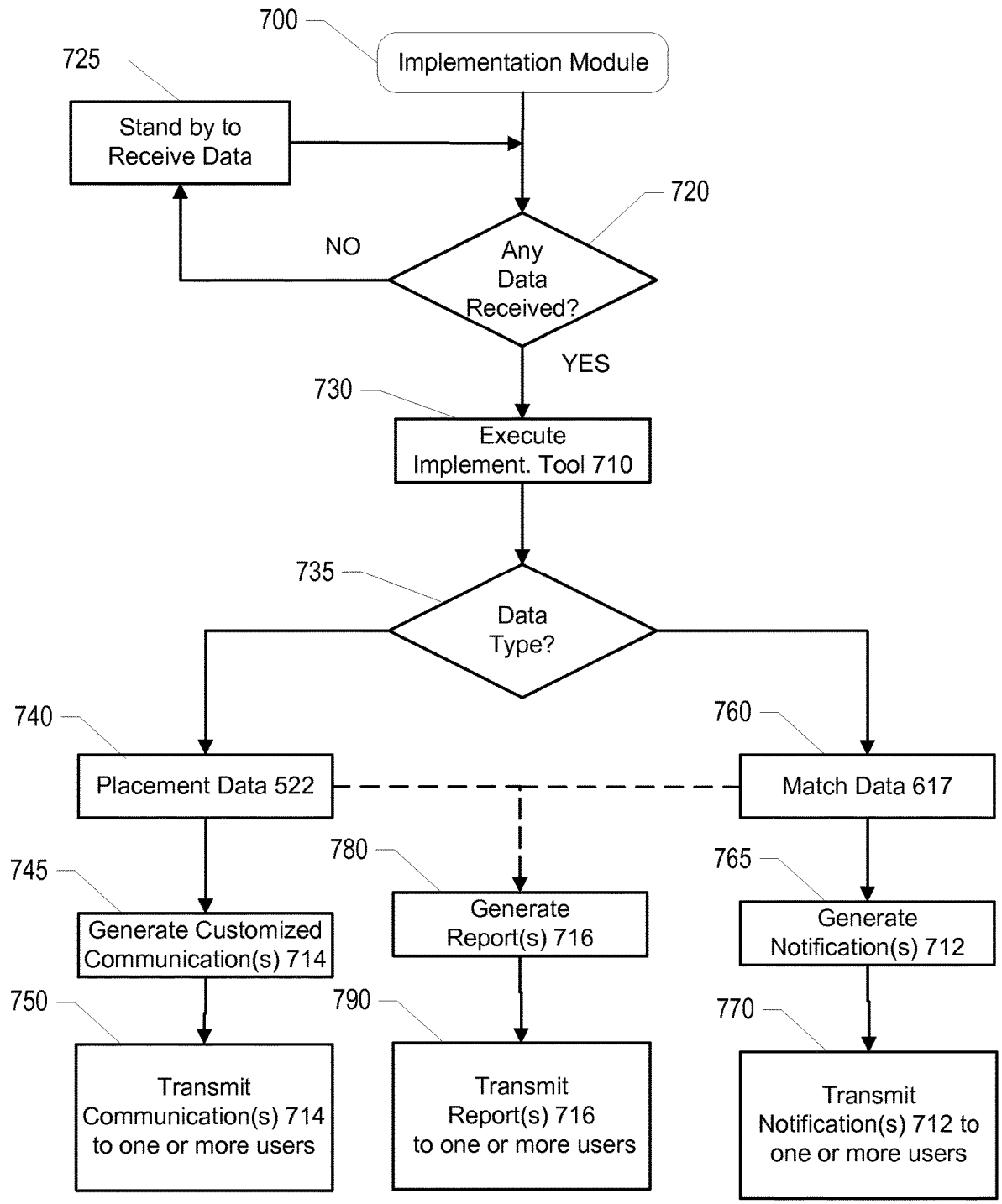
Figure 12:
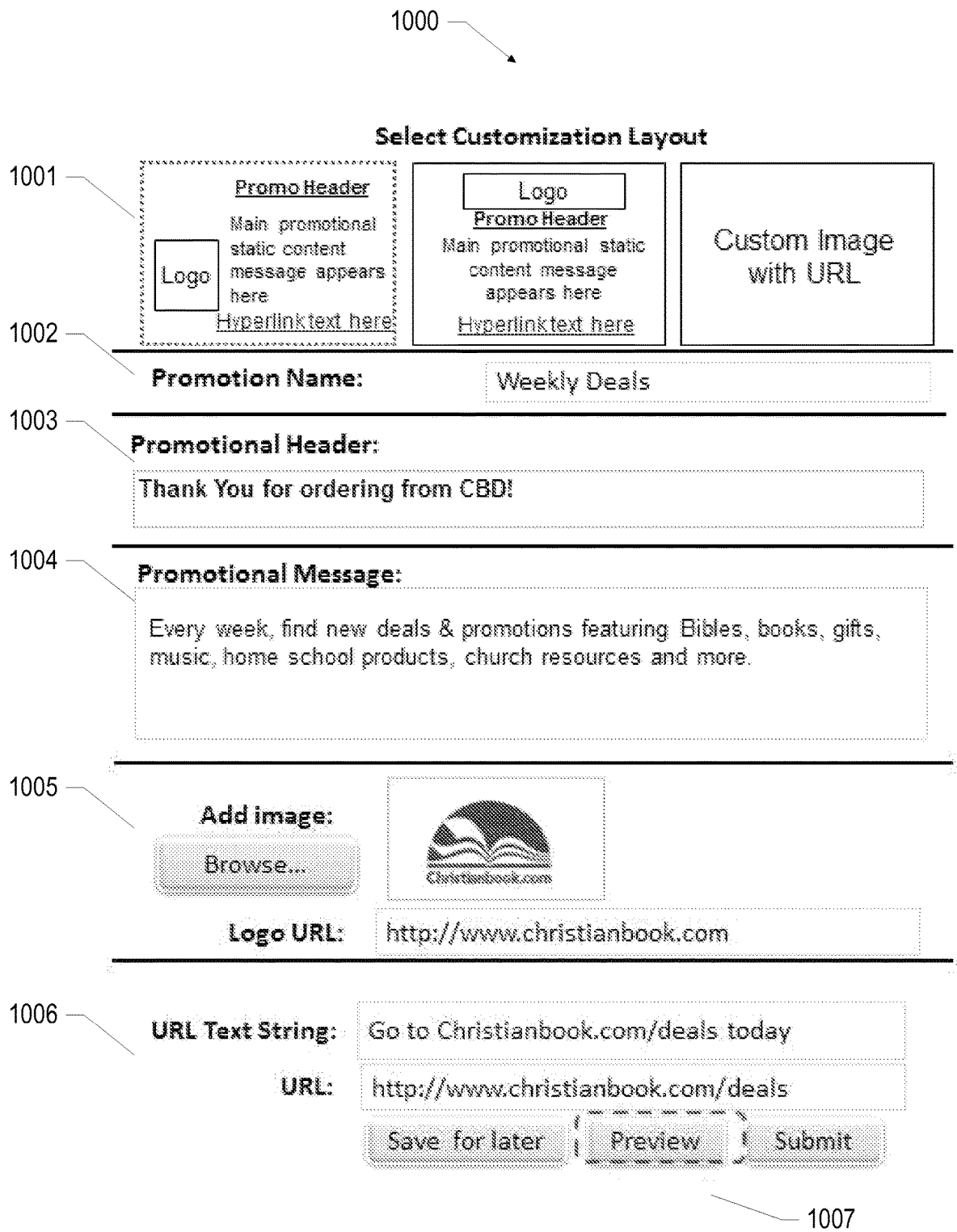
Figure 13:
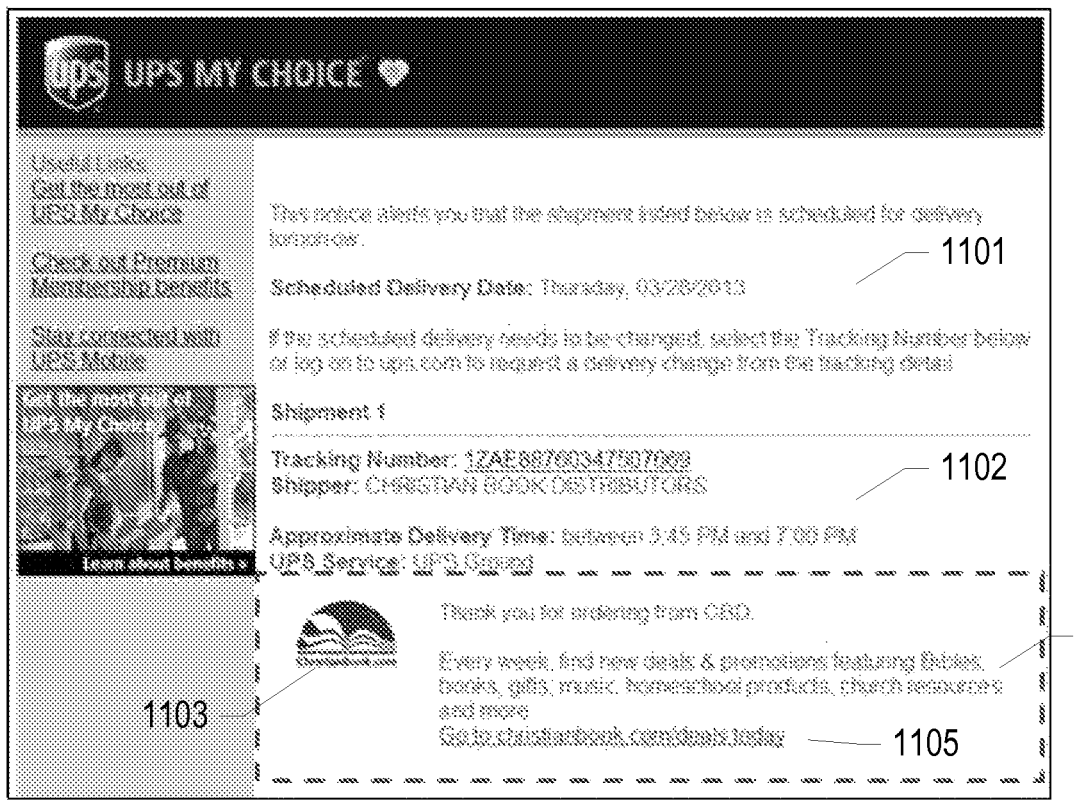
Figure 14:
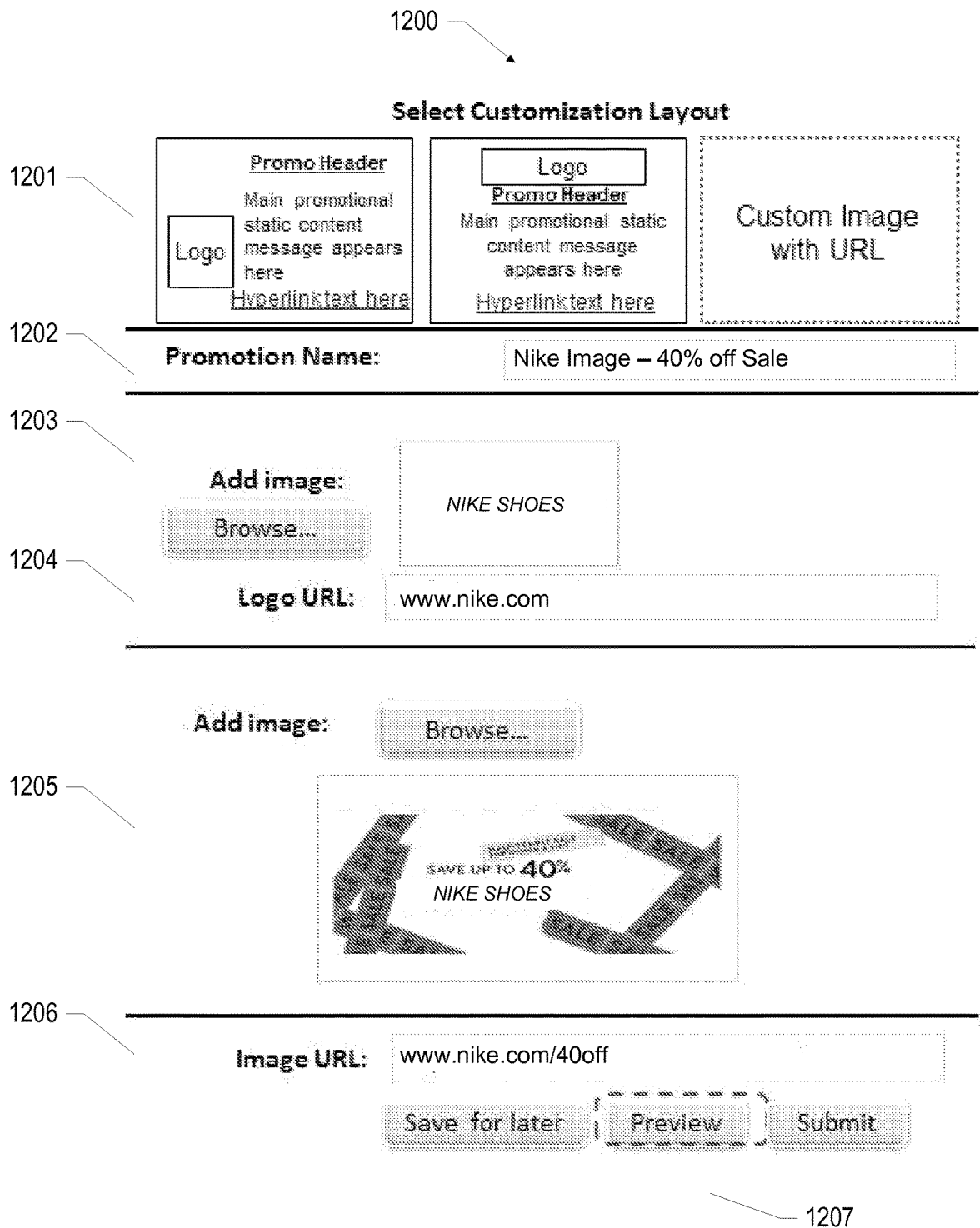
Figure 15:
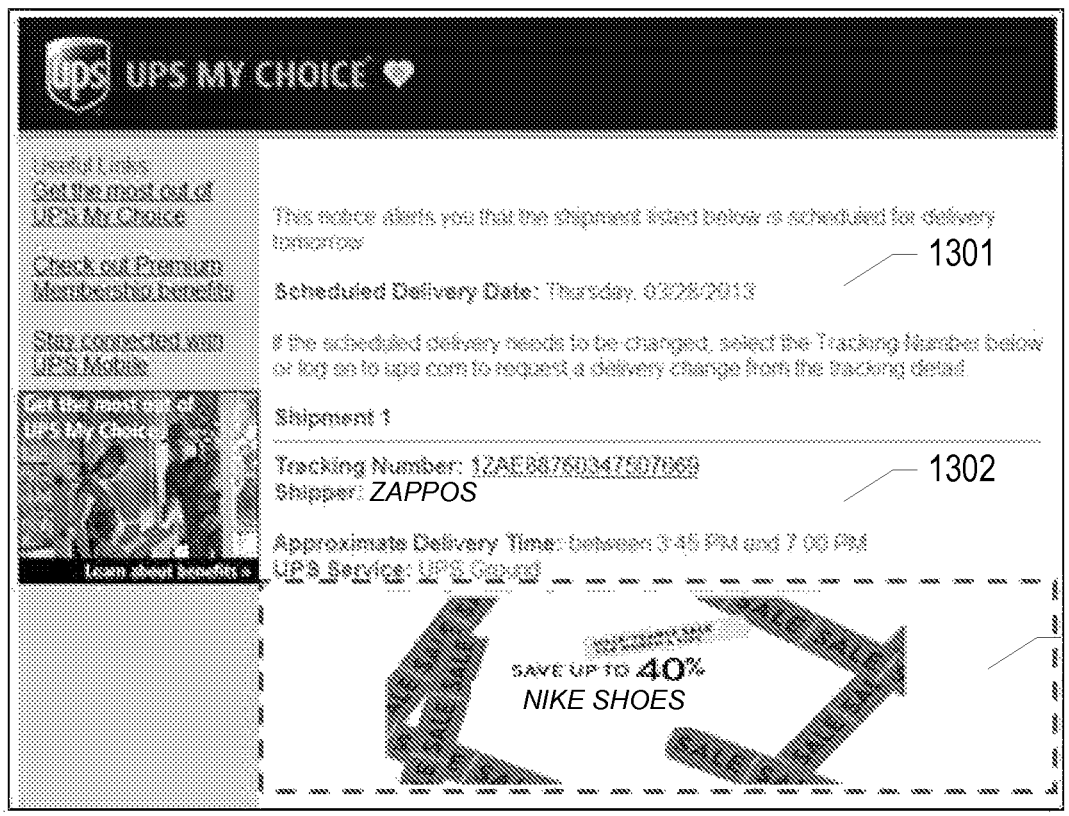
Figure 16:
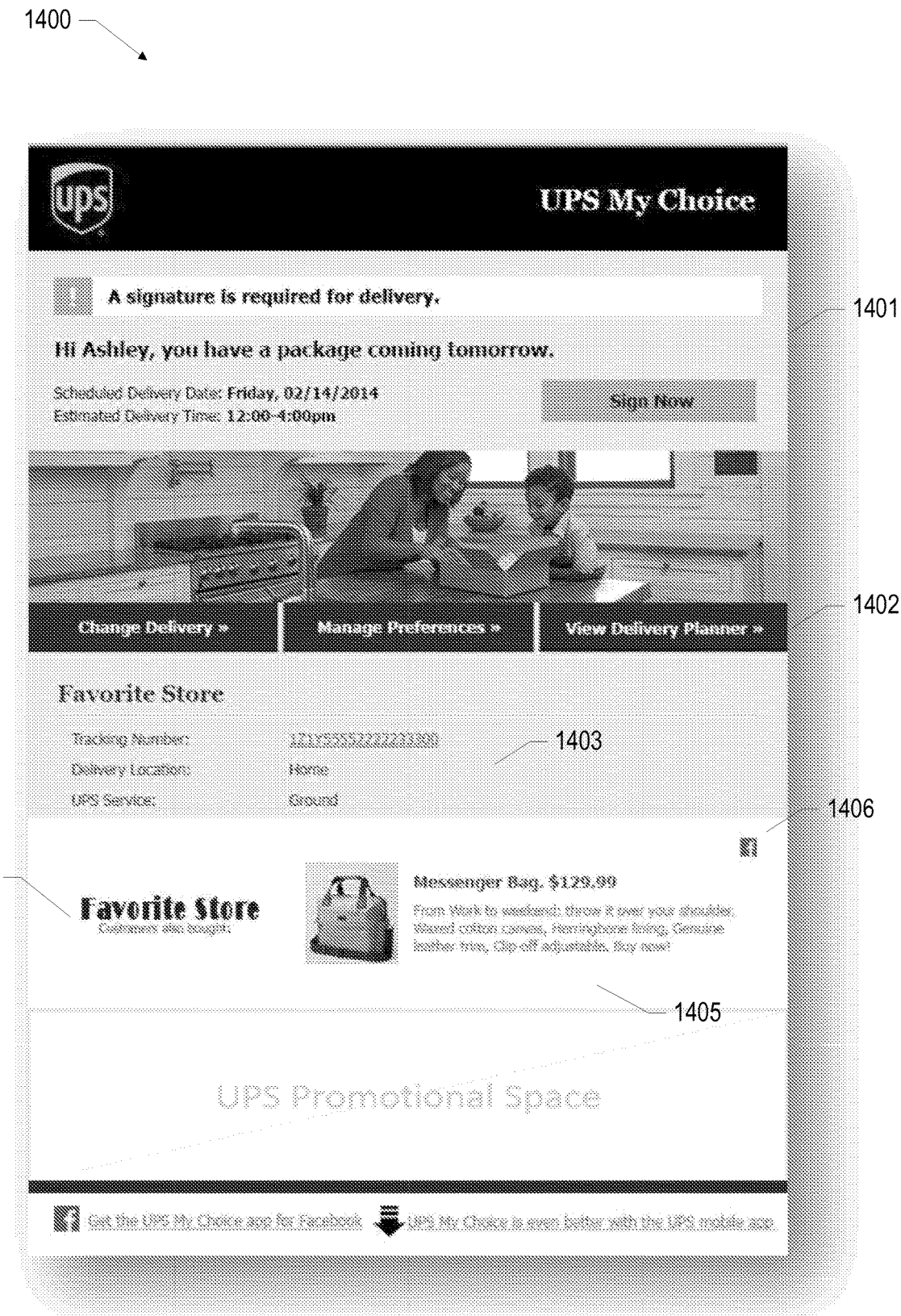
Figure 17:
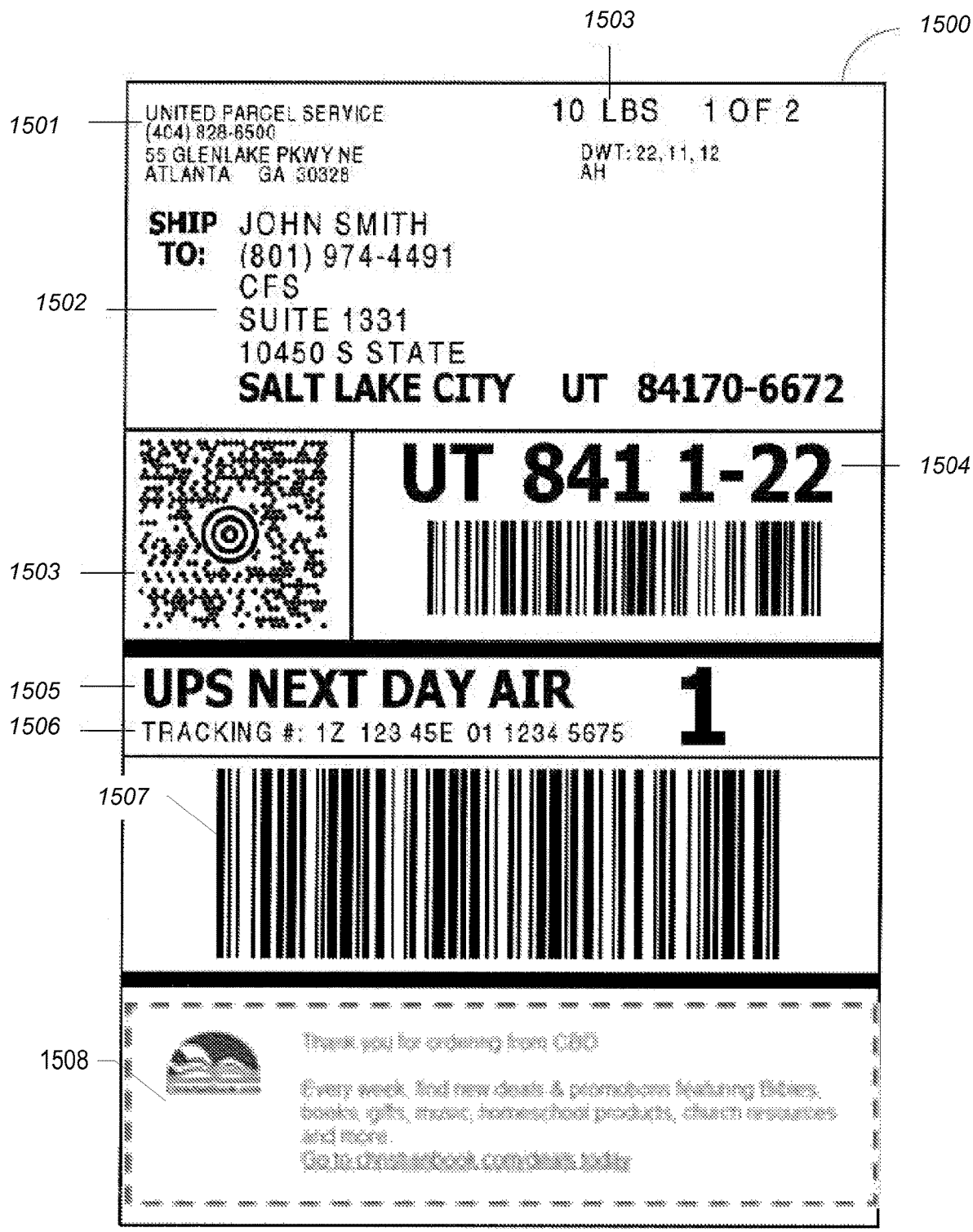

FIG. 5 is a schematic block diagram of a data module 400, an advertisement module 500, an exchange module 600, and an implementation module 700, all as also illustrated in FIGS. 2A and 3 according to various embodiments of the present invention;

FIG. 6 illustrates an exemplary process flow according to various embodiments for the data module 400 shown in FIGS. 2A and 5;

FIG. 7 illustrates an exemplary process flow according to various embodiments for the advertisement module 500 shown in FIGS. 2A and 5;

FIG. 8 illustrates an exemplary process flow according to various embodiments for the exchange module 600 shown in FIGS. 2A and 5;

FIG. 9 illustrates an exemplary process flow according to various embodiments for the implementation module 700 shown in FIGS. 2A and 5;

FIG. 10 illustrates an exemplary user registration interface 800 according to various embodiments of the carrier system 100 shown in FIG. 2A;

FIG. 11 illustrates an exemplary registered user interface 900 according to various embodiments of the carrier system 100 shown in FIG. 2A;

FIG. 12 illustrates an exemplary consignor advertisement customization layout interface 1000 according to various embodiments of the carrier system 100 shown in FIG. 2A;

FIG. 13 illustrates an exemplary consignor advertisement rendering interface 1100 according to various embodiments of the carrier system 100 shown in FIG. 2A;

FIG. 14 illustrates an exemplary third party advertisement customization layout interface 1200 according to various embodiments of the carrier system 100 shown in FIG. 2A;

FIG. 15 illustrates an exemplary third party advertisement rendering interface 1300 according to various embodiments of the carrier system 100 shown in FIG. 2A;

FIG. 16 illustrates an exemplary customized alert or message 1400 receivable by a consignee and containing a consignor (or third party) advertisement thereon, as may be provided according to various embodiments of the carrier system 100 shown in FIG. 2A; and FIG. 17 illustrates an exemplary customized package label 1500 containing a consignor (or third party) advertisement thereon, as may be provided according to various embodiments of the carrier system 100 shown in FIG. 2A.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

The term "advertisement" is used generally throughout herein; however, it should be understood that the use thereof should not be construed as limited to conventionally understood types of advertisements. Indeed, it should be understood that "advertisement" may refer to any sort of "customized content" or "customized messaging," which may include the non-limiting examples such as advertisements, messages, promotional materials, product warranty information, general product information or instructions, safety recall notices, safety sheets, safety information, return instructions, information identifying a nearest drop-off location, and the like. In other words, the term "advertisement," where used herein should be considered interchangeable with the much more broadly construed terms "customized content" or "customized messaging."

Generally speaking, various embodiments are configured to provide tools within systems, methods, and computer program products for providing customized advertisements within messages provided to one or more users thereof. In certain embodiments, the users receiving the messages and the customized advertisements contained therein are consignees expecting a shipment from one or more consignors. In these and other embodiments, the notifications or messages may be customized in various manners, including the incorporation therein of one or more advertisements, which may originate with the consignor or with an external third party entity, transmitted to the consignee via the consignor.

As a non-limiting example, according to various embodiments, a common carrier provider (e.g., a carrier, such as UPS, Amazon, Uber, or the like) may provide a service that allows a consignor (i.e., a shipper) to identify types of messages to be sent to a consignee (i.e., a recipient) when certain triggering events occur. Triggering events may be routine tracking status updates or exception reports, such as an indication that delivery will be later than previously expected. The messages may include not only such tracking data, but also audio data, image data, and/or video data associated with one or more advertisements, however as may be provided via the consignor (or via an external third part via the consignor). In some instances, the messages may include a hyperlink or other pathway link to the audio, image, and/or video advertisement-oriented files, which may be stored on the carrier, consignor, or one or more external third party computer systems.

The advertisement data may also be embedded within the message, as opposed to being accessible only via a link thereon. In still other embodiments, the advertisement data may be placed upon labels on packages being shipped, in addition to or as an alternative to placement of such data within customized messages or notifications transmitted to the consignee during transport of the packages. In certain embodiments, as will be described elsewhere herein, the advertisement data, whether located within customized messages or on a package label, may be accessible only via one or more barcodes and/or other auto-identification or machine-readable symbols, within which the advertisement data may be embedded and/or otherwise encoded.

Non-limited advantages of the capabilities provided via the configurations described herein in this regard include the functionality of enabling consignors and/or third parties to dynamically create "customized" communications to be inserted into various alerts, emails, texts, videos, audio files, package labels, barcodes, package tracking numbers, and the like. Consignors, third parties, and consignees will all be able to, via the system described herein, established one or more pre-determined parameters, based at least in part upon which the configuration of the "customized" communications will be determined. In this manner, communications received by the consignees may be extensively customized, by all party users of the system, with respect to not only fonts, images, audio formats, video formats, and/or graphical formats, but also with respect to the timing and nature of the communications themselves. The communications may be seamlessly managed via the system described herein, based at least in part upon a variety of parameters applicable to the consignor, consignee, and/or third party, however as may be applicable.

Via the advertisement exchange feature provided according to certain embodiments described herein, non-limiting advantages include a method to facilitate third party creation of a "customized" message "work product" to be reviewed and/or accepted by a consignor. In this regard, in certain embodiments, the third parties may submit requests for customized work product to be reviewed and/or inserted by a consignor into package transit (e.g., alert, label, or the like) data generated in conjunction with transport of one or more packages shipped by the consignor to one or more consignees. A "matching" feature may also be provided, such that the system may automatically (or at least semi-automatically, for example, pending approval by one or more users of various actions prior to the commencement thereof) "match" third party work product with one or more consignors based upon one or more parameters, which may include the non-limiting examples of industry type and/or product type. Via the "matching" feature, various submitted third party work products may be ranked and assigned a value based on but not limited to parameters such as: availability, number of "work product" requests, popularity of the product, type of product, previous shipping history of the product to the consignee, and the like). In this manner, consignors may prioritize third party work product requests (whether manually or automatically based upon still further pre-established parameters) so as to accept those submissions with the highest value first or otherwise, however, as may be desirable.

It should be noted that an additional and non-limiting advantage of the customized content/messaging (i.e., advertisement) exchange feature includes the ability for consignors to receive unsolicited advertising requests from third parties for such content to be customizably placed upon physical packages being shipped by the consignor to one or more consignees and/or to be customizably inserted within one or more alerts transmitted to the consignee during the transport and delivery of the physical packages. According to certain embodiments, the common carrier provider, who may facilitate the carrier system 100 providing these and still other advantages and features, may impose a fee upon third parties and/or upon consignors for provision of these features and the advantages associated therewith, again as may be desirable in particular scenarios.

Further details with regard to these complementary concepts, both with respect to the placement of customized advertisements within messages and/or notifications and/or on package labels received by consignees during the transport and delivery of one or more packages and with respect to the provision of a platform to match external third party entities wishing to advertise with consignors shipping one or more packages so as to facilitate advertising via any of the avenues previously mentioned, are provided elsewhere herein.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing entity, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
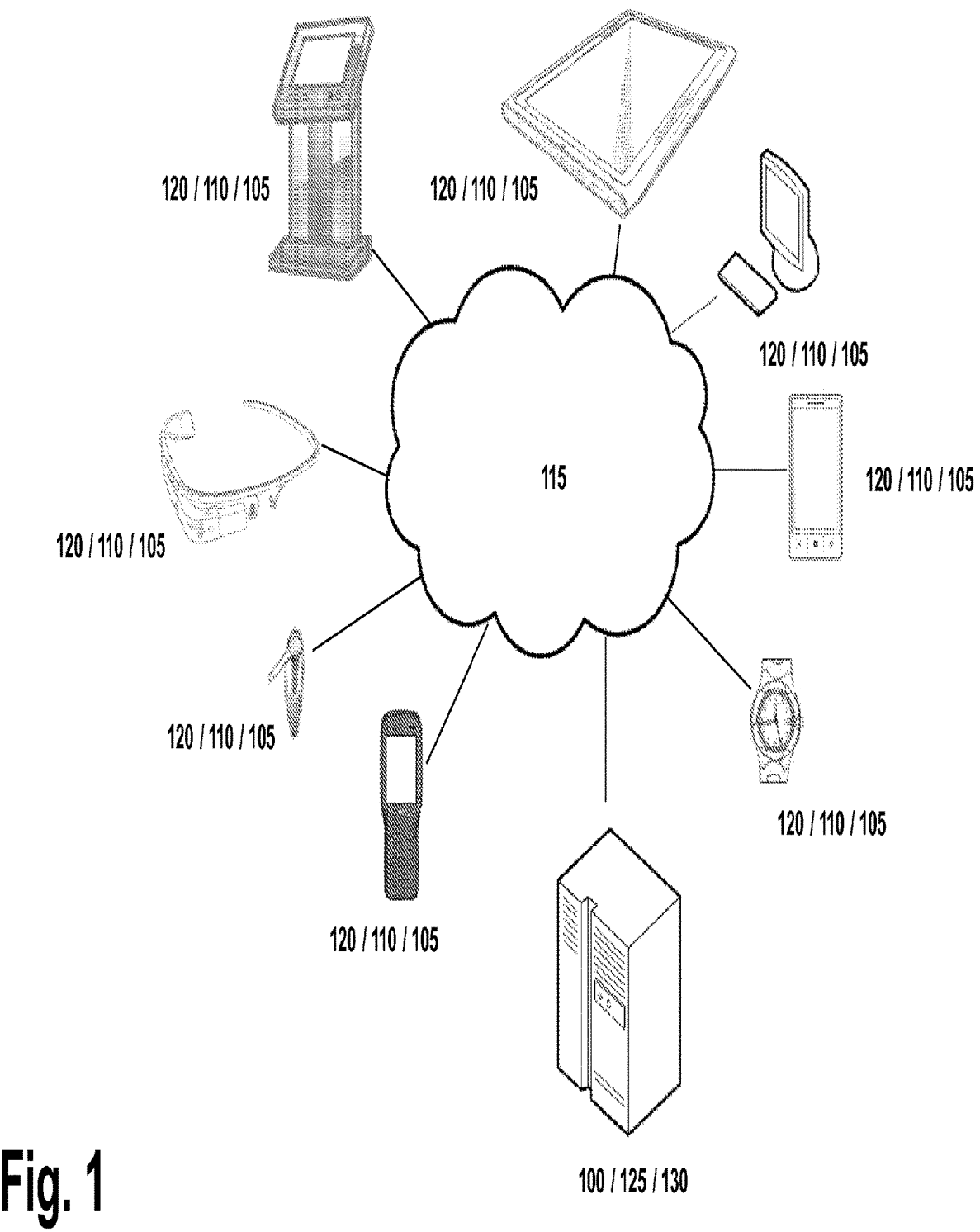
FIG. 1 is an overview of a system that can be used to practice various embodiments of the present invention.

FIG. 1 provides an illustration of a system that can be used in conjunction with various embodiments of the present invention. As shown in FIG. 1, the system may include one or more carrier systems 100, one or more user computing entities 105, one or more consignee computing entities 110, and one or more networks 115, one or more consignor computing entities 120, and one or more external third party entity systems 125. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain communication system entities as separate, standalone entities, the various embodiments are not limited to this particular architecture.

1. Exemplary Carrier System

FIG. 2A provides a schematic of a carrier system 100 according to various embodiments of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

The carrier system 100 may also comprise and/or be in communication with various other carrier systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), an Application Programming Interface (API), and a variety of other systems and their corresponding components. The carrier system 100 may also be in communication with various payment networks/systems for carrying out or facilitating the payment of fees. As will be recognized, the payment of such fees may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like.

As shown in FIG. 2A, according to various embodiments, the carrier system 100 may include or be in communication with one or more processing elements 230 (also referred to as processors, processing circuitry, and/or similar terms used herein interchangeably) that communicate with other elements within the carrier system 100 via a system interface or a bus 235, for example. Also included in the carrier system 100 is a display/input device 250 for receiving and displaying data. This display/input device 250 may be, for example, a keyboard or pointing device that is used in combination with a monitor. The carrier system 100 further includes memory 220, which preferably includes both read only memory (ROM) 226 and random access memory (RAM) 222. The system's ROM 226 is used to store a basic input/output system 224 (BIOS), containing the basic routines that help to transfer information between elements within the carrier's system 100. Various ROM and RAM configurations have been previously described herein.

According to various embodiments, the processing element or processor 230 may be embodied in a number of different ways. For example, the processing element 230 may be embodied as one or more complex programmable logic devices (CPLDs), microprocessors, multi-core processors, co-processing entities, application-specific instruction-set processors (ASIPs), microcontrollers, and/or controllers. Further, the processing element or processor 230 may be embodied as one or more other processing devices or circuitry. The term circuitry may refer to an entirely hardware embodiment or a combination of hardware and computer program products. Thus, the processing element 230 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 230 may be configured for a particular use or configured to execute instructions stored in volatile or non-volatile media or otherwise accessible to the processing element. As such, whether configured by hardware or computer program products, or by a combination thereof, the processing element 230 may be capable of performing steps or operations according to embodiments of the present invention when configured accordingly.

In addition, the carrier system 100 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the carrier system 100 may further provide the functions of a data storage device, which may store historical and/or current delivery data and delivery conditions that may be accessed by the carrier system. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processing element or processor 230, may be stored by the various storage devices 210 and within RAM 222. Such program modules include an operating system 280, a data module 400, an advertisement module 500, an exchange module 600, and an implementation module 700. In these and other embodiments, the various modules 400, 500, 600, 700 control certain aspects of the operation of the carrier system 100 with the assistance of the processor 230 and operating system 280. In still other embodiments, it should be understood that one or more additional and/or alternative modules may also be provided, without departing from the scope and nature of the present invention.

In various embodiments, the program modules 400, 500, 600, 700 are executed by the carrier system 100 and are configured to generate one or more graphical user interfaces, reports, instructions, and/or notifications/alerts, all accessible and/or transmittable to various users of the carrier system. In certain embodiments, the user interfaces, reports, instructions, and/or notifications/alerts may be accessible via one or more networks 115, which may include the Internet or other feasible communications network, as previously discussed. The operation and interaction of the program modules 400, 500, 600, 700 is described in further detail elsewhere herein.

In various embodiments, it should also be understood that one or more of the modules 400, 500, 600, 700 may be alternatively and/or additionally (e.g., in duplicate) stored locally on one or more of the devices 105, 110, 120, and/or 125 and may be executed by one or more processors of the same. According to various embodiments, the modules 400, 500, 600, 700 may send data to, receive data from, and utilize data contained in one or more databases (see FIG. 4), which may be comprised of one or more separate, linked and/or networked databases.

Also located within the carrier system 100 is a network interface 260 for interfacing and communicating with other elements of the one or more networks 115. It will be appreciated by one of ordinary skill in the art that one or more of the carrier system 100 components may be located geographically remotely from other carrier system components. Furthermore, one or more of the carrier system 100 components may be combined, and/or additional components performing functions described herein may also be included in the server. Thus, the carrier system 100 can be adapted to accommodate a variety of needs and circumstances. As will be recognized, these architectures and descriptions are provided for exemplary purposes only and are not limiting to the various embodiments.

While the foregoing describes a single processing element or processor 230, as one of ordinary skill in the art will recognize, the carrier system 100 may comprise multiple processors operating in conjunction with one another to perform the functionality described herein. In addition to the memory 220, the processing element 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

2. Exemplary User Computing Entity

Figure 2B:
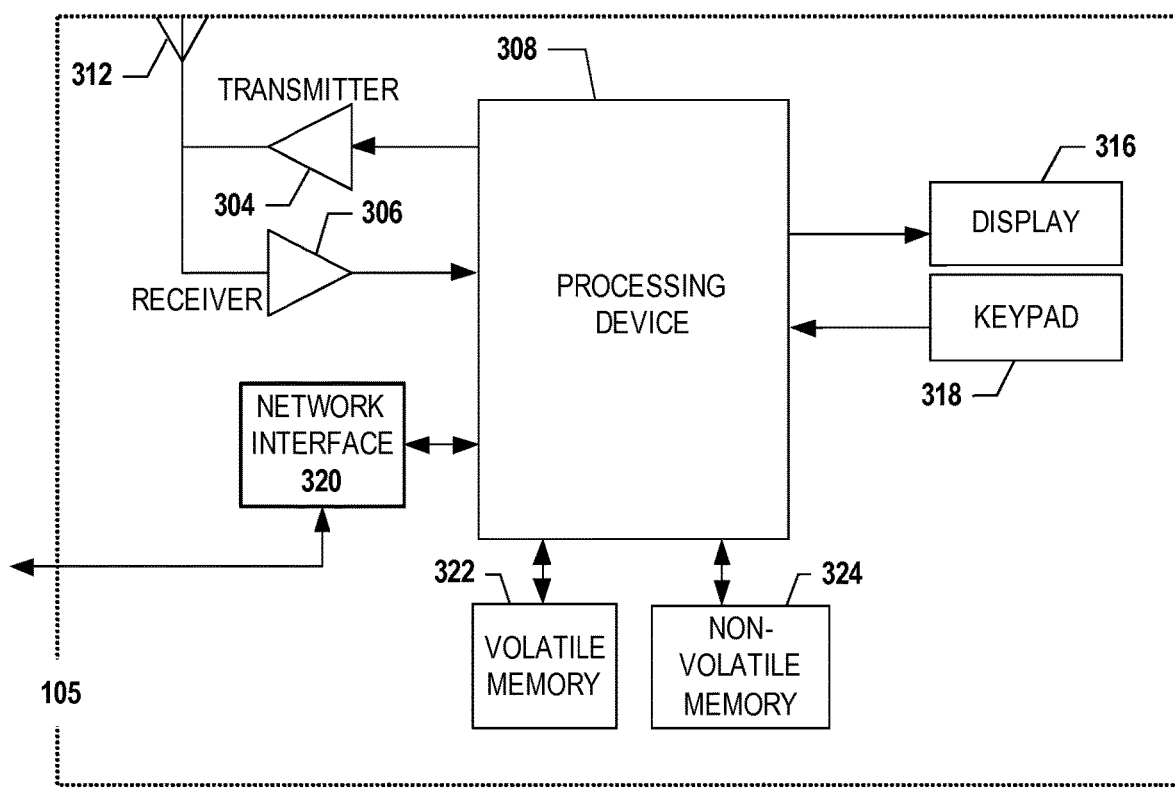
FIG. 2B is an exemplary schematic diagram of a user computing entity 105 within the carrier system 100 according to various embodiments of the present invention.

A user may be an individual, a family, a company, an organization, an entity, a department within an organization, a representative of an organization and/or person, and/or the like. To do so, a user may operate a user computing entity 105 that includes one or more components that are functionally similar to those of the carrier system 100. FIG. 2B provides an illustrative schematic representative of a user computing entity 105 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 105 can be operated by various parties, including carrier or retailer employees or representatives. As shown in FIG. 2B, the user computing entity 105 can include an antenna 312, a transmitter 304 (e.g., radio), a receiver 306 (e.g., radio), and a processing element 308 (e.g., CPLDs, microprocessors, multi-core processors, co-processing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 105 may be capable of operating with one or more air interface standards, communication protocols, modulation types, and access types. More particularly, the user computing entity 105 may operate in accordance with any of a number of wireless communication standards and protocols, such as those described above with regard to the carrier system 100. In a particular embodiment, the user computing entity 105 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, and/or the like. Similarly, the user computing entity 105 may operate in accordance with multiple wired communication standards and protocols, such as those described above with regard to the carrier system 100 via a network interface 320.

Via these communication standards and protocols, the user computing entity 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 105 can also download changes, add-ons, and updates, for instance, to its firmware, software (e.g., including executable instructions, applications, program modules), and operating system.

According to one embodiment, the user computing entity 105 may include a location determining aspects, device, module, functionality, and/or similar words used herein interchangeably. For example, the user computing entity 105 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information/data can be determined by triangulating the user computing entity's 105 position in connection with a variety of other systems, including cellular towers, Wi-Fi access points, and/or the like. Similarly, the user computing entity 105 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine/identify the location of someone or something to within inches or centimeters.

The user computing entity 105 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 105 to interact with and/or cause display of information/data from the carrier system 100, as described herein. The user input interface can comprise any of a number of devices allowing the user computing entity 105 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 105 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 105. As indicated, this may include a user application that is resident on the entity or accessible through a browser or other user interface for communicating with the carrier system 100 and/or various other computing entities.

In another embodiment, the user computing entity 105 may include one or more components or functionality that are the same or similar to those of the carrier system 100, as described in greater detail above. As will be recognized, these architectures and descriptions are provided for exemplary purposes only and are not limiting to the various embodiments.

3. Exemplary Consignee Computing Entity

The consignee computing entities 110 may each include one or more components that are functionally similar to those of the carrier system 100 and/or the user computing entity 105, both as have been described previously herein. For example, in one embodiment, each of the consignee computing entities may include: (1) a processor that communicates with other elements via a system interface or bus; (2) a user interface; (3) transitory and non-transitory memory; and (4) a communications interface. As noted, the consignee computing entity 110 may comprise a user interface (that can include a display device/input device coupled to a processing element) and/or a user input interface (coupled to a processing element). For example, the user interface may be a carrier or retailer application, browser, user interface, dashboard, webpage, and/or similar words used herein interchangeably executing on and/or accessible via the consignee computing entity 110 to interact with and/or cause display of information/data from the carrier system 100, as described herein. These architectures are provided for exemplary purposes only and are not limiting to the various embodiments. In general, the terms device, system, computing entity, entity, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. A customer may refer to either a consignor (e.g., a party shipping an item via carrier) or a consignee (e.g., a party receiving an item from a carrier). In the returns context, a consignee who received an item can become a consignor when returning an item.

4. Exemplary Consignor Computing Entity

The consignor computing entities 120 may each include one or more components that are functionally similar to those of the carrier system 100, the user computing entity 105, and/or the consignee computing entity 110, all as have been described previously herein. For example, in one embodiment, each of the consignor computing entities may include: (1) a processor that communicates with other elements via a system interface or bus; (2) a user interface; (3) transitory and non-transitory memory; and (4) a communications interface. As noted, the consignor computing entity 120 may comprise a user interface (that can include a display device/input device coupled to a processing element) and/or a user input interface (coupled to a processing element). For example, the user interface may be a carrier or retailer application, browser, user interface, dashboard, webpage, and/or similar words used herein interchangeably executing on and/or accessible via the consignor computing entity 120 to interact with and/or cause display of information/data from the carrier system 100, as described herein. These architectures are provided for exemplary purposes only and are not limiting to the various embodiments. A customer may refer to a consignor (e.g., a party shipping an item via carrier), a consignee (e.g., a party receiving an item from a carrier) a third party, and/or the like. In the returns context, a consignor who shipped an item can become a consignee when an item is being returned.

5. Exemplary External Third Party Entity System

The external third party entity system 125 may each include one or more components that are functionally similar to those of the carrier system 100, the user computing entity 105, the consignee computing entity 110, and/or the consignor computing entity 120. For example, in one embodiment, the third party entity system 125 may include: (1) a processor that communicates with other elements via a system interface or bus; (2) a user interface; (3) transitory and non-transitory memory; and (4) a communications interface. As noted, third party entity system 125 may provide a user interface, such as a carrier or retailer application, browser, user interface, dashboard, webpage, and/or similar words used herein interchangeably executing on and/or accessible to interact with and/or cause display of information/data from the third party entity system 125 and/or the carrier system 100, as described herein. As a non-limiting example, the third party entity system 125 may be configured to facilitate the exchange of information between a third party entity and the carrier system 100, as may be beneficial for purposes of exchanging and/or matching third party advertisement data with one or more consignors using the carrier system 100, all as will be described in further detail elsewhere herein. As above, it should be understood, however, that these architectures are provided for exemplary purposes only and are not limiting to the various embodiments.

6. Exemplary Communications System

The communications system 130 may be operated by one or more social network entities (e.g., Facebook YouTube, Qzone, Sina Weibo, WhatsApp, Google+, Tumblr, LINE, Twitter, WeChat, Snapchat, and/or the like), one or more telecommunications entities (e.g., China Mobile, Vodafone, China Unicorn, Airtel, AT&T, Verizon, T-Mobile, Etisalat, and/or the like), and/or the like. Each communications system 130 may each include one or more components that are functionally similar to those of the carrier system 100, the external third party entity system 125, the user computing entity 105, the consignee computing entity 110, the consignor computing entity 120, and/or the like. For example, in one embodiment, the communications system 130 may include: (1) a processor that communicates with other elements via a system interface or bus; (2) a user interface; (3) transitory and non-transitory memory; and (4) a communications interface. As noted, the communications system 130 may provide a user interface, such as a carrier or retailer application, browser, user interface, dashboard, webpage, and/or similar words used herein interchangeably executing on and/or accessible to interact with and/or cause display of and/or exchange of information/data from the carrier/third party entity/communications systems 100/125/130, as described herein. As above, these architectures are provided for exemplary purposes only and are not limiting to the various embodiments.

III. EXEMPLARY SYSTEM OPERATION

Reference will now be made to FIGS. 3-16 according to various embodiments, all as will be referenced, in turn, as appropriate.

FIGS. 3-9 are various flowcharts illustrating operations and processes that may be performed according to various embodiments of the invention configured for provision of customized notifications (e.g., alerts, labels, barcodes, and the like) containing one or more advertisements, including the execution of various tools to facilitate rendering, matching, and/or placement of advertisements in accordance with one or more consignor, consignee, and/or third party entity defined parameters. In particular, FIG. 3 illustrates the overall relationship of the modules 400, 500, 600, 700 of the carrier system 100 according to various embodiments. As illustrated, operation of the carrier system 100 begins, according to various embodiments, with the execution of the data module 400, which receives, stores, manages, and transmits a variety of data, such as the non-limiting examples of consignor data 401, carrier data 402, consignee 403, and third party data 404 (see also FIGS. 4-5).

As operation of the carrier system 100 begins, with reference again to FIG. 3, at least portions of the data 401-403 is provided, as desirable, to the advertisement module 500, as will be described in further detail below. Other portions of the data 401-402 and/or 404 may be provided to the exchange module 600, as will also be described in further detail below. Upon analysis and/or manipulation of such data 401-404 by the modules 500-600, outputs are transmitted to the implementation module 700 for further communication to one or more users of the carrier system 100. It should be understood, of course, that according to various embodiments, any portion of the data 401-404 may be exchanged in a one or two directional fashion between any combinations of the modules 400-700 of the carrier system 100, as may be desirable without departing from the scope of the inventive concepts described herein.

1. Exemplary Databases and Data Contained Therein

Figure 4:
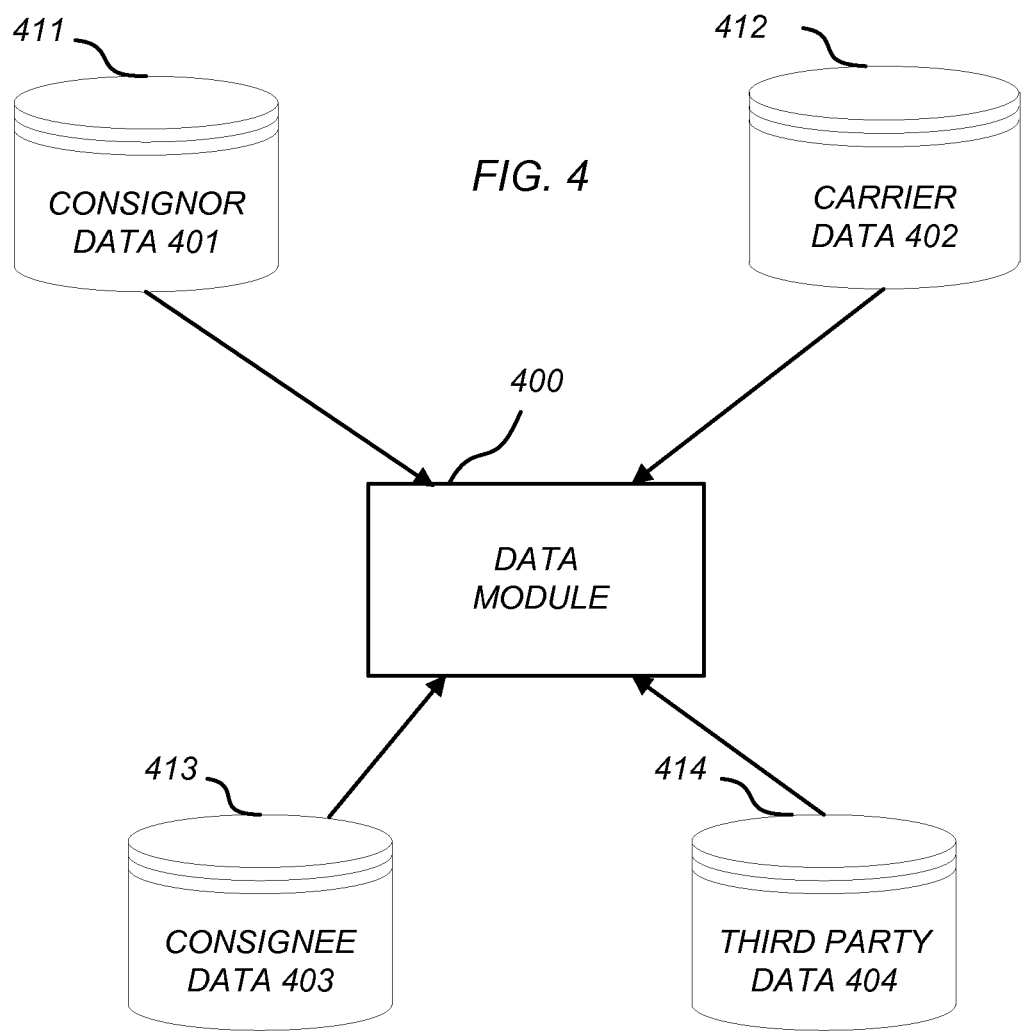
FIG. 4 illustrates a schematic diagram of various databases that are utilized by the carrier system 100 shown in FIG. 2A according to various embodiments of the present invention.

With reference now to FIG. 4, such illustrates a block diagram of various exemplary databases via which the data module 400 manages a variety of data (see also FIG. 5). In particular, in at least the embodiment shown in FIG. 4, the following databases are provided: a consignor data database 411, a carrier data database 412, a consignee data database 413, and a third party data database 414. Although the embodiment of FIG. 4 shows these databases 411-414 as being separate databases each associated with different types of data, in various other embodiments, some or all of the data may be stored in the same database. In still other embodiments, additional and/or alternative databases may be provided, as may also be desirable for particular applications.

a. Consignor Database 411 and Consignor Data 401

According to various embodiments, the consignor data database 411 may be configured to store and maintain a variety of consignor data 401. In certain embodiments, the consignor data 401 may comprise: (1) general consignor information (e.g., basic account or profile information), (2) consignor advertisement information, which may be in certain embodiments associated with one or more advertisements that a consignor would like to submit to the carrier system 100, and/or (3) one or more consignor advertisement parameters, which may be configured for determining whether or not to associate third party submitted advertisements with one or more activities and/or services provided during delivery of the consignor's shipments, as will be described in further detail elsewhere herein.

According to various embodiments, the general consignor information may include a variety of information that the consignor may provide during the initiation of a shipping process for one or more packages. In this regard, it should be understood that the general consignor information may include the consignor's name, address, industry, and/or one or more parameters, as may be requested by the carrier system 100. For example, the general consignor information may comprise at least biographic information/data, geographic information/data, physical address data (e.g., street address, city, state, postal code, country), virtual address data (e.g., a combination of alphanumeric characters), and/or the like. Such virtual address concepts are disclosed in U.S. Pat. No. 8,108,321, which is hereby incorporated in its entirety by reference. Both physical addresses and virtual addresses may be referred to elsewhere herein interchangeably as "addresses."

In certain embodiments, the general consignor information may be collected during the course of registering the consignor with the carrier system 100, which may further comprise creating a consignor profile, as may also be stored within the consignor data 401. While such information/data may be manually input by a consignor, such may also be automatically provided by allowing access to other accounts, such as Amazon.com, Facebook, Gmail, Twitter, PayPal, and/or the like; automatically collected by various computing entities; and/or combinations thereof and other techniques and approaches. In certain embodiments, the one or more carrier systems 100 may also create and store a carrier-assigned shipper identifier in association with the consignor profile. In one embodiment, a carrier-assigned shipper identifier may be used to uniquely identify a consignor profile. In another embodiment, a carrier-assigned shipper identifier may be used to uniquely identify a given address associated with a consignor profile. In such an embodiment, if a consignor profile is associated with four addresses, the one or more carrier systems 100 may create and store four carrier-assigned shipper identifiers in association with the consignor profile. The carrier-assigned shipper identifier may also be stored in association with shipping data for an item to associate the item (and its shipping data) with the (a) correct consignor (e.g., consignor profile) and/or (b) correct address for a consignor.

Assuming the consignor already has a consignor account or has established a new account as described above, the consignor (e.g., a shipper or shipper representative operating a shipper computing device 120) may login to the webpage or portal, e.g., by providing an associated username and password. Alternatively, the consignor may enter identifying information as a "guest" without establishing an account.

The consignor advertisement information associated with one or more advertisements that a consignor may submit to the carrier system 100 may comprise according to various embodiments, with reference momentarily to FIG. 11, at least a promotional name, a promotional header, a promotional message, a consignor logo, a URL associated with the consignor logo, a URL text string, and the like. Otherwise pertinent information for forming the basis of an advertisement or promotional offer may be additionally included within this information according to various embodiments. In any of these and still other embodiments, the compilation and use of this consignor advertisement information will be described in further detail elsewhere herein.

The one or more consignor advertisement parameters, namely defining the consignor's terms for accepting third party submitted advertisements, may comprise one or more criteria based upon which the consignor may consider third party submitted advertisements acceptable for incorporation within shipping notifications and/or labels and/or barcodes and/or the like, as may be features associated with packages shipped by the consignor. Exemplary and non-limiting criteria may include the nature of the industry of the third party, the type of discount being offered by the third party, the type of products primarily handled by the third party, the popularity of the products handled by the third party, any pre-existing arrangements between the consignor and one or more third test parties, and/or any combination of these and still other consignor parameters, however as may be desirable for particular applications. Additional non-limiting criteria might be any one or more of industry-based, product-based, geographical-based (e.g., zip code, city, state, etc.), consignee-type-based, or the like; however as may be desirable for particular and various applications and/or scenarios.

According to various embodiments, it should be understood that the consignor data 401 may comprise one or more classifications (i.e., consignor classification data) associated with the one or more consignors. Such consignor classification data may include whether the consignor is considered a preferred or premium service consignor, as may be applicable where the consignor has registered with one or more premium or preferred services with the carrier and/or a common carrier provider. In certain embodiments, the consignor classification data may further comprise as a non-limiting example an indication of whether the consignor is a United States based shipper versus an overseas (i.e., foreign) based shipper; and/or the like. In any of these and other embodiments, the degree to which customized content is permissible or otherwise filtered, as will be described in further detail below, may be based not only upon one or more consignor-defined parameters or preferences, but also upon some portion of the consignor classification data, the parameters of which as may be beyond the direct control of the consignor themselves.

As a non-limiting example, foreign-based jurisdictions may closely regulate the degree to which customized advertisement data (or even advertisement data) may be presented to residential based recipients in that jurisdiction. In contrast, commercial based entities within the United States may not be so closely or extensively regulated in the same scenario. Thus, desired customized content, where otherwise acceptable based upon one or more consignor and consignee parameters (as described elsewhere herein) may nevertheless be adjusted based upon one or more classifications, such as the location of the consignor. Adjustments may be further necessary based upon the location of the consignee/recipient of a shipment, as will be described elsewhere herein. In these and still other embodiments, a variety of classifications, regulations, and/or the like may be envisioned, without departing from the scope and spirit of the present invention.

In all of these and still other embodiments, it should be understood that, upon receipt of at least some portion of consignor data 401, whether general consignor profile information or consignor advertisement data and/or consignor advertisement parameters (new or revised or otherwise), the consignor data database 411 will store any newly received data in a manner associated with at least the data module 400 and for provision (whether automatically, manually, upon query therefor, whether now or at a later time) to one or more of the modules 500-700, as will also be described in further detail below. Of course, in any of these and still other embodiments, a variety of alternative configurations and/or components of consignor data 401 may exist, as may be desirable for certain applications.

b. Carrier Database 412 and Carrier Data 402

According to various embodiments and with continued reference to FIG. 4, the carrier database 412 may be configured to store and maintain carrier data 402. In certain embodiments, the carrier data 402 comprises at least the non-limiting examples of (1) package data, (2) package transit or tracking data, (3) advertisement verification parameters, and the like.

In various embodiments, the one or more carrier system 100 may provide a user interface (e.g., browser, dashboard, application) for the consignor to provide shipment or package data which includes certain details regarding the proposed package or shipment. In various embodiments, the shipment or package data may include a name, street address, city, state, postal code, country, telephone number and the like for both the consignor and the consignee. In various embodiments, the user interface may comprise a fillable form with fields including ship-from data and ship-to data. In various embodiments, some of the data fields may be pre-populated. For example, if the consignor logged into a registered account, the address data entered during registration may be pre-populated in the ship-from data fields. In some embodiments, the consignor may also have an associated address book comprising address data for possible consignees (e.g., ship-to addresses).

In one embodiment, once the one or more carrier systems 100 receives the ship-to and ship-from information from the consignor, the one or more carrier systems 100 may perform one or more validation operations, stored as validation data, a subset in certain embodiments of the package data. For example, the one or more carrier systems 100 may determine whether the primary address (and/or other addresses) in the specified country or postal code is eligible for a pickup or delivery. The one or more carrier systems 100 may also determine whether the primary address (and/or other addresses) is valid, e.g., by passing the primary address through one or more address cleansing or standardization systems. The one or more carrier systems 100 may perform a variety of fraud prevention measures as well, such as determining whether the shipper or one of the customer's addresses has been "blacklisted" from customer pickup and/or delivery. As will be recognized, a variety of other approaches and techniques can be used to adapt to various needs and circumstances.

In addition to ship-to and ship-from data, the shipment data may also include information regarding the shipment itself. For the example, the number of packages, the weight and sizes of the packages and the service level. The service level options may be for example Next Day Air, Next Day Air Early AM, Next Day Air Saver, 2nd Day Air, 2nd Day Air Early AM, 3 Day Select, Ground, and/or SurePost. In this regard, it should also be understood that the shipment may be one or more packages, parcels, bags, containers, loads, crates, items banded together, vehicle parts, pallets, drums, the like, and/or similar words used herein interchangeably.

Once the shipment or package data has been entered and validated, the one or more carrier systems 100 may generate an item/shipment identifier and a digital representation of a label for use by the consignor for the shipment. In various embodiments, the one or more carrier systems 100 send the digital representation of the label to the consignor computer device such that the label may be printed. In various embodiments, the label may include both human-readable indicia and machine readable indicia such as such as a barcode, a MaxiCode, electronic representation, and/or text (e.g., alphanumeric text).

The unique item/shipment identifier (e.g., 123456789) may be used by the carrier to identify and track the item as it moves through the carrier's transportation network. Such item/shipment identifiers can be affixed to items by, for example, using a label (e.g., sticker) with the unique item/shipment identifier printed thereon (in human and/or machine readable form) or an RFID tag with the unique item/shipment identifier stored therein.

According to various embodiments, the carrier's transportation network and associated systems are further configured to generate and maintain package transit or tracking data. Such is generally known and understood in the art, as disclosed, for example, in at least U.S. Patent Application Publication No. 2012/0303539, which is hereby incorporated in its entirety by reference. Notwithstanding, package transit or tracking data should be considered to include not only pre-established activities or events expected during the course of transit of the package, but also unexpected activities or events, as may contribute to the existence of one or more service exceptions (e.g., late delivery, delayed delivery, rerouted delivery, or the like). In some embodiments, one or more carrier systems 100 may provide a list of possible delivery events that trigger a message. For example, carriers (and consignors and/or consignees—as described below) may identify the type of alerts sent and the format used for the alerts (e.g., day before delivery reminder, morning of delivery and delivery confirmation). Different formats and/or recipients may be used for the different alerts. Other notification trigger events may include item tendered to carrier, day before scheduled delivery date, day of delivery, delivery completion, exception notifications and the like, again as are described in further detail in at least U.S.

Patent Application Publication Nos. 2012/0303539 and 2013/0212036, which are both hereby incorporated in their entirety by reference.

In various embodiments, these carrier-provided concepts can provide customers with ongoing visibility of all inbound packages, as well as preferences, regardless of carrier. Such multi-carrier techniques are described in U.S. Patent Publication No. 2013/0024525, which is incorporated herein in its entirety by reference. For instance, for each item, the interface (e.g., browser, dashboard, application) can be used to show the unique item/shipment identifier, the customer-defined handling identifier, the carrier-assigned customer identifier, the item price, the shipping cost, the order number, the order date, a status indicator, a pickup or delivery indicator, last activity scan date, a non-confirmed pickup or delivery window, a confirmed pickup or delivery window a commit time, whether an in-person signature is requested for delivery, a pickup or delivery service level, and/or various other information. Thus, through such an interface (e.g., browser, dashboard, application), customers (e.g., consignees or third parties) can review and access all inbound shipments (from one or more carriers) using a single interface (e.g., API, as described elsewhere herein). As will be recognized, though, a variety of other approaches and techniques can be used to provide tracking information to a customer.

In addition to providing tracking information regarding an item, the interface (e.g., browser, dashboard, application) may provide a hyperlink associated with the particular item that is associated with the audio, image and/or video file uploaded with the shipment data. For example, the linked audio/visual message may be a personal message from the shipper (e.g., Happy Birthday), an advertisement, information about the item being shipped (e.g., assembly instructions, feature description) and/or return instructions. In other embodiments, the message may be a link to the shipper's website or a message posted on a third-party website (e.g., YouTube). These links may be customized according to the items being shipped.

According to various embodiments, the carrier data 402 may further comprise advertisement verification parameters, which may include one or more criteria configured for evaluation of consignor and/or third party submitted advertisement data content. In this manner, the carrier system 100 may be configured so as to enable the carrier to filter submitted data for appropriateness, so as to, as a non-limiting example, prevent any inappropriate or otherwise offensive content from being submitted by a consignor and/or a third party and such being inadvertently placed within one or more transmitted messages and/or on one or more packages placed into transit to one or more consignees.

According to various embodiments, at least portions of the carrier data 402 may be observed and/or otherwise recorded into the system by common carrier-based personnel, each via one or more mobile devices and/or distributed computing devices of the carrier system 100, as have been described previously herein. In these and other embodiments, it should be understood that, upon receipt of such data 402, the carrier data database 412 will store any such data in a manner associated with at least the data module 400 and for provision (whether automatically, manually, upon query therefor, whether now or at a later time) to at least one of the modules 500-700, as will also be described in further detail below. Of course, in any of these and still other embodiments, a variety of alternative configurations and/or components of customer data 402 may exist, as may be desirable for certain applications.

c. Consignee Database 413 and Consignee Data 403

According to various embodiments and with continued reference to FIG. 4, the consignee data database 413 may be configured to store and maintain consignee data 403. In certain embodiments, the consignee data 403 comprises at least the non-limiting examples of (1) general consignee information (e.g., basic account or profile information) and/or (2) one or more consignee advertisement parameters, which may be configured for determining whether or not consignor and/or third party submitted advertisements are receivable by particular consignees.

According to various embodiments, the general consignee information, much like the general consignor information described previously herein, may include a variety of information that the consignee may provide during the initiation of a shipping process for one or more packages to be shipped to the consignee. In this regard, it should be understood that the general consignee information may include the consignor's name, address, industry, and/or one or more parameters, as may be requested by the carrier system 100. For example, the general consignee information may comprise at least biographic information/data, geographic information/data, physical address data (e.g., street address, city, state, postal code, country), virtual address data (e.g., a combination of alphanumeric characters), and/or the like. Such virtual address concepts are disclosed in U.S. Pat. No. 8,108,321, which is hereby incorporated in its entirety by reference. Both physical addresses and virtual addresses may be referred to elsewhere herein interchangeably as "addresses."

In certain embodiments, the general consignee information may be collected during the course of registering the consignee with the carrier system 100, which may further comprise creating a consignee profile, as may also be stored within the consignee data 403. While such information/data may be manually input by a consignee, such may also be automatically provided by allowing access to other accounts, such as Amazon.com, Facebook, Gmail, Twitter, PayPal, and/or the like; automatically collected by various computing entities; and/or combinations thereof and other techniques and approaches. In certain embodiments, the one or more carrier systems 100 may also create and store a carrier-assigned consignee identifier in association with the consignee profile. In one embodiment, a carrier-assigned consignee identifier may be used to uniquely identify a consignee profile. In another embodiment, a carrier-assigned consignee identifier may be used to uniquely identify a given address associated with a consignee profile.

Assuming the consignee already has a consignee account or has established a new account as described above, the consignee may login to the webpage or portal, e.g., by providing an associated username and password. Alternatively, the consignee may enter identifying information as a "guest" without establishing an account.

According to various embodiments, additional consignee parameters may also be provided and maintained by the consignee database 413, as such parameters may be established for the handling of a variety of customizable features, as the common carrier system 100 may be configured to provide. With reference momentarily to FIG. 11, exemplary and non-limiting customizable features are illustrated, which may include flexible delivery options, a delivery planner interface, automated delivery alerts, electronic, pre-authorized, and/or automatic shipment releases, will call options for holding pickup at nearest (or selected) carrier facility, diversion to nearest (or selected) retail location, rescheduling of delivery, pre-established and customizable "leave at" instructions (e.g., leave at front door, rear door, garage, porch, patio, reception, neighbor, and the like), customizable vacation options, changes in service level, automatic service schedules based upon pre-established calendar interface, enhanced delivery windows, and more. Payments for such features may be in a variety of forms, such as via debit card, credit card, direct credits, direct debits, cash, check, money order, Internet Banking, e-commerce payment networks/systems (e.g., PayPay, Google Wallet, Amazon Payments), virtual currencies (e.g., Bitcoins), award or reward points, and/or the like. In certain instances, payments may be included in a pre-arranged subscription service, which may incorporate certain surcharges, as appropriate, and/or be subject to renewal on a periodic basis (e.g., annually). Such customizable features and still other related concepts are also disclosed in at least U.S. Patent Application Publication No. 2012/0303539, which is again hereby incorporated in its entirety by reference. Additional information/data regarding at least customizable time windows can be found in U.S. Pat. Nos. 6,701,299, 7,233,907, and 7,925,524, all of which are incorporated herein in their entireties by reference. As will be recognized, a variety of other operations and processes may be used with embodiments of the present invention. These operations and processes can be customized to adapt to various needs and circumstances.

It should be generally understood that the consignee parameters described herein may also relate to consignee receptiveness to certain (or any) advertisements, promotional materials, and/or customized content/communications (as described elsewhere herein), further in view of the consignee's preferences for one or more additional parameters associated with the above-described (and still other) features. For example, where a consignee has indicated that they do not wish to receive proactive messages for any service exceptions, such data is accessible via the carrier system 100 according to various embodiments described herein, at least for purposes of further determining that such consignee would also not be eligible to receive, via a proactive message, an advertisement for a coupon or discount on a related service as a result of the service exception. Thus, while an advertisement may be rendered and/or matched for such a scenario (both as described elsewhere herein), the carrier system 100 would not generate and/or transmit such to this particular consignee based upon the consignee's preference to not receive the same. Of course, as will be described in further detail elsewhere herein, should such consignee be receptive of advertisements on package labels, that alternative avenue of communication could (possibly) be pursued, should consignor (and/or third party) preferences and/or parameters also further be permissible of such.

Non-limiting and exemplary mediums of communication of alerts, messages, and/or otherwise general information (even on a label or via a barcode placed on a label or otherwise, still further via textual, audio, visual, and other formats) include: email alerts, label-based alerts, a combination of email and label alerts, all package alerts, only (or additionally) "package late" (or other event triggered) alerts. Email alerts may also include text-messaging or other comparable mediums of sending real-time and/or near real-time messages to one or more parties. Notably, the consignee parameters may establish, in this regard, consignee preferences as to what types of alerts or notifications the consignee is receptive of, which parameters must be satisfied as compared to consignor or third party advertisement requests, as will be described elsewhere herein. For purposes of illustration, however, it should be understood that any conflicts between consignor (or third party) parameters and consignee parameters will be resolved by the carrier system 100 described herein prior to generation of one or more alerts and/or messages and/or labels containing a consignor or third party requested advertisement. These and other features will be described in further detail elsewhere herein.

Further details regarding event or consignee-defined alerts are described, in turn, below. In one embodiment, consignees may identify/define time periods in which the messages providing information regarding items to be delivered should be transmitted to the customer (e.g., including real-time or near real-time). For instance, the time periods may include (a) after shipment and the day before an item is delivered and (b) after shipment and the morning of the day of delivery. In such cases, the messages can serve as a reminder to the customer that an item is being delivered. Similarly the time periods may be after delivery for confirmation of delivery. The one or more carrier systems can store communication preferences for providing information in association with the customer profiles. Moreover, the communication preferences may apply to the customer profile globally, to selected customer addresses, to groups of items, and/or on an item-by-item basis. In some embodiments, the time periods are defined by the shipper when the shipment data is provided.

In one embodiment, shippers or consignors may identify/define triggering events for which the messages providing information regarding items should be transmitted to the consignee (e.g., including real-time or near real-time). For instance, the triggering events may be day item is tendered to carrier, the day before delivery, morning of delivery and delivery confirmation item, exception notifications and the like. In some embodiments, the shipper may also define trigger events for return products such as a label or receipt for returning an item, authorizing an item for return, receiving/collecting an item from a shipper for ingestion into the carrier's transportation and logistics network, sortation and/or consolidation of items as defined by a shipper for handling returns, delivery of items to intermediate or final delivery points, after a repair has been started or completed for an item, and/or the like. The returns trigger events may include return messages as explained in greater detail below.

In one embodiment, the one or more carrier systems may impose time constraints for placing, generating, and/or transmitting messages within the time periods identified by the customers. For example, the one or more carrier systems may only transmit text messages to customers between 6:00 am-11:00 pm (based on time zones). Similarly, the one or more carrier systems 100 may place calls and transmit automated voice messages between 8:00 am-9:00 pm (based on time zones). And for email messages, the one or more carrier systems may generate and transmit them without time constraints.

In one embodiment, the one or more carrier systems can automatically generate (e.g., via a message module) one or more messages providing information regarding an item to be delivered to the customer in compliance with the customer's communication preferences and/or the carrier's time constraints. Similarly, the one or more carrier systems can automatically transmit the one or messages to the electronic destination addresses in compliance with the customer's communication preferences and the carrier's time constraints. For example, the one or more carrier systems may generate (including select) and transmit an email message to Joseph Brown's email address and a text message to Joseph's cellular phone the day before an item is to be delivered to Joseph's home address. The messages may indicate the expected delivery date and/or delivery time, with the previously uploaded audio file, image file, video file or hyperlink to a file. Similarly, the one or more carrier systems can transmit notification messages to the shipper, for example, when corresponding triggering events for returns occur. As will be recognized, a variety of other operations and processes may be used with embodiments of the present invention. These operations and processes can be customized to adapt to various needs and circumstances.

In some embodiments, the shipper may desire to receive confirmation regarding the condition of the item when delivered to the consignee or in connection with a return. In this case, a message may be sent to a mobile station instructing the service provider to capture an image and/or video of the item proximate the time of delivery to the consignee as illustrated in FIG. 8. The proximate time may be upon arrival at the delivery address, during delivery of the item to the consignee and/or after presenting the item to the consignee. The captured image and/or video may be uploaded to the one or more carrier systems by the service provider using the mobile station. The one or more carrier systems may subsequently sent the image or video (or a hyperlink to the image or video) in a message to the shipper as desired.

In further embodiments, the shipper may seek confirmation that the item has been delivered to the appropriate individual and/or other proof of delivery. Although current systems may use a signature of the individual receiving an item for proof of delivery, additional and/or alternative verification may be desired. In some embodiments, the service provider may be prompted to capture an audio confirmation and/or image/video of the individual receiving the item. The audio confirmation may be the individual saying her name or stating some other phrase while the image and/or video may be of the individual receiving the item. The audio confirmation could be used to supplement the recipient's signature for proof of delivery where the signature may be difficult to read. The capture audio, image and/or video may be uploaded to the one or more carrier systems by the service provider using the mobile station. The one or more carrier systems may subsequently sent the image or video (or a hyperlink to the image or video) in a message to the shipper as desired. In some embodiments, the mobile station may record the present location (via GPS, input regarding address, etc.) when capturing the audio confirmation, image and/or video. This could be used to further provide proof of delivery to the appropriate location.

In other embodiments, the consignee may desire to send a return message to the shipper. In this case, the service provider, using a mobile station, may capture an image, audio and/or video message pursuant to a request from the consignee. The one or more carrier systems may subsequently sent the image, audio, or video (or a hyperlink to the image, audio or video) in a message to the shipper as desired.

According to various embodiments, it should be understood that the consignee data 403 may comprise one or more classifications (i.e., consignee classification data) associated with the one or more consignees. Such consignee classification data may include whether the consignee is considered a preferred or premium service consignee, as may be applicable where the consignee has registered with in the same scenario. Thus, desired customized content, where otherwise acceptable based upon one or more consignor and consignee parameters (as described elsewhere herein) may nevertheless be adjusted based upon one or more classifications— whether of the consignee themselves or of a destination associated with the consignee. In still other embodiments, one or more comparable classifications may exist with respect to the consignor (and/or a third party entity, where present), such that classifications thereof, including regulations as may be based upon the location of the consignor and/or the third party entity, may also operate to adjust and/or otherwise filter the custom ad content that would otherwise satisfy the consignor and/or consignee-defined parameters. In yet other embodiments, a variety of classifications, regulations, and/or the like may be envisioned, without departing from the scope and spirit of the present invention.

Still further, in all of these and still other embodiments, it should be understood that, upon receipt of at least some portion of consignee data 403, whether general consignee profile information or consignee advertisement parameters (new or revised or otherwise), the consignee data database 413 will store any newly received data in a manner associated with at least the data module 400 and for provision (whether automatically, manually, upon query therefor, whether now or at a later time) to one or more of the modules 500-700, as will also be described in further detail below. Of course, in any of these and still other embodiments, a variety of alternative configurations and/or components of consignee data 403 may exist, as may be desirable for certain applications.

d. Third Party Database 414 and Third Party Data 404

According to various embodiments and returning with continued reference to FIG. 4, the third party data database 414 may be configured to store and maintain third party data 404, which may generally comprise (1) general third party information (e.g., basic account or profile information), (2) third party advertisement information, which may be in certain embodiments associated with one or more advertisements that a third party would like to submit to the carrier system 100 for matching with one or more consignors and/or one or more shipments associated with one or more consignors, and/or (3) one or more third party advertisement parameters, which may be configured for determining whether or not and/or how to associate the third party submitted advertisements with one or more consignors' shipments, based further in part upon the consignor's parameters and/or the consignee's parameters, as such have been previously described herein and as such determinations will be described in further detail elsewhere herein.

According to various embodiments, the general third party information may include a variety of information that the third party may provide during the initiation of an advertisement submission process in conjunction with the carrier system 100. In this regard, it should be understood that the general third party information may include the third party's name, address, industry, and/or one or more parameters, as may be requested by the carrier system 100. For example, the general third party information may comprise at least biographic information/data, geographic information/data, physical address data (e.g., street address, city, state, postal code, country), virtual address data (e.g., a combination of alphanumeric characters), and/or the like. Such virtual address concepts are disclosed in U.S. Pat. No. 8,108,321, which is hereby incorporated in its entirety by reference. Both physical addresses and virtual addresses may be referred to elsewhere herein interchangeably as "addresses."

In certain embodiments, the general third party information may be collected during the course of registering the third party with the carrier system 100 (in particular with the advertisement exchange feature provided therewith), which may further comprise creating a third party profile, as may also be stored within the third party data 404. While such information/data may be manually input by a third party, such may also be automatically provided by allowing access to other accounts, such as Amazon.com, Facebook, Gmail, Twitter, PayPal, and/or the like; automatically collected by various computing entities; and/or combinations thereof and other techniques and approaches. In certain embodiments, the one or more carrier systems 100 may also create and store a carrier-assigned identifier in association with the third party profile. In one embodiment, the carrier-assigned identifier may be used to uniquely identify a third party profile. In another embodiment, the carrier-assigned identifier may be used to uniquely identify a given address associated with a third party profile, where multiple addresses may be associated therewith.

Assuming the third party already has an account or has established a new account as described above, the third party may login to the webpage or portal of the carrier system 100, e.g., by providing an associated username and password. Alternatively, the third party may enter identifying information as a "guest" without establishing an account.

The third party advertisement information associated with one or more advertisements that a third party may submit to the carrier system 100 may comprise according to various embodiments, with reference momentarily to FIG. 14, at least a promotional name, a promotional header, a promotional message, a third party logo, a URL associated with the third party logo, a URL text string, and the like. Otherwise pertinent information for forming the basis of an advertisement or promotional offer may be additionally included within this information according to various embodiments. In any of these and still other embodiments, the compilation and use of this third party advertisement information will be described in further detail elsewhere herein.

The one or more third party customized content (e.g., advertisement and/or message-based) parameters, namely defining the third party's terms for which consignor's they're willing to work alongside to implement their advertisement, may comprise one or more criteria based upon which the third party may consider acceptable. Exemplary criteria may include the nature of the industry of the consignor, the type of products primarily handled by the consignor, the popularity of the consignor and/or of the consignor's products, any pre-existing arrangements between the consignor and one or more third parties, and/or any combination of these and still other third parameters, however as may be desirable for particular applications. As a non-limiting example, a third party would not want to partner with a competing consignor to provide an advertisement upon the consignor's shipments; and likely the consignor in such scenario would also have established consignor parameters that would analogously prevent such a "match," as such will be described in further detail elsewhere herein. Third party parameters may be defined and/or established based upon one or more of the consignor-defined based, as described elsewhere herein, for example, as industry-based, product-based, geographical-based (e.g., zip code, city, state, etc.), consignee-type-based, or the like.

According to various embodiments, it should be understood that the third party data 404 may comprise one or more classifications (i.e., third party classification data) associated with the one or more third parties. Such third party classification data may include whether the third party is considered a preferred or premium service third party, as may be applicable where the third party has registered with one or more premium or preferred services with the carrier and/or a common carrier provider. In certain embodiments, the third party classification data may further comprise an indication of whether the third party is a United States based entity versus an overseas (i.e., foreign) based entity; and/or the like. In any of these and other embodiments, the degree to which customized content is permissible or otherwise filtered, as will be described in further detail below, may be based not only upon one or more third-party-directly-defined parameters, but also upon some portion of the third party classification data, which may in part be beyond the direct control of the third party themselves.

As a non-limiting example, foreign-based jurisdictions may closely regulate the degree to which customized advertisement data (or even advertisement data) may be presented to residential based recipients in that jurisdiction. In contrast, commercial based entities within the United States may not be so closely or extensively regulated in the same scenario. Thus, desired customized content, where otherwise acceptable based upon one or more consignor and consignee and third party parameters (as described elsewhere herein) may nevertheless be adjusted based upon one or more classifications—whether of the third party themselves (as here) or of the consignor and/or the consignee (as described previously herein). For example, if the third party is foreign based, due to that classification their ability to advertise with residential based recipients in the foreign jurisdiction in which the third party is based may be extensively regulated. A variety of scenarios may be envisioned, but it should be understood that one or more characteristics of the third party entity may further influence adjustments to approved custom advertisement content, in much the same fashion as characteristics of the consignor, consignee, and even carrier may do the same—all beyond the one or more parameters that may be directly defined by those same parties.

In these and other embodiments, it should be understood that, upon receipt of such third party data 404, the third party data database 414 will store any such data in a manner associated with at least the data module 400 and for provision (whether automatically, manually, upon query therefor, whether now or at a later time) to at least one of the modules 500-700, as will also be described in further detail below. Of course, in any of these and still other embodiments, a variety of alternative configurations and/or components of third party data 404 may exist, as may be desirable for certain applications.

Although described generally herein such that the third party is someone other than the consignor, consignee, and carrier, it should be understood that in certain embodiments, the third party may be the carrier, such that the carrier and the consignor may submit to the "exchange" or "matching" configuration described elsewhere herein, such that competing parameters between the carrier and the consignor are resolved during the course of determining if/when/where/how to incorporate customized content within communication to at least, for example, the consignee. In still other embodiments, the third party may be an entity other than the carrier, consignee, and the consignor. In yet another non-limiting embodiment derived therefrom, the third party may be a second consignor.

e. Miscellaneous Comments on Databases and Data

According to various embodiments, any of the previously described databases may be configured to store and maintain not only textually based data, but also graphically based data or audio based data or video based data or image based data or hyperlink based data, all as may be generated by the carrier system 100 (or otherwise). Still further graphical data (e.g., charts, graphs, maps, documents, etc.) may also be stored within one or more of the databases, wherein such may be, at least in part, independently derived, relative to the textually based data. It should also be understood that in any of these and still other embodiments, the graphically based data may be used to visually combine various portions of data contained within the various databases previously described herein. Still further, various algorithms and/or pre-determined parameters, rules, and/or engagement or implementation procedures may also be stored in any of the various databases within the carrier system 100, as may be desirable for various applications, to the extent such have not been previously described and/or allocated herein.

In certain embodiments, some portion of the data 401-404 may include a provided hyperlink associated with an audio, image and/or video file uploaded with some portion of the data (e.g., by the consignor or a third party as a portion of advertisement-based data). For example, the linked audio/visual message may be a personal message from the consignor (e.g., a commercial-like video describing an available or offered coupon or discount), an advertisement, information about the item being shipped (e.g., assembly instructions, feature description) and/or return instructions. In other embodiments, the message may be a link to the consignor's website or a message posted on a third-party website (e.g., YouTube) or any of the above as may be directed to a website associated with a third party who has submitted an advertisement for inclusion on a transmitted message, whether proactively or upon a package label or otherwise. These links may be customized according to the items being shipped, as may be determined based at least in part upon the package content data, contained within the carrier data 402, as previously discussed.

According to various embodiments, the some portion of the data 401-404 may further include a value, which may be associated with a scale of values that may be utilized by one or more users of the carrier system 100 so as to assess the "attractiveness" of one or more advertisement content submissions created by a third party entity. For example, the carrier system 100 may be configured to rank the third party submitted "work products" and assign to each thereof an associated value that communicates, to at least the registered consignors, the attractiveness thereof. In certain embodiments, the ranking may be objectively based; however, in other embodiments, the ranking may be influenced and based further at least in part upon one or more consignor parameters, such that a particular third party submission may be ranked, for example, on a scale of 1-10, as a 4 for consignor A and an 8 for consignor B. Rankings and/or value determinations may be based at least in part upon parameters such as availability, the number of "work product" requests, the popularity of the product, the type of product, a previously shipping history of the product to the consignee, and the like. The parameters may be focused from a consignor and/or a third-party perspective in this regard, again all as will be described in further detail elsewhere herein.

Still further, according to various embodiments, the various parameters and/or classifications identified as potentially being contained within some portion of the data 401-404 may be subjected to a plurality of business rules, such that a multi-tiered hierarchy of parameters and/or classifications may be established. As a non-limiting example, a foreign-based jurisdictional classification may always take priority over (i.e., trump) any user-defined preferences or parameters, particularly so where one or more regulations may be violated if the user-defined preference or parameter were nevertheless satisfied. In certain embodiments, the multi-tiered hierarchy may exist not only as between classifications versus user-defined parameters, but also as between the various parameters defined by the multiple users described herein—for example as between consignors and third party entities. In still other embodiments, a user may define an internal hierarchy still further, such that certain package-level specific preferences or parameters established by the user may take priority over generic account-based preferences or parameters established by the same user. A series of non-limiting examples follow, which are expanded upon elsewhere herein as respective use case scenarios.

As a first non-limiting example, where a consignor has established an account generic parameter or custom content advertisement (e.g., a 5% discount), the consignor may also establish event-specific parameters or custom content advertisements (e.g., a 10% discount where shipments are delayed). In such instances, according to certain embodiments, the event-specific custom content will take priority over the account generic content, such that if a particular package is, in fact, delayed for delivery, the 10% discount will be applied. As another non-limiting example, the consignor may establish the same account generic custom content (e.g., a 5% discount), but also indicate that on shipments of shoes, custom content should provide a "buy one get one free" coupon for use on the following weekend. In this scenario, the buy one get one free custom content would take priority, provided the package is a shipment of shoes; otherwise, the 5% discount would apply.

As yet another non-limiting example, where a consignor and a third party entity are involved (as in the advertisement exchange scenarios elsewhere herein), package or event-specific parameters may not always take priority over account generic parameters, particularly where the package or event specific parameters is that defined by the third party entity while the account generic parameter is that defined by the consignor. Consider shipments by consignor Zappos and third party Nike, whose shoes may be shipped from time to time by Zappos. Zappos, as the consignor may implement an account generic parameter that all packages containing shoes receive a 10% discount on all future orders. Nike may submit (e.g., via the advertisement exchange, as described elsewhere herein) customized content for a 10% discount on future orders through Zappos for Nike shoes. Zappos may establish one or more parameters or preferences, whereby in certain instances their 10% generic discount takes priority over the third party customized content generated by Nike. In other instances, however, Zappos may wish to defer its 10% discount in favor of placing the Nike package specific custom content on at least those packages shipped and containing Nike shoes. A variety of scenarios may be, indeed, envisioned in this regard without departing from the scope and spirit of the present invention; however, it should be understood that a variety of multi-tiered business rules may be implemented via the system described herein, so as to efficiently and effectively prioritize and manage the plurality of preferences and/or parameters and/or the custom content provided by the one or more users (e.g., consignors, consignees, carriers, and/or third party entities) thereof.

2. Exemplary Execution of Modules 400-700

FIG. 3 illustrates the overall relationship of the modules 400, 500, 600, 700 of the carrier system 100 according to various embodiments. As illustrated, operation of the carrier system 100 begins, according to various embodiments, with the execution of the data module 400, which receives, stores, manages, and transmits a variety of data, such as the non-limiting examples of consignor data 401, carrier data 402, consignee 403, and third party data 404 (see also FIGS. 4-5).

As operation of the carrier system 100 begins, with reference again to FIG. 3, at least portions of the data 401-403 is provided, as desirable, to the advertisement module 500, as will be described in further detail below. Other portions of the data 401-402 and/or 404 may be provided to the exchange module 600, as will also be described in further detail below. Upon analysis and/or manipulation of such data 401-404 by the modules 500-600, outputs are transmitted to the implementation module 700 for further communication to one or more users of the carrier system 100. It should be understood, of course, that according to various embodiments, any portion of the data 401-404 may be exchanged in a one or two directional fashion between any combinations of the modules 400-700 of the carrier system 100, as may be desirable without departing from the scope of the inventive concepts described herein.

The execution of these non-limiting and exemplary modules 400-700 so as to facilitate provision of one or more consignor (or third party) advertisements in conjunction with a communication to a consignee (e.g., an alert, a message, a package label, or the like) is described, in turn, below.

a. Data Module 400

According to various embodiments and as previously mentioned herein, the data module 400 is configured to receive, store, manage, and transmit a variety of consignor data 401, carrier data 402, consignee data 403, and third party data 404. Receipt may be from any of a variety of entities (e.g., a consignor, a consignee, a third party, a common carrier service provider representative, delivery personnel operating on behalf of the common carrier service provider, and/or still other entities) and transmission thereof may be to one or more of the modules 500-700, as will be described in further detail below. In certain instances, transmission may be one-way, only to the one or more modules 500-700 for further processing (see also FIG. 5); however, in other embodiments, at least some transmissions may be two-directional (not shown, but understandable with two-directional arrows), as may be desirable for certain applications.

It should also be understood that according to various embodiments, in some instances only a portion of certain types of data 401-404 may be transmitted to particular modules, for example, on an "as-needed" or "as-requested" basis. For example, initiation of the advertisement module 500 may be initiated solely upon receipt of and transmission of consignor data 401; in other words, no other data need have been presently received, although arguably some degree of additional data (e.g., carrier data 402 and/or consignee data 403) will be pre-existing within the data module 400. As another non-limiting example, initiation of the exchange module 600 may simply require receipt of and transmission of third party data 404, which may oftentimes not occur but periodically. Indeed, in certain embodiments, it may not occur at all, for example where an exchange module 600 (and the advertisement exchange features associated therewith) may not be provided in conjunction with the carrier system 100. Of course, in other embodiments, such may be provided, recognizing that the exchange module 600 provides an additional layer of functionality to the carrier system 100, thereby for example incorporating third party entities and their data submissions for advertising or promotional content, as described elsewhere herein.

In these and still other embodiments, certain types of data, for example carrier data 402 and/or consignee data 403 may be maintained within the data module 400 and only provided to the remaining modules 500-700 on an "as needed" or "as-requested" basis, for example, upon execution of the placement tool 520, as will be described in further detail elsewhere herein. It should be understood, as another non-limiting example, that although transmission of the carrier data 402 appears (see FIG. 5) to occur to both the advertisement and the exchange modules 500-600, in certain embodiments differing portions thereof may be transmitted and/or otherwise provided to the differing modules. For example, only a portion of the carrier data 402 sufficient to determine if placement of rendered customized content may be transmitted to the placement tool 520 of the advertisement module 500, so as to assess, as a non-limiting example, if the content is not offensive or otherwise inappropriate for placement. As another non-limiting example, a different portion of the carrier data 402, namely only that necessary to facilitate rendering of a third party's proposed submission may be transmitted to the exchange module 600, for example including package specific data in this transmission (as compared to censorship parameters in the above-described transmission to module 500).

Of course, a variety of alternative configurations for data segregation and transmission may be envisioned, without departing from the scope and spirit of the various embodiments described herein. With that in mind, FIG. 6 illustrates non-limiting and exemplary steps that may be executed by the data module 400 according to various embodiments. Beginning with step 420, the data module 400 assesses whether any data (e.g., consignor data 401 in particular) has been received by the module. In certain embodiments, the data module 400 makes this assessment by periodically scanning one or more databases (see FIG. 4) associated with the module and by identifying some portion of data within one or more of the databases that was not present during a previous periodic scan under step 420. Of course, alternative configurations may be envisioned, wherein, as a non-limiting example, the data module 400 may actively receive data (e.g., as input by a user of the carrier system 100 via an interface, whether web-based or otherwise—specifically the input of consignor data 401 by a consignor so as to initiate shipment of one or more packages to one or more consignees) and upon receipt thereof, execute step 430. As a non-limiting example, as has been referenced elsewhere herein, the data module may be configured according to certain embodiments to automatically transmit consignor data 401 upon receipt thereof to at least the advertisement module 500 so as to in a real-time (or near real-time) fashion initiate execution of the one or more tools contained therein. This is illustrated in at least step 425.

With continued reference to FIG. 6, according to various embodiments, if "newly received" consignor data 401 is identified, the data module 400 proceeds to step 425; otherwise the module proceeds to step 430. During step 430, if no consignor data 401 is identified (such as the initiation of a new shipment), the data module assesses whether any third party data 404 has been received instead. If not, the data module 400 proceeds into a static loop via step 435. During step 435, the data module 400 may be configured to passively stand by for receipt of new data (whether consignor data 401 or third party data 404 or otherwise). In certain embodiments, the module 400 may, in step 435, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

According to various embodiments, during step 430, if the data module 400 instead determines that "newly received" third party data 404 exists, the data module proceeds to step 440. During step 440, at least the third party data 404 (or an indication thereof) is transmitted to at least the exchange module 600. In certain embodiments, additional data 401-403 may also be transmitted; although in other embodiments, such data and/or portions thereof may be otherwise retained and/or maintained by the data module 400 for later provision thereof to one or more modules 500-700 on an "as-needed" or "as-requested" basis, however as may be desirable for particular scenarios.

In any of these and other embodiments, transmission of one or more portions of data 401-404 to various modules 500-700 may be simultaneously, while in still other embodiments, transmission may be sequential and temporally spaced, as may be desirable or necessary for particular applications. For example, carrier data 402 may be transmitted to the advertisement module 500 on two occasions (see FIG. 5)—concurrently with the consignor data 401 and/or subsequently, for example upon execution of the placement tool 520. In other embodiments, different portions of the carrier data 402 may be provided upon these different occasions, as will be described in further detail below with respect to the advertisement module 500. In still other embodiments, for example, consignor data 401 (or at least a portion thereof) may be transmitted, in addition to the advertisement module 500, also to the exchange module 600, but only upon subsequent receipt and transmission to the exchange module of at least some portion of third party data 404, again as will be described in further detail below with respect to the exchange module.

Of course, various configurations and/or combinations and/or timings of handling, maintaining, and/or transmitting of data 401-404 may be envisioned, whereby, in certain embodiments, the data module 400 may be configured to automatically perform certain steps, while in other embodiments, the module may perform at least some steps only periodically, at an interval predetermined by one or more users of the carrier system 100, as may be desirable for particular applications. In any of these and still other embodiments, any portion of the data may be otherwise exchanged, whether automatically or upon request therefor, with or from the remaining module 500-700, as may be desirable for certain applications, as compared with the provision of such data from and by the data module 400 as an initiator thereof.

b. Advertisement Module 500

According to various embodiments and as previously mentioned herein, the advertisement module 500 is generally configured according to various embodiments to execute one or more tools (e.g., a rendering tool 510 and/or a placement tool 520) that processes consignor and/or third party advertisement or promotional materials submitted for handling via the carrier system 100 described herein.

FIG. 7 illustrates non-limiting and exemplary steps that may be executed by the advertisement module 500 according to various embodiments. Beginning with step 530, the advertisement module 500 according to various embodiments assesses whether any data (e.g., in particular, consignor data 401) has been received by the module. In certain embodiments, the advertisement module 500 makes this assessment by periodically scanning one or more databases (see FIG. 4) associated with the module and by identifying some portion of data within one or more of the databases that was not present during a previous periodic scan under step 530. In other embodiments, the advertisement module 500 makes this assessment by periodically scanning its internal module so as to see if some new portion of data has been received from the data module 400. Of course, alternative configurations may be envisioned, wherein, as a non-limiting example, the advertisement module 500 may actively receive data (e.g., as input by a user of the carrier system 100 via an interface, whether web-based or otherwise) and upon receipt thereof, execute step 530. As another non-limiting example, as has been referenced elsewhere herein, the advertisement module 500 may be configured according to certain embodiments to automatically receive consignor data 401 from at least the data module 400 so as to in a real-time (or near real-time) fashion initiate execution of at least the rendering tool 510 upon identification of receipt thereof. In these and still other embodiments, data other than consignor data 401 may be received, in which case the advertisement module 500 may be configured to proceed instead to step 535, as will be described in further detail below.

Before turning to step 535, however, with reference momentarily to FIGS. 10 and 11, it may be understood that the consignor data 401 receivable by the advertisement module 500 may be created by a user of the carrier system 100 (e.g., a consignor) during the course of registration with the carrier system. FIG. 10 illustrates an exemplary user registration interface 800, via which one or more consignors may access (or otherwise establish) an account with the carrier system 100. FIG. 11 similarly illustrates an exemplary registered user interface 900, via which one or more registered users (e.g., consignors) may select one or more customizable parameters based upon which their interactions with the carrier system 100 (including transport of packages and the generation and transmission of customized communications in conjunction therewith) are controlled. It should be understood in this regard that although FIGS. 10 and 11 have been immediately described herein with reference to a consignor and the creation of consignor data 401, such interfaces 800, 900 are equally applicable to registration of one or more consignees and third party entities and/or the corresponding creation of consignee data 403 and/or third party data 404, both as will be described elsewhere herein. In this regard, it should be understood that the interface 900 of FIG. 11 may be configured according to various embodiments so as to provide a plurality of customizable options for selection by one or more users of the system, so as to align their respective user preferences with interactions occurring between them and the carrier system 100, all as will be described in further detail elsewhere herein.

Returning now to FIG. 7 and the advertisement module 500, if during step 530, no consignor data 401 (or no "newly received" consignor data 401) is identified, the module is configured to proceed to step 535, in which the module further assesses (in any of the manners as previously described herein with respect to step 530) whether any match data 617 has been received. If yes, the advertisement module 500 is configured to proceed to step 539, in which the advertisement module is configured to retrieve some portions of consignor data 401, carrier data 402, and/or consignee data 403 (see also FIG. 5) and prepare for execution of a placement tool 520 in step 560. These features and steps will be described further below, as such are better understood further in the context of the exchange module 600, which is configured according to various embodiments to transmit the match data 617 generated thereby to the advertisement module 500.

If instead during step 535 no match data 617 is identified (after of course also identifying that no consignor data 401 exists, for example, that is newly received), the advertisement module 500 is configured according to various embodiments to proceed to step 537, during which the module enters a "static loop" comprising steps 530, 535, and 537, pending receipt of "new" consignor data 401 and/or match data 617, so as to initiate execution of either steps 540 or 539, both of which as will be described further below.

Returning momentarily to step 530, if "newly received" consignor data 401 is identified in step 530, the carrier system 100 may be according to various embodiments to determine the precise nature of such data. For example, if the consignor data 401 input into the carrier system 100 is general profile data for the consignor associated with registration or setup of a consignor account with the system (see FIGS. 10 and 11), such may be deemed in step 530 according to certain embodiments as not comprising "newly received" consignor data 401 of interest and/or of the nature required to proceed to step 540. According to various embodiments, the nature and type of consignor data 401 sufficient therefor comprises initiation of an advertisement request by the consignor, as may be understood with further reference to FIG. 12, which illustrates an exemplary consignor advertisement customization layout interface 1000 according to various embodiments of the carrier system 100.

In FIG. 12, the consignor, during the course of interfacing with carrier system 100, may populate various components necessary for input of a customized communication (content) request. Such components may include one or more of the non-limiting components of a promotional name 1002, a promotional header 1003, a promotional message 1004, a consignor logo 1005, a URL string 1006, and/or any combination thereof, as may be desirable for particular applications. In certain embodiments, the consignor may also select one or more of format options 1001 for appearance of the requested customized communication or content. Non-limiting examples of such are illustrated in FIG. 12, which may position the logo to the side or atop promotional header information and/or dispense with all fields for a custom image containing embedded therein a customized URL or hyperlink, the latter of which as may be configured to lead a recipient thereof to additional promotional materials.

Remaining with FIG. 12, for the promotional name 1002, the consignor may submit any of a variety of details, including that of the non-limiting and illustrated example of "Weekly Deals," as may be applicable for routine and/or recurring advertisements desired by the consignor. Of course, in certain embodiments, the promotional name may be associated at least in part with the occurrence of a "trigger event" therefor, as will be described elsewhere herein, such that the name may read "Discount for your Inconvenience," for example where the promotional trigger is a Delayed Delivery event and/or associated notification therefor, as will be described in further detail elsewhere herein. Generally speaking, it should be understood that such promotional materials may comprise a discount (e.g., 10% off) that a consignor may only wish to provide to consignees upon occurrence of an unforeseen event, such as a package delivery delay. In at least one embodiment, the cost of providing such an advertisement or promotional offer may be borne by the consignor; in other embodiments, at least a portion of the cost may be shared with or otherwise borne by the common carrier shipment provider, for example where the delay is the carrier's fault.

From FIG. 12, it should be understood that the promotional content may be further customized via components that a consignor (and/or carrier and/or a third party) may submit (e.g., as consignor data 401), including promotional header content 1003, promotional message content 1004 (which may provide further details or directions for a consignee to redeem an offer or otherwise), logo content 1005 (which may include graphical and/or URL-based content), and/or general URL or hyperlink content 1006, which may be separate from that above associated with the logo and like the promotional message provide additional details for directions for the consignee to redeem an offer or otherwise, with the difference being primarily that the details are accessible via the URL or hyperlink versus being directly visible.

It should be further understood from FIG. 12 that any portion of the customizable content 1001-1006 may be such that the advertisement module 500 considers such sufficient "newly received" consignor data 401 within the context of step 530, so as to enable progression to step 540 and execution of the rendering tool 510 (see also FIG. 5). In certain embodiments, the carrier system 100 and in particular the advertisement module 500 may be configured to proceed to step 540 upon receipt of any portion of content 1001-1006, such that execution of the rendering tool 510 in step 540 may comprise one or more prompts (e.g., communications or notifications) requesting further information or details or instructions from the consignor, for example, where portions of the content 1001-1006 may remain missing. Of course, in at least one embodiment, not all content 1001-1006 may be necessary for execution of the rendering tool 510, for example where the customized layout content 1001 indicates use of a custom image with URL, in which scenario a consignor may not upload or provide at least components 1002-1004, however as may be desirable for particular applications. In this regard, a variety of alternatives and/or variations may be envisioned without departing from the scope and spirit of the present invention.

Returning now with focus upon step 540 of FIG. 7, in which the rendering tool 510 is executed, such execution according to various embodiments results in the generation of at least some render data 512, which occurs (and/or is represented by) step 550. Generation of the render data 512 in certain embodiments, such as that illustrated in FIG. 7, may not be based upon the consignor data 401 alone, however, as at least some portion of carrier data 402 may also be retrieved from the data module 400 during step 545, so as to further inform the generation of the render data by the rendering tool. This is evident further from FIGS. 5 and 13. FIG. 13, in particular, illustrates a preview rendering of a customized communication 1100, as may be generated (e.g., in the form of render data 512) via the advertisement module 500 of the carrier system 100. As may be seen, various components input by the consignor (see FIG. 12) appear thereon, for example, as the logo 1103, the promotional message 1104, and the promotional URL 1105. This preview rendering interface 1100 may be accessible and viewable to a user (e.g., the consignor) of the carrier system 100 via interface 1000 (see FIG. 12), particular via selection of one or more icons 1007, as may be configured to permit the user to "save for later" the submission, "preview" the submission, and/or submit the submission with no preview thereof. Specifically, selection of "preview" results in display of the interface 1100 of FIG. 13, although it should be understood that according to certain embodiments, even where preview may not be selected, rendering may occur (and just not be displayed to the user). Such may be preferable, for example, where rendering further incorporates a portion of the carrier data 402, as will now be discussed.

With reference back to FIG. 7 and in particular step 545 thereof, but with continued reference concurrently to FIG. 13, it may be understood that according to various embodiments the execution of the rendering tool 510 so as to generate render data 512 may include incorporation of at least some portion of carrier data 402. In certain embodiments, the carrier data 402 retrieved by the advertisement module 500 may include delivery data, tracking data, and the like, as illustrated in fields 1101-1102 of the rendering of FIG. 13. Additional and/or alternative data may be retrieved, however as may be desirable for population of package identifying data that may be communicated to a consignee in conjunction with the promotional or advertisement content. Of course, in still other embodiments, at least at this stage, the rendering of steps 540-550 may not incorporate any package specific data, as such may be later generated and/or incorporated during execution of the placement tool 520 (described below).

In various embodiments, remaining with FIG. 7, it should be understood that a portion of the retrieved carrier data 402 in step 545 may comprise one or more parameters, as may be established by the carrier, for determining the appropriateness of any content uploaded by the consignor (or a third party—as will be described with reference to FIG. 8 and the exchange module 600). In particular embodiments, one or more carrier pre-established parameters may prohibit the use of certain offensive terms within uploaded content; in other embodiments, the use of otherwise trademarked terms may be prohibited, absent an indication that the consignor/uploader also owns the referenced trademark. Regardless of the content being examined for appropriateness or acceptability during the generation of the render data 512, it should be understood that in at least these and still other embodiments, the retrieved carrier data 402 may be utilized to further filter the final content being rendered, as may be desirable by the carrier service provider so as to ensure the services provided via the carrier system 100 are appropriate and remain attractive to still further potential registrants (e.g., other consignors, consignees, and/or third parties).

With reference now to step 560 of FIG. 7, according to various embodiments, upon generation of render data 512, the advertisement module 500 is configured to proceed in this step to execute a placement tool 520. In certain embodiments execution of the placement tool 520 may be further deferred until a consignor requests shipment of one or more packages to one or more consignees, which may occur separately from the consignor's upload of promotional materials and/or content. In other embodiments, execution of the placement tool 520 may proceed automatically, whereby the module 500 may be configured to query whether one or more shipments are pending within the carrier system 100 at the time of the consignor advertisement data upload. A variety of alternative scenarios may indeed be envisioned without departing from the scope and spirit of the present invention, with the understanding that upon rendering and identification of one or more packages, the advertisement module 500 may be configured to proceed to facilitate placement of the rendered advertisement or promotional material upon (or in association with) one or more of the packages, such facilitation begin based upon a combination of consignor and consignee parameters, as will be described below.

As inputs to step 560 and execution of the placement tool 520, according to various embodiments, the advertisement module 500 is configured to retrieve at least some portion of carrier data 402 and/or consignee data 403, in addition to the previously received and/or retrieved carrier data 402. Such data is combined with the render data 512 so as to determine appropriate and/or available placement of the rendered data 512 (e.g., the customized communication content, the advertisement, the promotional material, or the like) in association with the transport of one or more packages (e.g., within alerts, on labels, embedded within tracking numbers or symbols, or the like). As described elsewhere herein and still further with reference to various patent applications incorporated by reference herein, it should be understood that the data embedded within the tracking numbers or symbols may be any of a variety of types of data (e.g., text, audio, video, personalized message, or the like) and such may be provided based upon any of a variety of parameters (e.g., consignor or consignee defined, carrier defined, and/or event-triggered—all again as previously described herein and incorporated with reference to the various pertinent patent applications also previously noted).

As a non-limiting example, carrier data 402 may be retrieved in step 565, indicating that three packages are in transit from consignor A to consignee B at the time of submission and rendering of promotional data for a potentially customized communication. The retrieved consignee data 403 in step 565 may further indicate that consignee B is receptive of customized content (e.g., advertisements or promotional materials) only in their package label content. In other words, consignee B does not wish to receive customized content via one or more alerts (e.g., delivery alerts, late alerts, diversion alerts, and the like). In this scenario the consignor data 402 may likewise indicate that, as may be gathered by the advertisement module 500 during the rendering process, the consignor would like to place the specifically provided customized content upon any alerts and labels in which shoes are shipped to a recipient by the consignor. In this scenario, if the carrier data 402, which may include package content data, reveals that shoes are being shipped to consignee B, the generated placement 522 (see step 570, as an out-product of execution of the placement tool 520 during step 560) would contain at least instructions for placement of the customized content only upon labels sent to consignee B. It should be understood from this exemplary and non-limiting example that both the consignor and the consignee-defined parameters influence the decision-making process executed by the placement tool 520.

In still other scenarios (e.g., where placement is based upon package contents, or upon consignee order volume, or even upon late or delayed delivery data), the decision-making process for execution of the placement tool 520 during step 560 may be further based upon and/or dependent upon some portion of the carrier data 402, to the extent such contains package and/or tracking data therein. For example, where delivery is delayed by 24 hours for consignee B, an indication of such may appear in carrier data 402, as previously described herein. In a scenario in which the consignor A has requested customized placement of a 10% off coupon for recipients of its shoe products who have delivery delayed by more than 12 hours, execution of the placement tool 520 would result in customized placement of the 10% off coupon for consignee B's shoe shipment which was delayed for 24 hours. The customized content would, however, not be placed upon consignee B's equally delayed shipment of socks. Similarly, the customized content would not be placed upon consignee B's third shipment of shoes, which arrived on time. Any of a variety of variations and/or configurations may be envisioned in this regard without departing from the scope and spirit of the present invention. Multiple "use cases" in this regard and otherwise are provided elsewhere herein to further highlight such options.

Returning now with focus upon FIG. 7 and in particular with respect to step 580 thereof, upon generation of placement data 522 according to various embodiments, which may in certain instances merely contain instructions for eligible packages upon which (or in association with) customized content may be (futuristically) placed, as will be described in the context of the implementation module 700 elsewhere herein, any portion of the data generated and/or retrieved or otherwise received by the advertisement module 500 and/or utilized by the module during the execution of tools 510 and 520 may be further transmitted to at least the implementation module for further processing thereof. It should be understood that any of a variety of this data may be transmitted, substantially simultaneously, upon request therefor, or otherwise, even though in at least the illustrated embodiment of FIG. 5 only transmission of placement data 522 to the implementation module 700 is provided. Of course, even in such embodiments, the otherwise received and/or retrieved data 401-403 and/or render data 512 may all (or in part) be embedded within the transmitted placement data 522, however as may be desirable for particular applications.

As mentioned, in these and other embodiments, transmission of the render data 512 and/or the placement data 522 to other tools or modules may be simultaneously, while in still other embodiments, transmission may be sequential and temporally spaced, as may be desirable or necessary for particular applications. For example, in certain embodiments, the consignor may submit any of a variety of consignor data 401 sufficient to render promotional offer for one or more of its consignees; however, such may not be "placed" on a particular package until the later occurrence of an event, which may be triggered in step 565, via receipt of carrier data 402, as may be indicative of a "trigger event" occurring or otherwise. In other embodiments, progression of the advertisement module 500 via steps 530-580 may be substantially seamless and automatic, without further delay for occurrence of later events, for example where a consignor submits a promotional content request in conjunction with a shipment request and the customized promotional content is, in a near real-time or real-time fashion associated with and placed upon that shipment. In this regard a variety of alternatives and/or configurations may be envisioned, understanding of course that consignors may wish to pre-populate a plurality of promotional offers (and the content associated therewith), such that one or more consignor-defined rules may subsequently determine placement of such upon subsequently created shipments. In this manner, it should be understood that the carrier system 100 described herein provides a proactive and, to a degree, a self-managed system of placing customized content upon (or in association with) one or more shipments or packages, as such are themselves created and transported.

Of course, still further various configurations may be envisioned, whereby, in certain embodiments, the advertisement module 500 may be configured to automatically perform at least step 580, while in other embodiments, the module may perform such only periodically, at an interval predetermined by one or more users of the carrier system 100 (for example by one or more consignor, consignee, or third party parameters), however as may be desirable for particular applications. In any of these and still other embodiments, any portion of the data may still further be otherwise exchanged, whether automatically or upon request therefor, with or from any combination of the remaining module 600-700, as may be desirable for certain applications, even though FIG. 5 only illustrates exchange with implementation module 700, as will be described in further detail below.

Before turning to FIG. 8 and the execution of the exchange module 600, however, FIG. 7 further illustrates handling of received match data 617 (see step 535), which may comprise an indication (or otherwise some portion of data) that a third party and a consignor have been "matched" for customized content placement based upon execution of the exchange module, again as will be described further below. It should be understood in the context of FIG. 7 and the advertisement module 500, however, that upon generation and receipt thereof of match data 617, such may be subject to placement (e.g., by evaluating one or more consignor or consignee and/or third party-defined parameters—and still further carrier parameters), as previously described herein. Thus, upon retrieval of any pertinent or desirable consignor data 401, carrier data 402, and/or consignee data 403 in step 539, certain embodiments of the advertisement module 500 may be configured to similarly execute the placement tool 520 so as to determined, perhaps based upon a myriad conflicting parameters those specific situations in which placement of customized content is acceptable or otherwise permissible, all as has been described previously herein, but with the further incorporation of one or more third-party parameters, beyond and/or in addition to consignor and/or consignee parameters.

Upon execution of placement tool 520 under this "exchange-influenced" scenario, the advertisement module 500 according to various embodiments is configured to proceed in an analogous fashion to steps 570-580, again as previously described herein. A variety of use cases in this regard and otherwise are provided elsewhere herein, which further exemplify and clarify the distinction between execution of the advertisement module 500 in view of consignor-only initiated customized content versus in view of consignor and third-party combined initiated customized content generation.

c. Exchange Module 600

According to various embodiments and as previously mentioned herein, the exchange module 600 is generally configured according to various embodiments to execute one or more tools (e.g., a rendering tool 610 and a matching tool 615 and the like) so as to facilitate the third party-consignee advertisement exchange (e.g., matching) process (see also FIG. 5).

Turning now with focus upon FIG. 8, such illustrates non-limiting and exemplary steps that may be executed by the exchange module 600 according to various embodiments. If any third party data 404 is identified in step 620, the exchange module 600 proceeds to step 630; otherwise the module proceeds into a static loop via step 625 pending receipt of new (or any) third party data. During step 625, the exchange module 600 may be configured to passively stand by for receipt of data. In certain embodiments, the exchange module 600 may, in step 625, periodically (e.g., every 5 seconds, or at any desirable interval) proactively ping one or more databases contained within one or more of the modules 400-500, however as may be desirable. In certain embodiments, the exchange module 600 may ping or otherwise be in periodic or continuous communication with the implementation module 700 as well. Of course, various alternative data monitoring configurations may be envisioned, without departing the scope and nature of the present invention, as such are commonly known and understood in the art.

Remaining with FIG. 8, during step 630, a rendering tool 610 is executed upon identification of newly received (or otherwise pertinent) third party data 404 in step 620. Execution of the rendering tool 610 according to various embodiments during step 630, the accompanying retrieval of at least carrier data 402 in step 635, and/or the generation of render data 612 in step 640, may in certain embodiments proceed in substantially the same manner as previously described herein with respect to steps 540, 545, and 550 of the advertisement module 500 and the execution of the rendering tool 510 located therein. In at least one embodiment, the rendering tools 510, 610 may be substantially identical, but for that one is configured to process consignor-input data while the other is configured to process third-party-input data, relative to the carrier system 100. In still other embodiments, it should also be understood that the rendering tools 510, 610 may, in fact, be a single integrated rendering tool, such that a single tool may process and handle receipt of consignor and third party data, however as may be desirable for particular applications.

Returning momentarily to step 620, if "newly received" third party data 404 is identified in step 620, the carrier system 100 may be according to various embodiments to determine the precise nature of such data. For example, if the third party data 404 input into the carrier system 100 is merely general profile data for the third party associated with registration or setup of a third party account with the system (see FIGS. 10 and 11), such may be deemed in step 620 according to certain embodiments as not comprising "newly received" third party data 404 of interest and/or of the nature required to proceed to step 630. According to various embodiments, the nature and type of third party data 404 sufficient therefor may comprise initiation of an advertisement request by the third party, as may be understood with further reference to FIG. 14, which illustrates an exemplary third party advertisement submission and/or customization layout interface 1200 according to various embodiments of the carrier system 100.

It should be understood that interface 1200 of FIG. 14 may be in certain embodiments, substantially the same as interface 1000 of FIG. 12, described above in the context of the consignor and the advertisement module 500. In other embodiments, however, the two may be sufficiently distinct. In at least the illustrated embodiment of FIG. 14, the two are substantially identical, with the interface 1200 comprising various components necessary for input of a customized communication (content) request. Such components may include one or more of the non-limiting components of a promotional name 1202, a third party logo 1203-1204, a custom image 1205, a URL string 1206, and/or any combination thereof, as may be desirable for particular applications. Promotional messaging (as in FIG. 12) may also be provided.

In certain embodiments, the third party may also select one or more of format options 1201 for appearance of the requested customized communication or content. Non-limiting examples of such are illustrated in FIG. 14 (as in FIG. 12), which may position the logo to the side or atop promotional header information and/or dispense with all fields for a custom image containing embedded therein a customized URL or hyperlink, the latter of which as may be configured to lead a recipient thereof to additional promotional materials. Again, as previously mentioned, receipt and processing of customized data for any components 1201-1206 may be handled substantially the same as for components 1001-1006, as previously described herein, with the only difference being the components in FIG. 14 are third-party submitted to the carrier system 100, whereas those in FIG. 12 are consignor submitted.

Returning now with focus upon step 630 of FIG. 7, in which the rendering tool 610 is executed, such execution according to various embodiments results in the generation of at least some render data 612, which occurs (and/or is represented by) step 640. In certain embodiments, this process substantially mirrors that set forth and described herein with respect to rendering tool 510 and FIG. 7, in conjunction with the advertisement module 610. In that regard, it should be understood that generation of the render data 612 in certain embodiments, such as that illustrated in FIG. 8, may not be based upon the third party data 404 alone, however, as at least some portion of carrier data 402 may also be retrieved from the data module 400 during step 635, so as to further inform the generation of the render data by the rendering tool. This is evident further from FIGS. 5 and 15. FIG. 15, in particular, illustrates a preview rendering of a customized communication 1300, as may be generated (e.g., in the form of render data 612) via the exchange module 600 of the carrier system 100. As may be seen, various components input by the consignor (see FIG. 12) appear thereon, for example, as the custom image 1103. This preview rendering interface 1300 may be accessible and viewable to a user (e.g., the third party) of the carrier system 100 via interface 1300 (see FIG. 15), particular via selection of one or more icons 1207 (see FIG. 14), as may be configured to permit the user to "save for later" the submission, "preview" the submission, and/or submit the submission with no preview thereof. Specifically, selection of "preview" results in display of the interface 1300 of FIG. 14, although it should be understood that according to certain embodiments, even where preview may not be selected, rendering may occur (and just not be displayed to the user). Such may be preferable, for example, where rendering further incorporates a portion of the carrier data 402, as will now be discussed.

With reference back to FIG. 8 and in particular step 635 thereof, but with continued reference concurrently to FIG. 15, it may be understood that according to various embodiments the execution of the rendering tool 610 so as to generate render data 612 may include incorporation of at least some portion of carrier data 402. In certain embodiments, the carrier data 402 retrieved by the exchange module 600 may include delivery data, tracking data, and the like, as illustrated in fields 1301-1302 of the rendering of FIG. 15. Additional and/or alternative data may be retrieved, however as may be desirable for population of package identifying data that may be communicated to a consignee in conjunction with the promotional or advertisement content. Of course, in still other embodiments, at least at this stage, the rendering of steps 630-640 may not incorporate any package specific data, as such may be later generated and/or incorporated during execution of not only the placement tool 520 (as described above), but also and perhaps more importantly, the matching tool 615, prior to the execution of which the third party (and the third party's submitted data) have not been "matched" with an acceptable and/or otherwise receptive consignor for placement of the submitted data (e.g., customized communication content). This will all be described in further detail below.

In various embodiments, remaining with FIG. 8, it should be understood that a portion of the retrieved carrier data 402 in step 635 may, as with the execution of the advertisement module 500, comprise one or more parameters, as may be established by the carrier, for determining the appropriateness of any content uploaded by the third party. In particular embodiments, one or more carrier pre-established parameters may prohibit the use of certain offensive terms within uploaded content; in other embodiments, the use of otherwise trademarked terms may be prohibited, absent an indication that the consignor/uploader also owns the referenced trademark. Regardless of the content being examined for appropriateness or acceptability during the generation of the render data 612, it should be understood that in at least these and still other embodiments, the retrieved carrier data 402 may be utilized to further filter the final content being rendered, as may be desirable by the carrier service provider so as to ensure the services provided via the carrier system 100 are appropriate and remain attractive to still further potential registrants (e.g., other consignors, consignees, and/or third parties).

As yet another non-limiting example, according to various embodiments, the carrier system 100 must be configured such that the render tools 510 or 610 enforce any business rules established by the carrier (as may be documented within the carrier data 402). These could include, but are not limited to: (1) shipper logo image size limits; (2) text content character limitations; (3) defined customization area/size limitations, and the like. As content submissions are processed, the carrier system 100 must also, and is so configured in these and still other embodiments, to screen submissions for words included on "forbidden word lists," which lists may be country and/or language specific or otherwise determined according to a variety of factors. In at least one embodiment, error messages may be produced by the carrier system 100 in this regard if content provided is not in a "matched consignor's" and/or a "placed consignee's" preferred language. Still other possibilities exist, as should be understood to be captured within the scope and spirit of the present invention.

With reference now to step 565 of FIG. 7, according to various embodiments, upon generation of render data 612, the exchange module 600 is configured to proceed in this step to execute a matching tool 615, via which the data submitted by the third party is matched with one or more consignors, via the carrier system 100 and based upon a plurality of parameters (e.g., submission valuation, consignor parameters (e.g., as may be retrieved during step 655 as a portion of consignor data 401), third party parameters, and/or carrier parameters). Upon matching, the carrier system 100 may be configured according to various embodiments to further execute placement tool 520 so as to facilitate actual placement of the third-party content with communications sent to one or more consignees receiving packages from the consignor. In this manner, the exchange module 600 and the third party—to—consignor "matching" provided thereby may be best understood as any additional analytical layer, processed via the carrier system 100 (specifically via the exchange module 600 and the matching tool 615 thereof) prior to placement of any customized communication content with any consignees. In other words, only once the third party (and their advertisement) is matched with the consignor, does the carrier system 100 perform additional "placement" analysis so as to apply the third party-consignor matched custom content with consignees associated with the consignor, all as will be described in further detail below.

With reference specifically to step 660, execution of the matching tool 615 results in the generation of match data 617, which may comprise some indication of a "match" between consignor and third party parameters (or desires for advertisements), such that the third-party submitted content may be acceptable for the consignor for inclusion on one or more packages shipped by the consignor to one or more consignees. Of course, in certain embodiments, subsequent approval may be necessary from the consignor prior to finalizing any match, as will be described elsewhere herein in the context of the implementation module 700; however, at this stage it should be understood that the match tool 615 of the exchange module 600 has, in step 660, identified one or more feasible (e.g., possible) matches between consignors and the third party submitted data, based at least in part upon one or more preferences and/or criteria, as may have been pre-established by the consignor, the third party, or both.

In any scenario (as may be understood further with reference to the various Use Cases incorporated further below herein), according to various embodiments, upon generation of match data 617, the exchange module 600 may be configured to transmit at least such data to the placement tool 520 of the advertisement module 500, for further processing thereof, as previously described herein. For instance, the placement tool 520 may further determine placement of the customized content with respect to one or more consignees associated with a consignor, subsequent to the matching of the third party with that consignor. Of course, in these and still other embodiments, concurrently with and/or prior to transmission of data 617 to the advertisement module 500 upon identification of a "match," such data (or a portion thereof) may be additionally transmitted to the implement module 700, which may in turn generate one or more notifications for transmission to one or more users (e.g., consignors) of the system, for example, for approval of the identified "match." These and other implementation-based features will be described further below with reference particularly to the implementation module 700.

d. Implementation Module 700

According to various embodiments and as previously mentioned herein, the implementation module 700 (see FIGS. 3 and 5) is configured to generate periodic or timely notifications 712, customized communications 714, and/or reports 716 (see FIG. 9) and/or transmit the same to one or more users of the carrier system 100. Exemplary customized communications appear in FIGS. 16-17, namely as Estimated Delivery Alert 1400 and customized Shipping Label 1500, both as will be described elsewhere herein.

FIG. 9 illustrates non-limiting and exemplary steps that may be executed by the implementation module 700 according to various embodiments, whereby if "newly received" data is identified in step 720, the implementation module 700 proceeds to step 730; otherwise the module proceeds into a static loop via step 725 pending receipt of new data. During step 725, the implementation module 700 may be configured to passively stand by for receipt of data. In certain embodiments, the implementation module 700 may, in step 725, periodically (e.g., every 5 seconds, or at any desirable interval) proactively ping one or more databases contained within one or more of the modules 400-600, however as may be desirable. Of course, various alternative data monitoring configurations may be envisioned, without departing the scope and spirit of the present invention, as such are commonly known and understood in the art.

Remaining with FIG. 9, during step 730, the implementation module 700 is configured to execute an implementation tool 710, which is generally configured to at least initially determine, in step 735, the type of data that has been received. If placement data 522 is identified as having been received, such is determined via step 740; if match data 617 is identified as having been received, such is determined via step 760. Subsequent processing by the report tool 710 in each scenario is described, in turn, below.

As an initial matter, with reference again to FIG. 9, in either instance, should placement data 522 or match data 617 be identified as having been received, the implementation module 700 according to various embodiments may be configured to determine whether one or more reports 716 (not shown in FIG. 5) are required. Determination may be based at least in part upon one or more of (or any combination of) consignor preferences, consignee preferences, third party preferences, and/or carrier preferences. As non-limiting examples, data may be made available to one or more users of the carrier system 100 in the form of daily or otherwise periodic reports. Such daily or periodic reports may detail statistics such as the total number of notifications or customized communications sent by account (e.g., consignor, consignee, third-party) number, with such notifications being sent to any of a variety of users of the system, as may be determined by the implementation module 700 based at least in part upon one or more criteria, preferences, and/or parameters pre-established by one or more of the consignors, consignees, and/or third parties. According to various embodiments, as described in further detail elsewhere herein, one or more unique algorithms may determine when/where/how to send customized communications, messages, and/or advertisements, as such are interchangeably referred to herein, which determination may be based upon one or more parameters, business rules, and/or user preferences, as also described elsewhere herein. The one or more unique algorithms, amongst other capabilities, are configured according to various embodiments to resolve conflicts between any competing parameters, business rules, and/or preferences and to take desired action/steps based thereon.

Additional non-limiting examples of periodic reports may include custom reports by account number, custom reports by shipments per account sent with custom notifications and/or communications, the number of customized accounts opened over a period of time, and/or any of a variety of options, as may be desirable for particular scenarios. The periodic (e.g., daily) reports may contain any of a variety of textual and/or graphical and/or audio or video-based data, again, however as may be desirable and however as may be pre-established via one or more user-defined parameters. Returning now with focus upon FIG. 9, it may be seen that upon determination in step 780 that one or more reports 716 are necessary and/or otherwise desirable, the module 700 is configured in certain embodiments to proceed in step 790 to transmit the same to one or more users of the carrier system 100, as described elsewhere herein.

Returning now to step 760, upon identification of receipt of match data 617, according to various embodiments, the implementation module 700 may be configured to proceed in step 765 to generate one or more notifications 712 or alerts to one or more users of the system regarding the same. In certain embodiments, the notifications 712 may be configured so as to require further user input (e.g., approval) of the match data 617 (e.g., the match identified by the system as between a third party and a consignor) prior to the finalization thereof. In at least one embodiment, the notification 712 may comprise a communication to the consignor requesting approval of a particular match with a third party's specifically submitted content, only upon approval (e.g., response thereto) thereof will the module 700 proceed to further place the matched content with one or more consignees associated with the consignor. In other embodiments, the notification 712 may comprise a communication to (see step 770) the third party, seeking similarly approval therefrom of any identified potential match prior to the finalization thereof. Of course, in still other embodiments, no notification of this nature may be required, for example where users (e.g., consignors and/or third parties) have previously consented to automatic action taken by the carrier system 100, whether with respect to "matching" or otherwise.

Remaining momentarily with steps 765 and 770, although such are illustrated in FIG. 9 in the context of receipt of match data 617 in particular, it should be understood that in still other embodiments, one or more users of the system may request notification of any changing data, for example a carrier may wish to be notified upon upload of new third party data. These and a variety of other notifications or alert mechanisms may be envisioned within the scope and spirit of the present invention, as such may be transmitted through a variety of known communication mediums and in a variety of formats, all as have been described elsewhere herein.

Returning now to step 740, upon identification of receipt of placement data 522, the implementation tool 710 is configured according to various embodiments to proceed to step 745, during which one or more customized communications 714 are generated and then subsequently, in step 750, transmitted to one or more users of the carrier system 100, as such has been described herein. The customized communications 714 may comprises a customized email alert, a customized package label alert, a combination of both an email and package label alert, a message embedded onto a package label textually, a message embedded onto a package label via a barcode or other machine-readable symbol placed thereon, and/or still further possibilities, as such avenues, mediums, and forms of communication exist.

It should be understood, of course, that during step 745, only particular and/or specific customized communications 714 are generated, based at least in part upon some resolution of a plurality of consignor, consignee, and/or third party preferences and/or parameters by the placement tool of the advertisement module 500, as previously described herein. That being said, the generation of the customized communications 714 in step 745 may further account for these parameters, for example, in a secondary or "fail-safe" manner so as to ensure that consignees receive only those advertisements or otherwise customized content in the time, place, and/or manner in which they have requested (e.g., based upon their pre-established parameters).

Similarly, beyond the generation of the customized communications 714, the transmission thereof in step 750 may be further influenced by the one or more parameters or preferences of one or more users of the carrier system 100, as the system may (or may not) have taken into account during the execution of the advertisement module and in the preparation of the placement data 522 for transmission to the implementation module 700. Of course, in certain embodiments, the actual transmission of the customized communication may depend further at least in part upon the occurrence of one or more "trigger" events (as described elsewhere herein), such that the transmission in step 750 may be delayed for some period of time subsequent to the generation of the customized content and/or placement data 522.

With reference now to FIGS. 16 and 17, exemplary customized communications 714 are illustrated. In FIG. 16, an exemplary customized consignee alert 1400 (for impending delivery of a package requiring signature thereon) is illustrated. The alert 1400 may include a variety of carrier data, such as tracking, delivery, and service information 1403. Still further, however, the customized alert 1400 may incorporate content generated by the implementation module 700, including an advertiser's logo 1404 (whether the consignee or a third party), a promotional message 1405, and even a sharable link 1406, via which the recipient (e.g., consignee) may pass the promotional offer along to others and/or otherwise further transmit the customized content for separate viewing thereof. It should be understood that the alert 1400 of FIG. 16 is exemplary and non-limiting in nature and a variety of alternatively formatted alerts and/or messages may be generated via the carrier system 100 described herein, including custom package shipment labels, such as that illustrated in FIG. 17 and described, in turn, below.

In FIG. 17, as noted, is illustrated an exemplary and non-limiting shipping label 1500, upon which generic and commonly known data 1501-1507 may be placed. Such data may include barcodes (e.g., barcode 1507) and/or even machine-readable symbols 1503. Still further, however, according to the various embodiments described herein, the shipping label 1500 may include further customized content, as may be "matched" with the consignor or shipper (here the United Parcel Service as indicated in field 1501) and/or further placed with the consignee (here John Smith as indicated in field 1502), as a recipient of a package shipped by the consignor. According to various embodiments, as detailed elsewhere herein, in particular via the exemplary Use Cases provided below, the customized content 1508 may be as described previously herein, communicating to the consignee a promotional offer, as which may be provided based upon a variety of parameters evaluated by the tools and modules of the system. In certain embodiments, the customized content 1508 may be visually-evident on the shipping label 1500; however, in other embodiments, the customized content may be otherwise embedded within a barcode 1507, a tracking number 1506, a machine-readable symbol 1503, or otherwise, however as may be desirable for particular applications and still further as outlined via the various Use Cases described below.

3. Exemplary Scenarios (e.g., Use Cases) Utilizing the Carrier System 100

The following details a variety of exemplary and non-limiting scenarios involving the utilization of the carrier system 100 and its associated components to provide customized communications (e.g., alert, messaging, and/or package label-based) between a consignor (or a third party) and a consignee, at least during the transport and delivery of one or more packages to the consignee from the consignor. Certain of the scenarios further detail the third party advertisement exchange operated via the carrier system 100, such that third party entities may submit advertisements for matching (e.g., pairing) with consignors receptive of receiving and passing along such advertisements to consignees receiving one or more packages from the consignor. As should be understood, and as previously described herein, such scenarios involve the meshing of a variety of user-established parameters, including consignor parameters, third party parameters (where applicable), and consignee parameters, at least the latter of which proving controlling in many embodiments.

Customized communication scenarios and third party exchange scenarios are described, in turn, below.

a. Custom Communications Use Case #1

According to various embodiments, a consignor may request generation of a customized communication (e.g., one containing an advertisement) for packages sent by the consignor to consignees registered with the carrier system 100. The consignor may indicate that it wishes the customized communication to be sent to all registered consignees to which it ships in certain embodiments; however, in other embodiments, the consignor may indicate one or more subsets or groups of the registered consignees for advertisement targeting. Subset or group targeting may be based upon a variety of factors, including geographic location of the consignees, volume ordering by the consignees, and the like.

In exemplary and non-limiting use case #1, the consignor enrolls or otherwise registers with the carrier system 100. The consignor indicates their desire to generate "customized" content for only email alerts. With reference to FIG. 12, the consignor then uploads customized message components, which may include a promotional name 1002, a promotional header 1003, a promotional message 1004, a consignor logo 1005, a URL string 1006, and/or any combination thereof, as may be desirable for particular applications. In certain embodiments, the consignor may input and/or otherwise upload these components (or any combination thereof) to the carrier system 100 via the customization layout interface 1000 of FIG. 12.

Remaining with FIG. 12, upon upload of the desirable customizable data components, the consignor may request rendering of a preview 1007 of the requested customized communication. In this manner, the customized communication may be further reviewed and/or approved by the consignor prior to final implementation thereof. Of course, in certain embodiments, the consignor may choose to simply submit the request (see also FIG. 12) without further review or approval. In either scenario, however, upon receipt of uploaded customizable data components (e.g., consignor data, as previously described herein), the carrier system 100 proceeds to render the requested communication (see also Rendering Tool and associated components previously described herein).

According to various embodiments, upon rendering, an illustration of which as appears in FIG. 13, the carrier system 100 requests approval of the rendering from the consignor. Specifically, in the rendering interface 1100 of FIG. 13, the consignor may view not only the requested customized components (e.g., the promotional message 1104, the promotional logo 1103, and/or the promotional URL link or hyperlink 1105), but also package and/or shipment data potentially pertinent to the consignee, as will be provided concurrently with the customized components. Such package and/or shipment data may comprise delivery notification components 1101 (e.g., a scheduled delivery date) and package data 1102 (e.g., a tracking number and an identification of the shipper). If the consignor approves the rendering provided via interface 1100, such may be submitted via interface component 1106, also as illustrated in FIG. 13.

Returning generally to Custom Communications Use Case #1, at some time following the above submission, rendering, and approval of a consignor-requested customizable message, the consignor may ship a package via the carrier shipping system (e.g., WorldShip or the like). Upon initiation of such shipment, the carrier system 100 is configured according to various embodiments to recognize that the packages are designated for a registered consignee. Thus, the carrier system 100 determines what, if any, customized communications are appropriate. This determination is based at least in part upon the consignor parameters (here the limitation to only email alerts) and consignee parameters. Upon analysis and merge of the consignor and consignee parameters, the carrier system 100 in this particular scenario determines that the consignee parameters permit email and package label alerts—thus the customized communication may be transmitted via an email alert. No custom package labels, however, are provided, as the consignor has not requested such.

Accordingly, under this use case, upon the carrier system 100 generating one or more email alerts for transmission to the consignee, as may be generated based upon an arrival scan in a destination city for the package being transported, the carrier system ensures that the generated and transmitted email alert contains the customized content requested by the consignor. An exemplary illustration of such appears in FIG. 16, which illustrates a non-limiting and exemplary email alert to a consignee, advising in data field 1401 that the package will arrive tomorrow and that a signature is required for delivery. In data fields 1404-1406, the customized content requested by the consignor may be seen, including the consignor logo 1404, the consignor promotional information 1405, and/or a sharable link 1406, via which the consignee may further share the promotional offer in at least certain embodiments. Additional features and/or tools may be accessible to the consignee, for example, via components 1402, as may be provided for all consignees registered with the carrier system 100 (as described elsewhere herein in the context of carrier data 402 and consignee data 403).

b. Custom Communications Use Case #2

According to various embodiments, a consignor may, as above in Use Case #1, enroll with the carrier system 100, but in this scenario request a customized package label option only. In certain embodiments, the customized package label option may involve generation of a supplemental label for placement on the package adjacent a primary label containing package shipment data; however, in other embodiments, the customized package label option may involve generation of a combination label for placement on the package, such that the combination label includes all pertinent package shipment and customizable (e.g., advertisement) data.

As with Use Case #1, under this scenario the consignor again uploads all desired customizable data (see again FIG. 12), with rendering and approval occurring as above. At some point, the consignor likewise ships a package via the carrier shipping system, at which point the carrier system 100 described herein recognizes that the package (or packages) is designated for one or more registered consignees (e.g., those who receive alerts, notifications, and the like). As in Use Case #1, the carrier system 100 determines what, if any, customized communications are appropriate. This determination is, as before, based at least in part upon the consignor parameters (here the limitation to only package label-based communications) and consignee parameters. In this scenario, the consignee parameters are identified as permitting both email and package label alerts. Thus, upon merge of the consignor and consignee parameters, the carrier system 100 according to various embodiments generates and places upon the package(s) a customized label (whether in combination or supplemental format, as noted previously). Due to the conflicting parameters, however, no email alerts are provided, as the consignor has not requested such.

With reference momentarily to FIG. 17, an exemplary customized shipping label 1500 is illustrated. According to various embodiments, the customized shipping label 1500 may include various pieces of information, as such are commonly known and understood to be located on a shipping label. Such information may include, for example, a consignor or shipper address 1501, a consignee or recipient address 1502, a package weight 1503, a tracking number 1506, a routing code 1504, a service code 1505, and one or more machine-readable symbols 1503, 1507. The machine-readable symbols, in various embodiments, may be a Maxi-Code, a PDF417 code, a Micro PDF417 code, a QR code, a conventional barcode or any comparable symbol as generally known and used in the art. For purposes of illustration, the MaxiCode is a public domain, machine-readable symbol that resembles a barcode, but use dots arranged in a hexagonal grid instead of bars. MaxiCodes can be helpful in tracking and managing the shipment of packages. In the embodiment illustrated, however, the customized shipping label 1500 further comprises a customized advertisement 1508, which may contain the consignee's logo, a promotional message, and/or a URL hyperlink configured to direct a recipient of the package (e.g., the consignee) to further promotional offer-related information.

In certain embodiments, it should be understood that in addition to the customized advertisement 1508 (or alternatively to the same), at least one of the machine-readable symbols 1503, 1507 may be configured so as to contain embedded therein all (or a portion) of the information illustrated in the customized advertisement 1508. This may be particularly advantageous when labeling space constraints may exist, for example, due to a small size of a package. In such embodiments, the customized advertisement 1508 and its associated data (including any URLs or hyperlinks or the like) may be retrievable by scanning one or more of the machine-readable symbols 1503, 1507 with a conventionally known and readily understood scanning device. In at least one embodiment, the scanning device may be configured to display for the consignee the retrieved customized advertisement data 1508 upon a display screen of the scanning device. Of course, any of a variety of retrieval and display formats may be envisioned without departing from the intended scope of the present invention.

c. Custom Communications Use Case #3

According to various embodiments, a consignor may, as above in Use Cases #1-2, enroll with the carrier system 100, but in this scenario request a customized tracking number embedded message. In certain embodiments, as has been described elsewhere herein, the embedded content may include one or more of a variety of types of communications (e.g., text, audio, video, and the like) and such may be accessed (or made accessible) based upon one or more user-defined parameters (e.g., only upon an event-based trigger, also as described elsewhere herein). The embedded content functionality may be understood with reference to FIG. 17 and the description in Use Case #2 above regarding embedded messages within a tracking number and/or customized tracking numbers—for example within a barcode that may be scanned by carrier personnel and/or a consignee, and/or others using for example a mobile application (i.e., mobile app) during any point in the transportation process after tendering the package to the carrier, however particularly upon receipt of a package (e.g. to provide a message/advertisement to the consignee, coupons, instructions, etc.). In requesting such option, upon registration with the carrier system 100, a consignor may upload customized audio, graphic, picture, video, and/o hologram materials for inclusion in the customized advertisement data to be provided to consignees and upon package labels. Still other formats of data may be uploaded to the carrier system without departing from the spirit of the present invention.

In certain embodiments the message/advertisement may be linked to the tracking number in addition to the package status information and/or other carrier information. Including, carrier data generated by transportation service providers either during transport and/or at delivery. This information will then be "linked" to the tracking number, as may be supplied by the carrier in one or more fashions as have been described previously and elsewhere herein, including via incorporation by reference of additional pending patent applications in this regard owned by applicant.

As with Use Cases #1-2 above, rendering and/or approval of the uploaded data may occur. At some point, the consignor likewise ships a package via the carrier shipping system, at which point the carrier system 100 described herein recognizes that the package (or packages) is designated for one or more registered consignees (e.g., those who receive alerts, notifications, and the like). The carrier system 100 then again determines what, if any, customized communications are appropriate. This determination is, as before, based at least in part upon the consignor parameters (here the limitation to only embedded tracking number options) and consignee parameters. In this scenario, the consignee parameters are identified as permitting both email and package label alerts, further requesting that if any package labels communications are provided, such contain only textual, audio, and/or graphical data (e.g., no videos or holograms). Thus, upon merge of the consignor and consignee parameters, the carrier system 100 according to various embodiments generates and places upon the package(s) a customized label containing a barcode or otherwise customized and readable tracking number that contains embedded textual, audio, and/or graphical data. Due to the conflicting parameters, however, were the consignor to have only uploaded video data for embedding within the tracking number, no customization would occur given the consignees preferences excluding such communications.

d. Custom Communications Use Case #4

According to various embodiments, a consignor may, upon registration with the carrier system 100 described herein, upload customized data components and request transmission thereof via email alert, package label, and embedded tracking number communication mediums, all as previously described herein with respect to Use Cases #1-3. In certain embodiments, such could conceivably result in at least three separate forms of customized communication to a consignee, depending upon one or more preferences or parameters established by the consignee.

For example, consider that in this use case #4, the consignor uploaded audio and video data for transmission via email alerts, package label data, and embedded in tracking numbers provided as part of the package label data, thus ensuring that consignees to which the consignor ships receive the promotional material via three avenues, should the consignee overlook or ignore one or more thereof. The data uploaded by the consignor includes a hyperlink to a video file. When shipments arrive, one is directed to consignee A; another to consignee B; and another to consignee C.

Consignee A has established no limiting parameters; thus, consignee A receives customized communications via each of the three avenues requested by the consignor. Consignee B has established limiting parameters to exclude any package-label based communications; thus the customized communication from the consignor to consignee B proceeds only via email alerts, when such are generated by the carrier system according to carrier-imposed parameters. Consignee C has established limiting parameters such that email alerts may include video files (or hyperlinks thereto) but that package-label based communications may not include video files.

Thus, under this scenario, the customized communications to consignee C are further tailored by the carrier system 100 described herein, such that communications are customized for each of the two available transmission mediums, with differing information being transferred through each, based here at least in part primarily upon the limitations imposed by consignee C. It should be understood, of course, that limitations may be likewise imposed by the consignor, as such may be based upon additional factors such as the identity of the consignee, the volume of orders placed by the consignee, and the like. In such scenarios (although not expressly recited as a distinct Use Case), the customization may be further filtered, for example where the consignor may limit promotional offers to consignees having at least 20 shipments a month. Under such a hypothetical scenario, only consignee C may qualify, in which case no customized communications would be transmitted to either of consignees A or B. Indeed, a variety of alternatives and/or combinations of possibilities may be envisioned, without departing from the spirit of the present invention.

e. Custom Communications Use Case #5

According to various embodiments, a consignor and consignee may establish parameters as in Use Case #4, as described previously, but the carrier system 100 is configured to combine all alerts or communications of a particular type so as to avoid duplicative communications, where such may be undesirable. In certain instances, it will be recognized that inundating consignees with a plurality of messages or communications may prove counterproductive. As a result, streamlining of communications may be desirable.

With reference to Use Case #4 above, it may thus be understood that the package label based communications may be combined, such that the consignee does not necessarily receive both an advertisement illustration (see component 1508 of FIG. 17) and customized advertisement data embedded within a barcode or otherwise machine-readable symbol or consignee is about to receive multiple messages which are the same from the consignor and/or carrier (see 1503 or 1507 or even 1506 of FIG. 17). For example, where a consignee may be about to receive multiple status messages, whether standard-based or otherwise parameter or preference-defined, one or more of the consignor and/or carrier may combine such multiple messages under this use case into a single custom message, so as to minimize the volume of messages with which a consignee may be inundated. For example, the combined communication may be determined based at least in part upon further defined consignor or consignee parameters, whereby as a non-limiting example, the consignor may identify embedded communications as taking priority over package-label placed illustrations—thus, in such scenario only embedded communications would be provided. Still further, in certain scenarios, the consignee preferences may still further control, such that if the consignee requests only alert messages if such are provided, in such scenario no package or label-based communications would be provided.

Indeed, a variety of alternatives and/or combinations of possibilities may be envisioned without departing from the spirit of the present invention; however, it should be understood that generally speaking Use Case #5, as described herein, addresses the possibility of the carrier system 100 described herein combining multiple communications from a consignor to a consignee into a single "combined" communication, whenever such may be preferable, either to the consignor or the consignee or otherwise (e.g., even to the carrier or common carrier provider).

f. Custom Communications Use Case #6

According to various embodiments, a consignor and consignee may establish parameters as in Use Cases #4-5, and also register with the carrier system 100 described herein, but under Use Case #6, the consignor may request only that customized alerts or communications may sent only for Late Delivery notifications. Of course, it should be understood that consignor and/or consignee may establish a variety of parameters in this regard, so that any of a variety of "triggering events" for messages or communications may (or may not) be customizable), such that the carrier system 100 described herein is tasked with merging such parameters (e.g., via the placement tool 520 described previously herein), such that only permissible customizations are transmitted.

In this particular Use Case #6, the consignee may have registered with the carrier system 100 to receive a plurality of "trigger event" notifications, as have been previously described herein—including not only Late Delivery but reroute notifications, signature requirements, and the like. In this scenario, however, because the consignor has limited customizable content to Late Delivery notifications only, the carrier system 100 customizes only those messages. This may prove particularly beneficial where the consignor decides to send a 10% off promotional offer to all consignees receiving packages from the consignor, but only wants to provide such offer when package delivery is delayed or otherwise impacted such that a Late Delivery notification is warranted. Thus, in this particular scenario, no customized notifications would be generated by the carrier system 100 unless such occurs in the context of a Late Delivery "trigger event" and the subsequent notification therefor.

g. Custom Communications Use Case #7

According to various embodiments, as previously described herein, the acceptability of custom content (e.g., advertising) on certain communications as between a consignor and a consignee may be further adjusted based upon one or more consignee classifications, which may at least in part be established by factors beyond the direct control of the consignee (e.g., via one or more regulations). Thus, in this use case, where the consignor and the consignee user-defined parameters are resolved such that only email-based alerts are transmitted, the content of those alerts may be further adjusted based upon one or more classifications associated with the consignee. For example, if the consignee has not registered with a premium or preferred service with the carrier (and/or if the consignor has not likewise so registered), the customized content may be redacted from the communication, even where otherwise considered acceptable in view of the user-defined parameters. In another non-limiting example, if the consignee is foreign-based, one or more regulations of that foreign-based jurisdiction may prevent the sending of customized advertisement-based content to the consignee if the consignee is an individual entity (e.g., residential versus commercial based). Under such circumstances, various embodiments of the system described herein are configured to further adjust the final approved custom content based not only upon the user-defined parameters, but also such externally defined classifications and/or regulatory requirements, however as may be applicable. Thus, continuing with the non-limiting example, where only email alerts are acceptable and foreign-jurisdictional based regulations prevent transmission of advertisements to residential consignees, if the consignee is so classified, any custom content would be redacted or otherwise removed from the email alerts.

In a related scenario, it may be envisioned where jurisdictional based regulations may permit customized advertisement content, but only under certain conditions. Remaining with the above-noted non-limiting example, the regulatory regime may establish that no custom content is permissible but for those scenarios where a discount or coupon may be transmitted in the event of a service exception (e.g., late or delayed delivery notifications). Thus, under the present scenario, if the package being sent to the residential foreign-based consignee were delayed for 24 hours due to weather delay, customized content would be permissible and thus transmitted via the further acceptable medium of email alerts. Of course, no package label based customized content communication would occur in this example, even though acceptable under the regulatory regime due to the consignee's preference to only receive email alert notifications. Thus it may be understood that a multi-tiered hierarchy of "business rules" may be established as to the various parameters, preferences, classifications, and/or regulations, as described elsewhere herein—with the implementation of any customized content via the system being based at least in part upon a combined analysis thereof.

h. Custom Communications Use Case #8

According to various embodiments, as previously described herein, the custom content to be placed, for example, within an email alert may be adjusted beyond the resolution of any conflicts between consignor and consignee preferences and/or parameters. For instance, in certain embodiments, the custom content may be further adjusted based upon a multi-tiered hierarchy within consignor parameters alone. Consider where the consignor establishes account generic custom content advertisement providing a 5% discount to all shipments ordered between July 1 and July 31. That same consignor may also establish event specific custom content advertisement providing a 10% discount when a specific package or item encountered delayed delivery conditions. That same consignor may also establish a buy-one-get one free coupon for all orders placed on Tuesdays between 8 am and 5 pm.

In a non-limiting scenario utilizing the above hypothetical advertisements and/or coupon discounts, the consignor may indicate universally that all event or package specific content takes priority over any account generic custom content. Thus, if a particular package encounters delay, the 10% discount will be offered versus the 5% discount. Similarly, if the package was ordered on a Tuesday between 8 am and 5 pm, the buy-one-get-one free coupon will be offered versus the 5% discount. In certain scenarios priority rules may be further established as between event-specific (the 10% discount) and package-specific (the buy-one-get-one free coupon), however as may be desirable to the consignor, who may further customize the one or more business rules so as to provide a unique multi-tiered hierarchy, as described elsewhere herein.

i. Third Party Advertisement Exchange Use Case #1

According to various embodiments, the third party advertisement exchange described elsewhere herein is configured to facilitate "matching" of third party entities seeking to convey advertisement or promotional materials to consignees (e.g., recipients) of packages with the consignors shipping those packages. Depending upon one or more criteria or parameters established by one or more of the following the third party entities, the consignors, the carrier and/or consignees, matching may or may not occur. Still further, as previously described herein, even once matching occurs, placement of the customized content may or may not occur depending upon whether the third party and/or consignor parameters further conflict or merge with consignee parameters, as such have been previously outlined with respect to the Custom Communication Use Cases #1-6 above. Generally speaking, before delving into Use Case #1 for the Third Party Advertisement Exchange, it should be understood that any of the above-described Use Cases, focusing upon consignor-submitted customized data may be also applicable where third party entities submit the customized data instead, as will be described in turn below.

Specifically now considering the Third Party Advertisement Exchange Use Case #1, a consignor may authenticate and register with the carrier system 100 described herein and as an aspect thereof further register for participation in the Advertisement Exchange program, as may be implemented for example via the exchange module previously described herein. During the registration process, the consignor provides shipper profile data (or consignor data, as previously described herein), with such specifically including at least an industry type, shipment type, and merchandise type for future reference. The exchange program of the carrier system 100 describes herein may in certain embodiments post the consignor profile data, to which and based upon which third party entities may submit requests for "matching." In other embodiments, the consignor profile data may not be posted; instead, third party entities may submit their own profile data and requested advertisements or promotional content, with the carrier system based thereon internally conducting a matching process. Once one or more matches are identified, the consignor and/or the third party are notified thereof, for their respective approvals of the possible match.

According to this particular Use Case #1, the consignor may periodically (e.g., daily) receive proposed "work products" from one or many third parties seeking to advertise on packages shipped by the consignor. The consignor determines which (if any) of the "work products" to accept and the carrier system 100 described herein then notifies the third party advertiser of the same. If the third party wishes to further review and/or approve, an opportunity may be provided in that regard as well. In any event, once approved, the carrier system 100 stages the "work product" via a message/content exchange interface 1200, as illustrated in at least FIG. 14. In certain embodiments, the third party may likewise be able to stage such data, via the upload thereof; in other embodiments, the third party submitted data may be otherwise communicated to the consignor and uploaded in the manner illustrated in FIG. 14 (e.g., for staging) only upon consignor approval of the "match" there-between.

According to various embodiments with respect to Use Case #1, the carrier system 100 is configured further to recognize when one or more packages are designated for registered consignees (e.g., those using the carrier system, those accepting at least some customized content, or the like). Based upon various consignee parameters, consignor parameters, and/or third party parameters, the carrier system 100 determines what customized content is generated and/or transmitted. For example, while the third party and the consignor may both agree (e.g., with respect to their respective parameters) that video-based content is permissible, the consignee may establish one or more preferences limiting or otherwise "opting out" of receiving video-based content. In such instances, only that third party and consignor "matched" content that is not video-based content will be transmitted to the consignee. Such may be via customized email alerts or other transmitted communications; in other embodiments, such may be additionally and/or alternatively via standard or customized labels located on the package(s) themselves, all as previously described herein.

j. Third Party Advertisement Exchange Use Case #2

According to various embodiments with respect to Use Case #2, a third party entity may (similarly to the consignor and/or the consignee) register with the carrier system 100, and in particular with the advertisement exchange program of the carrier system, as described elsewhere herein. Use Case #2 addresses various particularities from the third party entity's perspective.

On a particular day, the third party advertiser may authenticate and register for the advertisement exchange program of the carrier system 100. The third party provides profile information related to the third party company (e.g., industry type, shipment types, merchandise, etc.). The carrier system may be configured to accept consignor requests for advertisement content, much as described above with respect to the reverse (e.g., third party submissions of content, later matched with consignors). In this use case scenario, the consignor submits requests for specific types of advertisements and the third parties can determine which requests to accept. In certain embodiments, the carrier system 100 is configured to match the requests and submission, as described elsewhere herein, regardless of who submits the request (consignor or third party) and who submits the content (consignor or third party). Indeed, a variety of configurations may be envisioned without departing from the spirit of the present invention.

Returning to Use Case #2, once a "match" has been created at least in part by the third party accepting a particular consignor's request, the carrier system 100 notifies by the consignor of such match, which may be subsequently subject to approval by the consignor. If accepted and/or otherwise finalized by the system 100, the consignor (or the system) stages the work product via an interface 1200 such as that illustrated in FIG. 14. Content submissions via the interface 1200 may include format selections 1201, promotional name data 1202, logo data 1203, a logo URL 1204, a customized advertisement image 1205, and a customized URL associated with the customized advertisement image 1206. One or more renderings 1300 (see FIG. 15), as such have been previously described elsewhere herein may also be made available to the consignor and/or the third party during staging of the "work product."

At some point in time, the carrier system is configured further to recognize when one or more packages are designated for registered consignees (e.g., those using the carrier system, those accepting at least some customized content, or the like). Based upon various consignee parameters, consignor parameters, and/or third party parameters, the carrier system 100 determines what customized content is generated and/or transmitted. For example, while the third party and the consignor may both agree (e.g., with respect to their respective parameters) that video-based content is permissible, the consignee may establish one or more preferences limiting or otherwise "opting out" of receiving video-based content. In such instances, only that third party and consignor "matched" content that is not video-based content will be transmitted to the consignee. Such may be via customized email alerts or other transmitted communications; in other embodiments, such may be additionally and/or alternatively via standard or customized labels located on the package(s) themselves, all as previously described herein. In this regard, Use Case #2 is substantially the same as Use Case #1, previously described herein.

k. Third Party Advertisement Exchange Use Case #3

This particular Use Case provides a deviation, as alluded to above in Use Cases #1-2, in which not only may the generation and transmission of notifications and/or otherwise customized content be controlled and/or otherwise filtered based at least in part upon a plurality of consignor and third party-defined parameters, such that "matches" occur only upon a merging of such parameters, but also, even upon occurrence of a "match" the data may be further filtered and/or customized based upon one or more customized parameters established by the consignee.

With reference back to the basic customized communication use cases, it should be understood that the nature and types of notifications or communications sent by the consignor to the consignee may be controlled at least in part based upon consignee defined parameters, such that for example the consignee may request that no video-based communication be sent to them. In such a scenario, were a consignor and a third party matched based upon their mutually-interacting parameters and/or criteria such that the carrier system 100 determined that all of the consignor's shipments to its consignees would contain the third party's advertisement, such may nevertheless be further impacted by the parameters imposed by one or more consignees.

Consider with reference to FIGS. 14 and 15, wherein a rendering 1300 is provided whereby the consignor Zappos, Inc. has been matched with third party Nike Shoes, Inc., such that shipments from Zappos to its consignees that contain one or more pairs of shoes contain on customized messages (and/or customized labels) an offer for up to 40% off Nike shoe products, presumably on future orders, perhaps within a predetermined period of time. In at least one embodiment, the embedded advertisement content 1303 of FIG. 15 may be linked via an embedded hyperlink to further video and/or audio content—or alternatively and/or additionally to further content setting forth terms and conditions of the offer. While Zappos and Nike may together agree (based upon their parameters) that hyperlinks to further video content are acceptable, at least one consignee receiving a package from Zappos may have pre-established consignee parameters excluding any and all types of video-based advertisements on their alerts and/or package labels. Thus, in such scenario, any video-based content of the advertisement staged between Zappos and Nike would be further "scrubbed" or filtered via the carrier system 100 described herein, so as to ensure that the consignee parameters were also satisfied. Specifically here, no video-based content would be transmitted or placed upon any materials traveling to the consignee.

l. Third Party Advertisement Exchange Use Case #4

This particular Use Case provides a variation of Custom Communications Use Case #8, whereby a multi-tiered hierarchy may be further defined and/or established not only as between respective custom communications by the consignor—but also as between custom communications by the consignor and one or more third party entities.

According to various embodiments, as previously described herein, the custom content to be placed, for example, within an email alert may be adjusted beyond the resolution of any conflicts between consignor and consignee preferences and/or parameters. In certain embodiments, the custom content may be further adjusted based upon consignor defined account generic custom content advertisement providing a 5% discount to all shipments ordered between July 1 and July 31. That same consignor may also establish event specific custom content advertisement providing a 10% discount when a specific package or item encountered delayed delivery conditions. A third party entity (e.g., Nike) may also provide a 5% discount on all orders of its shoes shipped by the consignor (e.g., Zappos).

In a non-limiting scenario utilizing the above hypothetical advertisements and/or coupon discounts, the consignor (e.g., Zappos) may indicate universally that all event or package specific content takes priority over any account generic custom content. The consignor may further indicate that its consignor-created content further takes priority over third party generated content. Thus, even where the shipment contains shoes by Nike, Zappos may maintain its generic 5% discount on all of its shipments between July 1 and July 31, rather than deferring the same in favor of placement of a Nike-shoe specific advertisement or coupon. In other embodiments, it should be understood that the consignor may defer certain generic customizations for third-party generated content—for example where Nike may offer a 10% discount for shipments containing its shoes that have encountered further a delay in delivery, Zappos as the consignor may establish a preference whereby the third-party specific rule takes priority over Zappos' account generic rule. Of course, a variety of competing priority scenarios may be envisioned, without departing from the scope and spirit of the present invention.

m. Third Party Advertisement Exchange Use Case #5

According to various embodiments, the consignor may establish a parameter or preference whereby instead of generating their own custom content, their account is configured to first search for pertinent third-party generated content. In this scenario, it should be understood that the consignor would be able to save the expense of generating customized content internally; instead delegating this task to eligible third party entities, such that it is only ever necessary for the consignor to generate its own custom content where no third party content is applicable or desirable. In certain embodiments, the system may facilitate matching in this regard substantially automatically; in other embodiments, all as described elsewhere herein, at least some degree of manual approval (e.g., by the consignor) of the custom content is required.

As a non-limiting example, the consignor (Zappos) may ship a variety of shoe products to a plurality of consignees. Under this model, Zappos may, for example, ship Nike shoes, Reebok shoes, Adidas shoes, Asics shoes, New Balance shoes, Instead of, as in the various Use Cases described elsewhere herein, generating customized content itself, Zappos may utilize the system to first search for compatible or otherwise acceptable shoe-focused (or even related running or basketball or baseball oriented) customized content. Nike may offer a 10% discount on orders of all of its shoes, redeemable toward purchase of a consignee's next pair of shoes. Adidas may offer a 10% off coupon for purchase of soccer pads (or baseball bats/gloves) with the purchase of soccer (or baseball) cleats. Various examples may be envisioned, with the understanding that according to each the consignor may provide to its consignees pertinent and otherwise acceptable (e.g., based upon the preferences and/or parameters described herein) customized content without the consignor itself generating any such customized content. Thus, in this use case, if a consignee orders a pair of soccer cleats and that consignee is receptive of package label-based custom content, the system described herein would be configured to place upon that label custom content offering a 10% off coupon for purchase of soccer pads. Of course, in certain embodiments, this identified custom content may be further adjusted, for example, upon the basis of one or more regulatory requirements, as may be applicable for residential and foreign-based consignees—all as previously described herein.

n. General Comments on Custom Communication and Third Party Advertisement Exchange Use Cases It should be noted that the various Use Cases described herein are considered as exemplary and non-limiting in nature. Various combinations thereof may be envisioned without departing from the spirit of the present invention and such should be considered within the scope thereof.

Still further, as should be evident from the various use cases, the carrier system 100 configuration described herein provides a method that enables consignors and/or third party entities to dynamically create customized content for communication to one or more consignees receiving one or more packages from at least the consignors. The customized content may be inserted into existing, although modified, email alerts, text messages, video content, audio voicemail, package labels, package tracking numbers, barcodes, and the like, however as may be desired. The tracking number or barcode may be read and used for further interrogating the consignee at a final delivery address (e.g., a physical location, mobile location, vehicle location, alternative delivery location or the like), for example such that carrier personnel delivering the package may be able to further query the consignee as to their receptiveness of the customized content, whether an advertisement, promotional offer, or otherwise. Throughout, the carrier system 100 is configured to account for a variety of consignor and consignee-defined parameters, which may oftentimes be conflicting relative to one another, all as previously described herein.

According to various embodiments, as should also be evident from the various use cases, the carrier system 100 configuration described herein may also, in certain embodiments, provide an additional layer of functionality above and beyond the integration of consignor and consignee parameters. In these embodiments, prior to any analysis or merging of such parameters so as to eliminate any conflicts there-between for purposes of a particular customized communication, the carrier system 100 is further configured to provide a "matching-type" service between consignors and still further external third party advertisers. Such may prove beneficial where, for example, the interests of the consignor and the third party align, where one may be a distributor of a product and the other a manufacturer of the product being distributed. Matches may be determined substantially automatically by the carrier system 100, although in certain embodiments some degree of consignor and/or third party submission of content and/or approval of the same is inherently necessary. Once matched, further filtering of the customized content may thus occur, as described previously, by comparison of the consignor and consignee parameters, regardless of the precise nature thereof (although it should be apparent from the various use cases described herein that such may be and/or involve a variety of factors and considerations, as may be desirable for consignors, consignees, and/or carriers, depending upon the circumstances).

IV. CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for providing at least one customized communication to a consignee of one or more packages shipped by a consignor via a carrier, said system comprising:

one or more databases storing (a) consignor data associated with the consignor and an account with the carrier, and (b) consignee data associated with the consignee of the one or more packages shipped by the consignor via the carrier; and a first computer processor, wherein the first computer processor is configured to:

receive, from a second computer processor associated with an entity other than the consignee, customized content for storage in one or more databases, the customized content comprising non-delivery-related information for the one or more packages, wherein the second computer processor is remote from the first computer processor;

retrieve at least a portion of the consignee data from the one or more databases, said portion comprising one or more consignee-defined parameters indicative of one or more general preferences of the consignee for receipt of an electronic message comprising the customized content;

receive, from a user device associated with the consignee, location information associated with the user device, the location information comprising a latitude and longitude of the user device, wherein the location information comprises an indication that the user device is located within a jurisdiction's borders;

periodically query a third computer processor for jurisdictional data, the jurisdictional data comprising one or more regulations configured to at least restrict provision of customized content within the jurisdiction associated with the jurisdictional data, wherein the third computer processor is remote from each of the first and the second computer processors; and automatically (a) generate a customized electronic message based at least in part on the customized content and the one or more consignee-defined parameters, said customized electronic message being configured for provision to the consignee, (b) filter the customized electronic message based on: any of the one or more regulations within the jurisdictional data imposed upon any of the carrier or the consignee, and (c) transmit the customized electronic message for display to the consignee via a mobile device, the customized electronic message containing at least a portion of the customized content authorized for provision to the consignee.

2. The system according to claim 1, wherein the customized content comprises an identification of at least one medium, said at least one medium comprising a machine-readable indicia configured to be positioned on a surface portion of said one or more packages.

3. The system according to claim 1, wherein:

said customized content comprise a variety of types of information;

said one or more consignee-defined parameters comprise an identification of a variety of types of information that said consignee deems acceptable to receive via customized communication; and said at least one correlation identified between said customized content and said one or more consignee-defined parameters comprise at least one of said variety of types of information indicated by both said consignor and said consignee.

4. The system according to claim 3, wherein said variety of types of information comprise at least one of a promotional name, a promotional header, a promotional message, a consignor logo, a URL associated with the consignor logo, or a URL text string.

5. The system according to claim 1, wherein:
the at least one identified correlation comprises an exact match between said customized content and said one or more consignee-defined parameters; and
said customized electronic message is generated based on the customized content without further adjustment thereto.

6. The system according to claim 1, wherein:
the at least one identified correlation comprises a partial match between said customized content and said one or more consignee-defined parameters; and
said customized electronic message is at least partially adjusted based on the one or more consignee-defined parameters.

7. The system according to claim 6, wherein said at least partial adjustment comprises a removal of at least one component of said customized content, said at least one component being identified as impermissible within the one or more consignee-defined parameters.

8. The system according to claim 1, wherein, prior to generating said customized electronic message, the first computer processor is further configured to:
retrieve at least a portion of carrier data, the portion of carrier data being associated with one or more business rules defined by the carrier;
compare said one or more components of said customized content with the retrieved portion of carrier data so as to identify whether any discrepancies exist there-between;
in response to identifying no discrepancies, approve said customized content for placement on customized electronic messages associated with the carrier; and
in response to identifying at least one discrepancy, prevent generation of said customized content on one or more packages shipped via the carrier.

9. The system according to claim 8, wherein said one or more business rules comprise content-based restrictions upon at least one of one or more types of messages or language contained therein.

10. The system according to claim 8, wherein said one or more business rules comprise one or more regulatory requirements imposed upon said carrier.

11. A computer-implemented method for providing at least one customized electronic communication to a consignee of one or more packages shipped by a consignor via a carrier, said method comprising the steps of:
receiving and storing within databases, (a) consignor data associated with the consignor and an account established thereby with the carrier, and (b) consignee data associated with the consignee of the one or more packages shipped by the consignor;
receiving from a first computer processor associated with an entity other than the consignee, at least a portion of customized content, for storage in one or more databases, the customized content comprising non-delivery-related information for the one or more packages;
retrieving, via a second computer processor at least a portion of the consignee data, said portion comprising one or more consignee-defined parameters indicative of one or more general preferences of the consignee for receipt of customized content, wherein the second computer processor is remote from the first computer processor;
receive, from a user device associated with the consignee, location information associated with the user device, the location information comprising a latitude and longitude of the user device, wherein the location information comprises an indication that the user device is located within a jurisdiction's borders;
periodically querying, via the second computer processor, a third computer processor for jurisdictional data, the jurisdictional data comprising one or more regulations configured to at least restrict provision of customized within one or more jurisdictions associated with the jurisdictional data, wherein the third computer processor is remote from each of the first and second computer processors;
automatically (a) generating a customized electronic message based at least in part on the customized content and the one or more consignee-defined parameters, said customized electronic message being configured for provision to the consignee, (b) filtering the customized electronic message based on: any of the one or more regulations within the jurisdictional data imposed upon any one of the carrier or the consignee, and (c) transmitting the customized electronic message for display to the consignee via a mobile device, the customized electronic message containing at least a portion of the customized content authorized for provision to the consignee.

12. The method according to claim 11, wherein:
said customized content comprise a variety of types of information;
said one or more consignee-defined parameters comprise an identification of a variety of types of information that said consignee deems acceptable to receive via customized communication; and
said one or more correlations identified between said customized content and said one or more consignee-defined parameters comprise at least one of said variety of types of information indicated by both said consignor and said consignee.

13. The method according to claim 11, wherein:
the at least one identified correlation comprises a partial match between said customized content and said one or more consignee-defined parameters; and
said method further comprises the step of at least partially adjusting, via the first computer processor, the customized electronic message, said at least partially adjusting of the customized electronic message comprising a removal of at least one component of said customized content, said at least one component being identified as impermissible within the one or more consignee-defined parameters.

14. The method according to claim 11, further comprising, prior to generating said at least one customized communication, the steps of:
retrieving, via the first computer processor, at least a portion of carrier data, the portion of carrier data being stored within the one or more memory storage areas and being associated with one or more business rules defined by the carrier;
comparing, via first computer processor, said customized content with the retrieved portion of carrier data so as to identify whether any discrepancies exist there-between;
in response to identifying no discrepancies, approving, via the first computer processor, said customized content for placement on customized communications associated with the carrier; and
in response to identifying at least one discrepancy, preventing, via the first computer processor, generation of said customized content on one or more packages shipped via the carrier.

15. The method according to claim 14, wherein said one or more business rules comprise at least one of: (1) one or more content-based restrictions imposed by said carrier; or (2) one or more regulatory requirements imposed upon said carrier.

16. The method according to claim 11, wherein, upon said generation of said customized electronic message, said method further comprises the steps of:
  automatically generating, via the first computer processor, a preliminary rendering of said customized electronic message;
  transmitting the preliminary rendering of said customized electronic message to at least the consignor for approval thereof; and
  upon receipt of consignor approval of the preliminary rendering, finalizing and facilitating transmission of the customized electronic message containing the customized content to said consignee.

17. The method of claim 16, wherein said customized electronic message comprises a package label comprising machine-readable indicia associated with one or more packages being transported by the carrier to the consignee.

18. The method of claim 11, wherein:
  the received portion of customized content comprises one or more components associated with at least two requests for the provision of customized content to the consignee of the one or more packages shipped by the consignor; and
  the method further comprises the steps of:
    retrieving at least a portion of the consignor data, said portion comprising one or more business rules established by the consignor, the one or more business rules defining a hierarchy for placement of customized content upon customized communications; and
    comparing, via the first computer processor, the at least two requests for the provision of customized content against the retrieved one or more business rules so as to determine which of the at least two requests takes priority based at least in part upon the hierarchy for placement.

19. A non-transitory computer program product operated by a carrier and comprising at least one non-transitory computer-readable storage medium having computer-readable program code portions embodied therein, the computer-readable program code portions comprising one or more executable portions configured for:
  receiving at a database a plurality of data, wherein said data comprises (a) consignor data associated with the consignor and an account established thereby, and (b) consignee data associated with a consignee of the one or more packages shipped by the consignor
  receiving, from a first computer processor associated with an entity other than the consignee, customized content, the customized content comprising non-delivery-related information for the one or more packages;
  retrieving, by a second computer processor, at least a portion of the consignee data, said portion comprising one or more consignee-defined parameters, said one or more consignee-defined parameters being indicative of one or more general preferences of the consignee for receipt of customized content, wherein the first computer processor and the database are remote from the second computer processor;
  receive, from a user device associated with the consignee, location information associated with the user device, the location information comprising a latitude and longitude of the user device, wherein the location information comprises an indication that the user device is located within a jurisdiction's borders;
  periodically querying, via the second computer processor, a third computer processor for jurisdictional data, the jurisdictional data comprising one or more regulations configured to at least restrict provision of customized within one or more jurisdictions associated with the jurisdictional data, wherein the third computer processor is remote from each of the first and second computer processors;
  automatically (a) generating a standard, electronic message based at least in part on the retrieved at least a portion of the consignee data and comprising no customized content, said customized electronic message being configured for provision to the consignee, (b) filtering the customized electronic message based on any of the one or more regulations within the jurisdictional data imposed upon any one of the carrier or the consignee, and (c) transmitting the customized electronic message for display to the consignee via a mobile device, the customized electronic message containing at least a portion of the customized content authorized for provision to the consignee.

* * * * *